United States Patent
Brosnihan et al.

(10) Patent No.: US 7,405,852 B2
(45) Date of Patent: Jul. 29, 2008

(54) DISPLAY APPARATUS AND METHODS FOR MANUFACTURE THEREOF

(75) Inventors: Timothy J. Brosnihan, Natick, MA (US); Nesbitt W. Hagood, IV, Wellesley, MA (US); Jasper Lodewyk Steyn, Winchester, MA (US); Jignesh Gandhi, Burlington, MA (US); John J. Fijol, Shrewsbury, MA (US); Richard S. Payne, Andover, MA (US); Roger Barton, Andover, MA (US)

(73) Assignee: Pixtronix, Inc., Andover, MA (US)

( * ) Notice: Subject to any disclaimer, the term of this patent is extended or adjusted under 35 U.S.C. 154(b) by 155 days.

(21) Appl. No.: 11/361,785

(22) Filed: Feb. 23, 2006

(65) Prior Publication Data

US 2007/0002156 A1    Jan. 4, 2007

Related U.S. Application Data

(63) Continuation-in-part of application No. 11/326,696, filed on Jan. 6, 2006, and a continuation-in-part of application No. 11/251,035, filed on Oct. 14, 2005, now Pat. No. 7,271,945, and a continuation-in-part of application No. 11/218,690, filed on Sep. 2, 2005.

(60) Provisional application No. 60/676,053, filed on Apr. 29, 2005, provisional application No. 60/655,827, filed on Feb. 23, 2005.

(51) Int. Cl.
*G02B 26/08* (2006.01)
*G02B 26/00* (2006.01)
*G09G 3/34* (2006.01)

(52) U.S. Cl. .................. 359/198; 359/290; 345/109

(58) Field of Classification Search .................. 359/198, 359/230, 233, 290; 345/109
See application file for complete search history.

(56) References Cited

U.S. PATENT DOCUMENTS

| | | |
|---|---|---|
| 4,067,043 A | 1/1978 | Perry |
| 4,074,253 A | 2/1978 | Nadir |
| 4,559,535 A | 12/1985 | Watkins et al. |
| 4,564,836 A | 1/1986 | Vuilleumier et al. |
| 4,582,396 A | 4/1986 | Bos et al. |
| 4,673,253 A | 6/1987 | Tanabe et al. |
| 4,744,640 A | 5/1988 | Phillips |
| 4,958,911 A | 9/1990 | Beiswenger et al. |

(Continued)

FOREIGN PATENT DOCUMENTS

EP        0 359 450 A2    9/1989

(Continued)

OTHER PUBLICATIONS

A. Funamoto et al. "LED Backlight System with Double-Prism Pattern", Journal of the Society for Information Display v. 14, p. 1045 (2006).

(Continued)

*Primary Examiner*—William C Choi
(74) *Attorney, Agent, or Firm*—Ropes & Gray LLP

(57) ABSTRACT

Display devices incorporating shutter-based light modulators are disclosed along with methods of manufacturing such devices. The methods are compatible with thin-film manufacturing processes known in the art and result in displays having lower power-consumption.

21 Claims, 47 Drawing Sheets

U.S. PATENT DOCUMENTS

| | | | |
|---|---|---|---|
| 4,991,941 A | 2/1991 | Kalmanash | |
| 5,005,108 A | 4/1991 | Pristash et al. | |
| 5,042,900 A | 8/1991 | Parker | |
| 5,050,946 A | 9/1991 | Hathaway et al. | |
| 5,061,049 A | 10/1991 | Hornbeck | |
| 5,062,689 A | 11/1991 | Koehler | |
| 5,093,652 A | 3/1992 | Bull et al. | |
| 5,096,279 A | 3/1992 | Hornbeck et al. | |
| 5,128,787 A | 7/1992 | Blonder | |
| 5,136,480 A | 8/1992 | Pristash et al. | |
| 5,136,751 A | 8/1992 | Coyne et al. | |
| 5,142,405 A | 8/1992 | Hornbeck | |
| 5,198,730 A | 3/1993 | Vancil | |
| 5,202,950 A | 4/1993 | Arego et al. | |
| 5,233,385 A | 8/1993 | Sampsell | |
| 5,233,459 A | 8/1993 | Bozler et al. | |
| 5,278,652 A | 1/1994 | Urbanus et al. | |
| 5,280,277 A | 1/1994 | Hornbeck | |
| 5,319,491 A | 6/1994 | Selbrede | |
| 5,339,116 A | 8/1994 | Urbanus et al. | |
| 5,339,179 A | 8/1994 | Rudisill et al. | |
| 5,359,345 A | 10/1994 | Hunter | |
| 5,396,350 A | 3/1995 | Beeson et al. | |
| 5,416,631 A | 5/1995 | Yagi | |
| 5,440,197 A | 8/1995 | Gleckman | |
| 5,452,024 A | 9/1995 | Sampsell | |
| 5,461,411 A | 10/1995 | Florence et al. | |
| 5,465,175 A | 11/1995 | Woodgate et al. | |
| 5,467,104 A | 11/1995 | Furness, III et al. | |
| 5,477,086 A | 12/1995 | Rostoker et al. | |
| 5,479,279 A | 12/1995 | Barbier et al. | |
| 5,493,439 A | 2/1996 | Engle | |
| 5,497,172 A | 3/1996 | Doherty | |
| 5,504,389 A | 4/1996 | Dickey | |
| 5,510,824 A | 4/1996 | Nelson | |
| 5,519,565 A | 5/1996 | Kalt et al. | |
| 5,523,803 A | 6/1996 | Urbanus et al. | |
| 5,526,051 A | 6/1996 | Gove et al. | |
| 5,528,262 A | 6/1996 | McDowall et al. | |
| 5,548,301 A | 8/1996 | Kornher et al. | |
| 5,559,389 A | 9/1996 | Spindt et al. | |
| 5,568,964 A | 10/1996 | Parker et al. | |
| 5,578,185 A | 11/1996 | Bergeron et al. | |
| 5,579,035 A | 11/1996 | Beiswenger | |
| 5,579,240 A | 11/1996 | Buus | |
| 5,596,339 A | 1/1997 | Furness, III et al. | |
| 5,613,751 A | 3/1997 | Parker et al. | |
| 5,618,096 A | 4/1997 | Parker et al. | |
| 5,619,266 A | 4/1997 | Tomita et al. | |
| 5,655,832 A | 8/1997 | Pelka et al. | |
| 5,659,327 A | 8/1997 | Furness, III et al. | |
| 5,666,226 A | 9/1997 | Ezra et al. | |
| 5,684,354 A | 11/1997 | Gleckman | |
| 5,724,062 A | 3/1998 | Hunter | |
| 5,731,802 A | 3/1998 | Aras et al. | |
| 5,745,193 A | 4/1998 | Urbanus et al. | |
| 5,745,203 A | 4/1998 | Valliath et al. | |
| 5,771,321 A | 6/1998 | Stern | |
| 5,781,331 A | 7/1998 | Carr et al. | |
| 5,784,189 A | 7/1998 | Bozler et al. | |
| 5,794,761 A | 8/1998 | Renaud et al. | |
| 5,801,792 A | 9/1998 | Smith et al. | |
| 5,835,255 A | 11/1998 | Miles | |
| 5,835,256 A | 11/1998 | Huibers | |
| 5,854,872 A | 12/1998 | Tai | |
| 5,867,302 A | 2/1999 | Fleming | |
| 5,876,107 A | 3/1999 | Parker et al. | |
| 5,884,872 A | 3/1999 | Greenhalgh | |
| 5,889,625 A | 3/1999 | Chen et al. | |
| 5,894,686 A | 4/1999 | Parker et al. | |
| 5,895,115 A | 4/1999 | Parker et al. | |
| 5,921,652 A | 7/1999 | Parker et al. | |
| 5,936,596 A | 8/1999 | Yoshida et al. | |
| 5,953,469 A | 9/1999 | Zhou | |
| 5,975,711 A | 11/1999 | Parker et al. | |
| 5,986,628 A | 11/1999 | Tuenge et al. | |
| 5,986,796 A | 11/1999 | Miles | |
| 5,990,990 A | 11/1999 | Crabtree | |
| 6,008,781 A | 12/1999 | Furness, III et al. | |
| 6,008,929 A | 12/1999 | Akimoto et al. | |
| 6,028,656 A | 2/2000 | Buhrer et al. | |
| 6,030,089 A | 2/2000 | Parker et al. | |
| 6,034,807 A | 3/2000 | Little et al. | |
| 6,040,796 A | 3/2000 | Matsugatani et al. | |
| 6,040,937 A | 3/2000 | Miles | |
| 6,046,840 A | 4/2000 | Huibers | |
| 6,055,090 A | 4/2000 | Miles | |
| 6,079,838 A | 6/2000 | Parker et al. | |
| 6,154,586 A | 11/2000 | MacDonald et al. | |
| 6,158,867 A | 12/2000 | Parker et al. | |
| 6,162,657 A | 12/2000 | Schiele et al. | |
| 6,168,395 B1 | 1/2001 | Quenzer et al. | |
| 6,172,657 B1 | 1/2001 | Kamakura et al. | |
| 6,172,797 B1 | 1/2001 | Huibers | |
| 6,174,064 B1 | 1/2001 | Kalantar et al. | |
| 6,201,633 B1 | 3/2001 | Peeters et al. | |
| 6,201,664 B1 | 3/2001 | Le et al. | |
| 6,206,550 B1 | 3/2001 | Fukushima et al. | |
| 6,219,119 B1 | 4/2001 | Nakai | |
| 6,249,269 B1 | 6/2001 | Blalock et al. | |
| 6,249,370 B1 | 6/2001 | Takeuchi et al. | |
| 6,266,240 B1 | 7/2001 | Urban et al. | |
| 6,282,951 B1 | 9/2001 | Loga et al. | |
| 6,285,270 B1 | 9/2001 | Lane et al. | |
| 6,288,824 B1 | 9/2001 | Kastalsky | |
| 6,296,383 B1 | 10/2001 | Henningsen | |
| 6,300,154 B2 | 10/2001 | Clark et al. | |
| 6,317,103 B1 | 11/2001 | Furness, III et al. | |
| 6,323,834 B1 | 11/2001 | Colgan et al. | |
| 6,329,967 B1 | 12/2001 | Little et al. | |
| 6,367,940 B1 | 4/2002 | Parker et al. | |
| 6,388,661 B1 | 5/2002 | Richards | |
| 6,402,335 B1 | 6/2002 | Kalantar et al. | |
| 6,404,942 B1 | 6/2002 | Edwards et al. | |
| 6,424,329 B1 | 7/2002 | Okita | |
| 6,429,625 B1 | 8/2002 | LeFevre et al. | |
| 6,471,879 B2 | 10/2002 | Hanson et al. | |
| 6,473,220 B1 | 10/2002 | Clikeman et al. | |
| 6,476,886 B2 | 11/2002 | Krusius et al. | |
| 6,483,613 B1 | 11/2002 | Woodgate et al. | |
| 6,498,685 B1 | 12/2002 | Johnson | |
| 6,504,985 B2 | 1/2003 | Parker et al. | |
| 6,507,138 B1 | 1/2003 | Rodgers et al. | |
| 6,508,563 B2 | 1/2003 | Parker et al. | |
| 6,523,961 B2 | 2/2003 | Ilkov et al. | |
| 6,529,265 B1 | 3/2003 | Henningsen | |
| 6,531,947 B1 | 3/2003 | Weaver et al. | |
| 6,535,256 B1 | 3/2003 | Ishihara et al. | |
| 6,535,311 B1 | 3/2003 | Lindquist | |
| 6,556,258 B1 | 4/2003 | Yoshida et al. | |
| 6,556,261 B1 | 4/2003 | Krusius et al. | |
| 6,559,827 B1 | 5/2003 | Mangerson | |
| 6,567,063 B1 | 5/2003 | Okita | |
| 6,567,138 B1 | 5/2003 | Krusius et al. | |
| 6,574,033 B1 | 6/2003 | Chui et al. | |
| 6,582,095 B1 | 6/2003 | Toyoda | |
| 6,583,915 B1 | 6/2003 | Hong et al. | |
| 6,589,625 B1 | 7/2003 | Kothari et al. | |
| 6,591,049 B2 | 7/2003 | Williams et al. | |
| 6,600,474 B1 | 7/2003 | Heines et al. | |
| 6,633,301 B1 | 10/2003 | Dallas et al. | |
| 6,639,570 B2 | 10/2003 | Furness, III et al. | |
| 6,639,572 B1 | 10/2003 | Little et al. | |
| 6,650,455 B2 | 11/2003 | Miles | |

| Patent No. | Date | Inventor |
|---|---|---|
| 6,650,822 B1 | 11/2003 | Zhou |
| 6,671,078 B2 | 12/2003 | Flanders et al. |
| 6,674,562 B1 | 1/2004 | Miles |
| 6,677,709 B1 | 1/2004 | Ma et al. |
| 6,680,792 B2 | 1/2004 | Miles |
| 6,687,896 B1 | 2/2004 | Royce et al. |
| 6,690,422 B1 | 2/2004 | Daly et al. |
| 6,701,039 B2 | 3/2004 | Bourgeois et al. |
| 6,707,176 B1 | 3/2004 | Rodgers |
| 6,710,538 B1 | 3/2004 | Ahn et al. |
| 6,710,908 B2 | 3/2004 | Miles et al. |
| 6,710,920 B1 | 3/2004 | Mashitani et al. |
| 6,712,481 B2 | 3/2004 | Parker et al. |
| 6,731,355 B2 | 5/2004 | Miyashita |
| 6,731,492 B2 | 5/2004 | Goodwin-Johansson |
| 6,733,354 B1 | 5/2004 | Cathey et al. |
| 6,738,177 B1 | 5/2004 | Gutierrez et al. |
| 6,741,377 B2 | 5/2004 | Miles |
| 6,749,312 B2 | 6/2004 | Parker et al. |
| 6,750,930 B2 | 6/2004 | Yoshii et al. |
| 6,752,505 B2 | 6/2004 | Parker et al. |
| 6,755,547 B2 | 6/2004 | Parker |
| 6,762,743 B2 | 7/2004 | Yoshihara et al. |
| 6,762,868 B2 | 7/2004 | Liu et al. |
| 6,764,796 B2 | 7/2004 | Fries |
| 6,774,964 B2 | 8/2004 | Funamoto et al. |
| 6,775,048 B1 | 8/2004 | Starkweather et al. |
| 6,785,454 B2 | 8/2004 | Abe |
| 6,787,969 B2 | 9/2004 | Grade et al. |
| 6,788,371 B2 | 9/2004 | Tanada et al. |
| 6,794,119 B2 | 9/2004 | Miles |
| 6,795,064 B2 | 9/2004 | Walker et al. |
| 6,796,668 B2 | 9/2004 | Parker et al. |
| 6,798,935 B2 | 9/2004 | Bourgeois et al. |
| 6,809,851 B1 | 10/2004 | Gurcan |
| 6,819,465 B2 | 11/2004 | Clikeman et al. |
| 6,825,470 B1 | 11/2004 | Bawolek et al. |
| 6,827,456 B2 | 12/2004 | Parker et al. |
| 6,831,678 B1 | 12/2004 | Travis |
| 6,835,111 B2 | 12/2004 | Ahn et al. |
| 6,846,082 B2 | 1/2005 | Glent-Madsen et al. |
| 6,847,425 B2 | 1/2005 | Tanada et al. |
| 6,852,095 B1 | 2/2005 | Ray |
| 6,857,751 B2 | 2/2005 | Penn et al. |
| 6,859,625 B2 | 2/2005 | Sawada |
| 6,863,219 B1 | 3/2005 | Jacobsen et al. |
| 6,864,618 B2 | 3/2005 | Miller et al. |
| 6,867,896 B2 | 3/2005 | Miles |
| 6,873,311 B2 | 3/2005 | Yoshihara et al. |
| 6,879,307 B1 | 4/2005 | Stern |
| 6,886,956 B2 | 5/2005 | Parker et al. |
| 6,887,202 B2 | 5/2005 | Currie et al. |
| 6,888,678 B2 | 5/2005 | Nishiyama et al. |
| 6,889,565 B2 | 5/2005 | DeConde et al. |
| 6,893,677 B2 | 5/2005 | Behin et al. |
| 6,897,164 B2 | 5/2005 | Baude et al. |
| 6,900,072 B2 | 5/2005 | Patel et al. |
| 6,906,847 B2 | 6/2005 | Huibers et al. |
| 6,911,891 B2 | 6/2005 | Qiu et al. |
| 6,911,964 B2 | 6/2005 | Lee et al. |
| 6,919,981 B2 | 7/2005 | Clikeman et al. |
| 6,934,080 B2 | 8/2005 | Saccomanno et al. |
| 6,936,968 B2 | 8/2005 | Cross et al. |
| 6,939,013 B2 | 9/2005 | Asao |
| 6,940,631 B2 | 9/2005 | Ishikawa |
| 6,947,107 B2 | 9/2005 | Yoshii et al. |
| 6,953,375 B2 | 10/2005 | Ahn et al. |
| 6,961,167 B2 | 11/2005 | Prins et al. |
| 6,962,419 B2 | 11/2005 | Huibers |
| 6,965,375 B1 | 11/2005 | Gettemy et al. |
| 6,967,698 B2 | 11/2005 | Tanoue et al. |
| 6,969,635 B2 | 11/2005 | Patel et al. |
| 6,970,227 B2 | 11/2005 | Kida et al. |
| 6,996,306 B2 * | 2/2006 | Chen et al. .................... 385/18 |
| 7,004,610 B2 | 2/2006 | Yamashita et al. |
| 7,004,611 B2 | 2/2006 | Parker et al. |
| 7,012,726 B1 | 3/2006 | Miles |
| 7,012,732 B2 | 3/2006 | Miles |
| 7,014,349 B2 | 3/2006 | Shinohara et al. |
| 7,042,618 B2 | 5/2006 | Selbrede et al. |
| 7,042,643 B2 | 5/2006 | Miles |
| 7,046,221 B1 | 5/2006 | Malzbender |
| 7,046,905 B1 | 5/2006 | Gardiner et al. |
| 7,050,035 B2 | 5/2006 | Iisaka et al. |
| 7,050,141 B2 | 5/2006 | Yokoue et al. |
| 7,050,219 B2 | 5/2006 | Kimura |
| 7,057,790 B2 | 6/2006 | Selbrede |
| 7,060,895 B2 | 6/2006 | Kothari et al. |
| 7,071,611 B2 | 7/2006 | Yonekubo et al. |
| 7,110,158 B2 | 9/2006 | Miles |
| 7,116,464 B2 | 10/2006 | Osawa et al. |
| 7,123,216 B1 | 10/2006 | Miles |
| 7,123,796 B2 | 10/2006 | Steckl et al. |
| 7,126,738 B2 | 10/2006 | Miles |
| 7,161,094 B2 | 1/2007 | Kothari et al. |
| 7,164,250 B2 | 1/2007 | Boscolo et al. |
| 7,184,202 B2 | 2/2007 | Miles et al. |
| 7,198,982 B2 | 4/2007 | Patel et al. |
| 7,227,677 B2 | 6/2007 | Ravnkilde et al. |
| 2001/0001260 A1 | 5/2001 | Parker et al. |
| 2001/0028993 A1 | 10/2001 | Sanford |
| 2001/0040538 A1 | 11/2001 | Quanrud |
| 2001/0043208 A1 | 11/2001 | Funess, III et al. |
| 2001/0053075 A1 | 12/2001 | Parker et al. |
| 2002/0001051 A1 | 1/2002 | Krusius et al. |
| 2002/0009275 A1 | 1/2002 | Williams et al. |
| 2002/0015215 A1 | 2/2002 | Miles |
| 2002/0024641 A1 | 2/2002 | Ilkov et al. |
| 2002/0024711 A1 | 2/2002 | Miles |
| 2002/0047172 A1 | 4/2002 | Reid |
| 2002/0054424 A1 | 5/2002 | Miles |
| 2002/0054487 A1 | 5/2002 | Parker et al. |
| 2002/0056900 A1 | 5/2002 | Liu et al. |
| 2002/0063661 A1 | 5/2002 | Comiskey et al. |
| 2002/0070931 A1 | 6/2002 | Ishikawa |
| 2002/0075555 A1 | 6/2002 | Miles |
| 2002/0080598 A1 | 6/2002 | Parker et al. |
| 2002/0126364 A1 | 9/2002 | Miles |
| 2002/0126387 A1 | 9/2002 | Ishikawa et al. |
| 2002/0132389 A1 | 9/2002 | Patel et al. |
| 2002/0141174 A1 | 10/2002 | Parker et al. |
| 2002/0149828 A1 | 10/2002 | Miles et al. |
| 2002/0163482 A1 | 11/2002 | Sullivan |
| 2002/0163484 A1 | 11/2002 | Funess, III et al. |
| 2002/0171327 A1 | 11/2002 | Miller et al. |
| 2002/0185699 A1 | 12/2002 | Reid |
| 2002/0196522 A1 | 12/2002 | Little et al. |
| 2003/0007344 A1 | 1/2003 | Parker |
| 2003/0009898 A1 | 1/2003 | Slocum et al. |
| 2003/0029705 A1 | 2/2003 | Qiu et al. |
| 2003/0036215 A1 | 2/2003 | Reid |
| 2003/0043157 A1 | 3/2003 | Miles |
| 2003/0048036 A1 | 3/2003 | Lemkin |
| 2003/0058543 A1 | 3/2003 | Sheedy et al. |
| 2003/0063233 A1 | 4/2003 | Takagi |
| 2003/0076649 A1 | 4/2003 | Speakman |
| 2003/0085650 A1 | 5/2003 | Cathey et al. |
| 2003/0085867 A1 | 5/2003 | Grabert |
| 2003/0095081 A1 | 5/2003 | Funess, III et al. |
| 2003/0095398 A1 | 5/2003 | Parker et al. |
| 2003/0102810 A1 | 6/2003 | Cross et al. |
| 2003/0123245 A1 | 7/2003 | Parker et al. |
| 2003/0123246 A1 | 7/2003 | Parker |
| 2003/0123247 A1 | 7/2003 | Parker et al. |
| 2003/0133284 A1 | 7/2003 | Chipchase et al. |
| 2003/0137499 A1 | 7/2003 | Iisaka |

| | | |
|---|---|---|
| 2003/0152872 A1 | 8/2003 | Miles |
| 2003/0174422 A1 | 9/2003 | Miller et al. |
| 2003/0174931 A1 | 9/2003 | Rodgers et al. |
| 2003/0183008 A1 | 10/2003 | Bang et al. |
| 2003/0184189 A1 | 10/2003 | Sinclair |
| 2003/0190535 A1 | 10/2003 | Fries |
| 2003/0190536 A1 | 10/2003 | Fries |
| 2003/0202338 A1 | 10/2003 | Parker |
| 2003/0231160 A1 | 12/2003 | Yoshihara et al. |
| 2004/0012946 A1 | 1/2004 | Parker et al. |
| 2004/0027636 A1 | 2/2004 | Miles |
| 2004/0051929 A1 | 3/2004 | Sampsell et al. |
| 2004/0058532 A1 | 3/2004 | Miles et al. |
| 2004/0080240 A1 | 4/2004 | Miller et al. |
| 2004/0080484 A1 | 4/2004 | Heines et al. |
| 2004/0080927 A1 | 4/2004 | Parker et al. |
| 2004/0085749 A1 | 5/2004 | Parker et al. |
| 2004/0090144 A1 | 5/2004 | Miller et al. |
| 2004/0095739 A1 | 5/2004 | Parker et al. |
| 2004/0100677 A1 | 5/2004 | Huibers et al. |
| 2004/0114346 A1 | 6/2004 | Parker et al. |
| 2004/0122328 A1 | 6/2004 | Wang et al. |
| 2004/0125346 A1 | 7/2004 | Huibers |
| 2004/0135273 A1 | 7/2004 | Parker et al. |
| 2004/0135951 A1 | 7/2004 | Stumbo et al. |
| 2004/0136204 A1 | 7/2004 | Asao |
| 2004/0145580 A1 | 7/2004 | Perlman |
| 2004/0157664 A1 | 8/2004 | Link |
| 2004/0165372 A1 | 8/2004 | Parker |
| 2004/0171206 A1 | 9/2004 | Rodgers |
| 2004/0179146 A1 | 9/2004 | Nilsson |
| 2004/0196215 A1 | 10/2004 | Duthaler et al. |
| 2004/0207768 A1 | 10/2004 | Liu |
| 2004/0218149 A1 | 11/2004 | Huibers |
| 2004/0218154 A1 | 11/2004 | Huibers |
| 2004/0218292 A1 | 11/2004 | Huibers |
| 2004/0218293 A1 | 11/2004 | Huibers |
| 2004/0223088 A1 | 11/2004 | Huibers |
| 2004/0223240 A1 | 11/2004 | Huibers |
| 2004/0227428 A1 | 11/2004 | Sinclair |
| 2004/0233392 A1 | 11/2004 | Huibers |
| 2004/0240032 A1 | 12/2004 | Miles |
| 2004/0246275 A1 | 12/2004 | Yoshihara et al. |
| 2004/0263502 A1 | 12/2004 | Dallas et al. |
| 2004/0263944 A1 | 12/2004 | Miles et al. |
| 2005/0002082 A1 | 1/2005 | Miles |
| 2005/0002086 A1 | 1/2005 | Starkweather et al. |
| 2005/0007759 A1 | 1/2005 | Parker |
| 2005/0024849 A1 | 2/2005 | Parker et al. |
| 2005/0059184 A1 | 3/2005 | Sniegowski et al. |
| 2005/0062708 A1 | 3/2005 | Yoshihara et al. |
| 2005/0063037 A1 | 3/2005 | Selebrede et al. |
| 2005/0072032 A1 | 4/2005 | McCollum et al. |
| 2005/0073471 A1 | 4/2005 | Selbrede |
| 2005/0088404 A1 | 4/2005 | Heines et al. |
| 2005/0093465 A1 | 5/2005 | Yonekubo et al. |
| 2005/0094240 A1 | 5/2005 | Huibers et al. |
| 2005/0094418 A1 | 5/2005 | Parker |
| 2005/0104804 A1 | 5/2005 | Feenstra et al. |
| 2005/0111238 A1 | 5/2005 | Parker |
| 2005/0111241 A1 | 5/2005 | Parker |
| 2005/0116798 A1 | 6/2005 | Bintoro et al. |
| 2005/0122560 A1 | 6/2005 | Sampsell et al. |
| 2005/0122591 A1 | 6/2005 | Parker et al. |
| 2005/0123243 A1 | 6/2005 | Steckl et al. |
| 2005/0128370 A1 | 6/2005 | Moon |
| 2005/0134805 A1 | 6/2005 | Conner et al. |
| 2005/0141076 A1 | 6/2005 | Bausenwein et al. |
| 2005/0151940 A1 | 7/2005 | Asao |
| 2005/0157365 A1 | 7/2005 | Ravnkilde et al. |
| 2005/0157376 A1 | 7/2005 | Huibers et al. |
| 2005/0168431 A1 | 8/2005 | Chui |
| 2005/0168789 A1 | 8/2005 | Glent-Madsen |
| 2005/0171408 A1 | 8/2005 | Parker |
| 2005/0179977 A1 | 8/2005 | Chui et al. |
| 2005/0195467 A1 | 9/2005 | Kothari et al. |
| 2005/0195468 A1 | 9/2005 | Sampsell |
| 2005/0206991 A1 | 9/2005 | Chui et al. |
| 2005/0207128 A1 | 9/2005 | Parker |
| 2005/0207154 A1 | 9/2005 | Parker |
| 2005/0212738 A1 | 9/2005 | Gally |
| 2005/0213183 A9 | 9/2005 | Miles |
| 2005/0213322 A1 | 9/2005 | Parker |
| 2005/0213323 A1 | 9/2005 | Parker |
| 2005/0213349 A1 | 9/2005 | Parker |
| 2005/0219679 A1 | 10/2005 | Ishikawa |
| 2005/0219680 A1 | 10/2005 | Ishikawa |
| 2005/0225501 A1 | 10/2005 | Srinivasan et al. |
| 2005/0225519 A1 | 10/2005 | Naugler, Jr. |
| 2005/0225732 A1 | 10/2005 | Conner et al. |
| 2005/0225827 A1 | 10/2005 | Kastalsky |
| 2005/0231791 A1 | 10/2005 | Sampsell et al. |
| 2005/0237596 A1 | 10/2005 | Selbrede |
| 2005/0242710 A1 | 11/2005 | Yamazaki et al. |
| 2005/0243023 A1 | 11/2005 | Reddy et al. |
| 2005/0244099 A1 | 11/2005 | Pasch et al. |
| 2005/0244949 A1 | 11/2005 | Miles |
| 2005/0245313 A1 | 11/2005 | Yoshino et al. |
| 2005/0247477 A1 | 11/2005 | Kothari et al. |
| 2005/0249966 A1 | 11/2005 | Tung et al. |
| 2005/0253779 A1 | 11/2005 | Feenstra et al. |
| 2005/0254115 A1 | 11/2005 | Palmateer et al. |
| 2005/0258571 A1 | 11/2005 | Dumond et al. |
| 2005/0259198 A1 | 11/2005 | Lubart et al. |
| 2005/0285816 A1 | 12/2005 | Glass |
| 2005/0286113 A1 | 12/2005 | Miles |
| 2005/0286114 A1 | 12/2005 | Miles |
| 2006/0001942 A1 | 1/2006 | Chui et al. |
| 2006/0028708 A1 | 2/2006 | Miles |
| 2006/0028811 A1 | 2/2006 | Parker |
| 2006/0028817 A1 | 2/2006 | Parker |
| 2006/0028840 A1 | 2/2006 | Parker |
| 2006/0028841 A1 | 2/2006 | Parker |
| 2006/0028843 A1 | 2/2006 | Parker |
| 2006/0028844 A1 | 2/2006 | Parker |
| 2006/0033975 A1 | 2/2006 | Miles |
| 2006/0044246 A1 | 3/2006 | Mignard |
| 2006/0044298 A1 | 3/2006 | Mignard et al. |
| 2006/0044928 A1 | 3/2006 | Chui et al. |
| 2006/0061559 A1 | 3/2006 | King |
| 2006/0066934 A1 | 3/2006 | Selbrede |
| 2006/0066937 A1 | 3/2006 | Chui |
| 2006/0077125 A1 | 4/2006 | Floyd |
| 2006/0077153 A1 | 4/2006 | Cummings et al. |
| 2006/0077533 A1 | 4/2006 | Miles |
| 2006/0092490 A1 | 5/2006 | McCollum et al. |
| 2006/0132383 A1 | 6/2006 | Gally et al. |
| 2006/0132404 A1 | 6/2006 | Hayes et al. |
| 2006/0139734 A1 | 6/2006 | Selebrede et al. |
| 2006/0146389 A1 | 7/2006 | Selbrede |
| 2006/0172745 A1 | 8/2006 | Knowles |
| 2006/0238443 A1 | 10/2006 | Derichs |
| 2006/0262060 A1 | 11/2006 | Amundson |
| 2006/0262380 A1 | 11/2006 | Miles |
| 2006/0268386 A1 | 11/2006 | Selbrede et al. |
| 2006/0270179 A1 | 11/2006 | Yang |
| 2006/0291034 A1 | 12/2006 | Patry et al. |
| 2007/0002413 A1 | 1/2007 | Psaltis et al. |
| 2007/0031097 A1 | 2/2007 | Heikenfeld et al. |
| 2007/0035808 A1 | 2/2007 | Amundson et al. |
| 2007/0040982 A1 | 2/2007 | Nakano et al. |
| 2007/0047051 A1 | 3/2007 | Selbrede et al. |
| 2007/0047887 A1 | 3/2007 | Selbrede |
| 2007/0052660 A1 | 3/2007 | Montbach et al. |
| 2007/0053652 A1 | 3/2007 | Mignard et al. |
| 2007/0091011 A1 | 4/2007 | Selbrede |

| | | | |
|---|---|---|---|
| 2007/0150813 | A1 | 6/2007 | Selebrede et al. |
| 2007/0172171 | A1 | 7/2007 | Van Ostrand et al. |

FOREIGN PATENT DOCUMENTS

| | | | |
|---|---|---|---|
| EP | 0 415 625 | A2 | 3/1991 |
| EP | 0 359 450 | B1 | 11/1994 |
| EP | 0 495 273 | B1 | 9/1996 |
| EP | 0 415 625 | B1 | 1/1997 |
| EP | 0 751 340 | A2 | 1/1997 |
| EP | 0 884 525 | A2 | 12/1998 |
| EP | 0 751 340 | B1 | 5/2000 |
| EP | 1 202 096 | A2 | 5/2002 |
| EP | 1 426 190 | A1 | 6/2004 |
| FR | 2 726 135 | A | 10/1994 |
| JP | 03-142409 | | 6/1991 |
| JP | 04-249203 | | 9/1992 |
| JP | 09-198906 | | 7/1997 |
| JP | 11-015393 | | 1/1999 |
| JP | 2002-318564 | A | 10/2002 |
| JP | 2003-162904 | | 6/2003 |
| WO | WO 94/01716 | | 1/1994 |
| WO | WO 98/04950 | | 2/1998 |
| WO | WO 99/01696 | | 1/1999 |
| WO | WO 00/50807 | | 8/2000 |
| WO | WO 03/008860 | A1 | 1/2003 |
| WO | WO 03/050448 | A1 | 7/2003 |
| WO | WO 03/061329 | A2 | 7/2003 |
| WO | WO 2004/019120 | A1 | 3/2004 |
| WO | WO 2004/086098 | A2 | 10/2004 |
| WO | WO 2005/001892 | A2 | 1/2005 |
| WO | WO 2005/062908 | A2 | 7/2005 |
| WO | WO-2006017129 | | 2/2006 |
| WO | WO 2006/023077 | A2 | 3/2006 |
| WO | WO 2006/039315 | A2 | 4/2006 |
| WO | WO 2006/052755 | A2 | 5/2006 |

OTHER PUBLICATIONS

A. Kunzman and G. Pettitt, "White Enhancement for Color Sequencial DLP" Society for Information Display, Digest of Technical Papers 1998.
B. J. Feenstra et al. "Reflective Display Based on Electrowetting: Principle and Properties", International Display Research Conference Proceedings 2003, p. 322.
Chino et al. "Development of Wide-Color-Garnut Mobile Displays with Four-Primary-Color LCDs", Society of Information Display, Digest of Technical Papers 2006, p. 1221.
D. Doherty et al. "Pulse Width Modulation Control of DLP Projectors", TI Technical Journal 1998, No. 3, p. 115.
E. Saeedi, et al. "Molten-Alloy Driven Self-Assembly for Nano and Micro Scale System Integration" Fluid Dynamics and Materials Processing v. 2, p. 221 (2006).
J. Bergquist et al. "Field Sequential Colour Display with Adaptive Gamut", Society for Information Display, Digest of Technical Papers 2006, p. 1594.
J. Heikenfeld et al. "Contrast Enhancement in Black Dielectric Electroluminescent Devices", IEEE Transactions on Electron Devices, v. 49, p. 1348 (2002).
K-C Lee et al. "Integrated Amorphous Silicon Color Sensor on LCD Panel for LED Backlight Feedback Control System", Society for Information Display, Digest of Technical Papers 2005, p. 1376.
Legtenberg et al, "Electrostatic Curved Electrode Actuators," Journal of Microelectromechanical Systems, 6:3(257-265)(Sep. 1997).
Q. Tan and Y.C. Lee, "Soldering Technology for Optoelectronics Packaging", 1996 Electronic Components and Technology Conference, p. 26.
S. Pasricha et. al. "Dynamic Backlight Adaptation for Low Power Handheld Devices" IEEE Design and Test v. 21, p. 398 (2004).
Shibaura Mechatronics Corporation, Product Brochure for Panel Processing.
T. van de Biggelaar, et al. "Passive and Active Matrix Addressed Polymer Light-emitting Diode Displays", Proc. SPIE vol. 4295, p. 134 (2001).

Wang et al, "Highly Space-Efficient Electrostatic Zigzag Transmissive Micro-Optic Switches for an Integrated MEMS Optical Display System,".
Yasumura et al. "Fluid Damping of an Electrostatic Actuator for Optical Switching Applications," Transducters Research Foundation (2002).
Lee et al, "P-25: A LCOS Microdisplay Driver with Frame Buffering Pixels," SID 02 Digest, 292-295(2002).
McLaughlin, "Progress in Projection and Large-Area Displays," Proceedings of the IEEE, 90(4):521-532(Apr. 2002).
Sato, "Research on Flexible Display Systems," Broadcast Technology, 21:10-15(2005).
Doane, et al, "Display Technologies in Russia, Ukraine, and Belarus," World Technology Evaluation Center Panel Report (Dec. 1994).
Kuang et al, "Dynamic Characteristics of shaped micro-actuators solved using the differential quadrature method," J. Micromech. Microeng. 14:647-655(2004).
Li et al, "Drie-Fabricated Curved-Electrode Zipping Actuators with Low Pull-In Voltage,"IEE, 480-483 (2003).
Perregaux et al, "Arrays of Addressable High-Speed Optical Microshutters," CSEM Swiss Center for Electronics and Microtechnology Inc., Microsystems Division.
Steyn, Lodewyck, "Electroquasistatic Zipper Acuators: A Technology Review," Dec. 2004.
Okumura et al, "Highly-efficient backlight for liquid crystal display having no optical films," Applied Physics Letters, 83(13):2515-2517(Sep. 2003).
Feng et al, "Novel integrated light-guide plates for liquid crystal display backlight," J. Opt. A: Pure Appl. Opt., 7:111-117(2005).
Funamoto et al, "Diffusive-sheetless Backlight System for Mobile Phone,"IDW/AD, 1277-1280(2005).
Kalantar et al, "Optical Micro Deflector Based Functional Light-Guide Plate for Backlight Unit," SID 00 Digest, 1029-1031(2000).
"Optical Design Tools for Backlight Displays," Optical Research Associates, 1-8.
Sony ACX705AKM, 6.92cm Diagonal Reflective Color LCD Module.
Low-Temperature Polysilicon TFT Reflective Color LCD by Techno World.
AZ Display, Inc. Complete LCD Solutions, ATM3224C-NC-FTH.
Sharp Specification No. LCP-03015 for Mobile Liquid Crystal Display Group, Sharp Corporation, Jun. 13, 2003.
Perregaux et al, "Arrays of Addressebal High-Speed Optical Microshutters," IEEE, 232-235, (2001).
Tien et al, "MEMS Actuators for Silicon Micro-Optical Elements," Proc. of SPIE, 4178:256-269, (2000).
"Two Propietary Technologies Supporting OMRON Backlight," OMRON Electronics Corporation, OMRON Electronics Components Web, www.omron.co.ip.ecb/products/bklight/english/genri/index.html.
"MicroLens™. Re-Inverting LCD Backlighting," Global Lighting Technologies Inc., http://www.glthome.com/tech.htm, 1-2.
"Prism Brightness Enhancement Films," 3M Corporation, http://products3.3m.com/catalog/us/en001/electronics_mfg/vikuiti/node_V6G78RBQ5Tbe/root_GST1T4S9TCgv/vroot_S6Q2FD9X0Jge/gvel_GD378D0HGJgl/theme_us_vikuiti_3_0/command_AbcPageHandler/output_html Retrieved on Aug. 3, 2006.
"BLU," Heesung Precision Ltd., http://www.hspr.co.kr/eng/product/blu.asp Retrieved on Aug. 3, 2006.
Teijido, J.M., "Conception and Design of Illumination Light Pipes, " Thesis No. 1498 for University of Neuchatel, http://www.unige.ch/cyberdocuments/unine/theses2000/TeijidoJM/these_front.htm. 1:1-99 Retrieved on Aug. 3, 2006.
"Prisim Sheet," Mitsubishi Rayon America Inc., http://www.mrany.com/data/HTML/29.htm Retrieved on Aug. 4, 2006.
Liu et al, "Scaling Laws of Microactuators and Potential Applications of Electroactive Polymers in MEMS," SPIE, 3669:345-354(Mar. 1999).
Vangbo et al, "A Lateral symmetrically bistable buckled beam," J. Micromech. Microeng., 8:29-32(1998).

Shikida et al, "Fabrication fo an S-shaped Microactuator," Journal of Microelectromechanical Systems, 6(1):18-24(Mar. 18-24, 1997).

Qui et al, "A High-Current Electrothermal Bistable MEMS Relay,".

Qiu et al, "A Curved-Beam Bistable Mechanism," Journal of Microelectromechanical Systems, 13(2):137-145(Apr. 2004).

Underwood, "LCoS through the looking glass," SID(2001).

Clark et al, "FLC Microdisplays," Ferroelectrics, 246:97-110(2000).

Boeuf, "Plasma display panels: physics, recent developments and key issues," J. Phys. D: Appl. Phys., 36:R53-R79(2003).

Hornbeck, "Digital Light Processing™: A New MEMS-Based Display Technology," Texas Instruments.

Yamada et al, "52.2: Invited Paper:Color Sequential LCD Based on OCB with an LED Backlight," SID 00 Digest, 1180-1183(2000).

Jepsen et al, "4.11: 0.9" SXGA Liquid Crystal on Silicon Panel with 450 Hz. Field Rate, MicroDisplay Coropration, 106-109.

Birch et al, "31.1: SXGA Resolution FLC Microdisplays," SID 02 Digest, 954-957(2002).

Koden et al, "Ferroelectric Liquid Crystal Display," (Sep. 17, 1997).

Jones et al, "29-1: Addressing τVmin Ferroelectric Liquid Crystal Displays," (1998).

Akimoto et al, "15.1: A 0.9-in UXGA/HDTV FLC Microdisplay," SID 00 Digest, 194-197(2000).

Bryan-Brown, "Ultra Low Poer Bistable LCDs," SID 00, 76-79(2000).

Hewlett et al, "DLP Cinema™ projection: A hybrid frame-rate technique for flicker-free performance," Journ of the SID 9/3, 221-226(2001).

Underwood, "A review of microdisplay technologies," SID@EID, (Nov. 21 to 23, 2000).

Blackstone, "Making MEMS Reliable, " SPIE's OEMagazine, 32-34(Sep 2002).

Mastrangelo et al, "Mechanical Stability and Adhesion of Microstructures Under Capillary Forces—Part I: Basic Theory," Journal of Microelectromechanical Systems, 2(1):33-43(Mar. 1993).

Mastrangelo et al, "Mechanical Stability and Adhesion of Microstructures Under Capillary Forces—Part II: Experiments," Journal of Microelectromechanical Systems, 2(1):44-55(Mar. 1993).

Johnstone et al, "Theoretical limits on the freestanding length of cantilevers produced by surface micromachining technology," J. Micromech. Microeng. 12:855-861(2002).

Maboudian et al, "Stiction reduction processes for surface micromachines," Tribology Letters, 3:215-221(1997).

"Electronic Display Lighting Tutorials," 3M Corporation,file?//D:/Optical/\Vikuiti Tutorial.htm. retrieved on Aug. 10, 2006.

Roosendaal et al, "25.2: A Wide Gamut,, High Aperture Mobile Spectrum Sequential Liquid Crystal Display," SID 05 Digest, 1116-1119(2005).

Feng, "High Quality Light Guide Plates that Can Control the Illumination Angle Based on Microprism Structrures," Applied Physics Letters, 85(24):6016-6018(Dec. 2004).

Tagaya et al, "Thin Liquid-Crystal Display Backlight System with Highly Scattering Optical Transmission Polymers," Applied Optics, 40(34):6274-6280(Dec. 2001).

Davis, "Light Emitting Diode Source Modeling for Optical Design," Reflexite Display Optics(Oct. 2004).

Foley, "NE04-21: Microstructured Plastic Optics for Display, Lighting, and Telecommunications Applications," Fresnel Optics(2001).

"Microprism Technology for Liminaires," Reflexite Display Optics.

Davis, "Micrstructured Optics for LED Applications," Reflexite Display Optics.

Alt et al, "A Gray-Scale Addressing Technique for Thin-Film-Transistor/Liquid Crystal Displays," IBM J. Res. Develop., 36(1):11-22(Jan. 1992).

Takatori et al, "6.3 Field-Sequential Smectic LCD with TFT Pixel Amplifier," SID 01 Digest, 48-51(2001).

Hartman, "4.1: Invited paper: Two-Terminal Devices Technologies for AMLCDs," SID 95, Digest, 7-10(1995).

Bozler et al, "Arrays of gated field-emitter cones having 0.32 μm tip-to-tip spacing," J. Vac. Sci. Technol. B, 12(2):629-632(Mar./Apr. 1994).

Goddhue et al, "Bright-field analysis of field-emission cones using high-resolution transmission electron microscopy and the effect of structural properties on current stability," J. Vac. Sci. Technol. B, 12(2):693-696(Mar.Apr. 1994).

Liang et al. "Observation of electric field gradients near field-emission cathrode arrays," Appl Phys. Lett., 66(9):1147-1149(Feb. 1995).

Kalantar, "Modulation of viewing angle on an LCD surface through backlight optics," Journal of the SID, 11(4):647-652(2003).

Den Boer, "Active Matrix Liquid Crystal Displays," Elsevier Science & Technology Books, ISBN #0750678135, Aug. 2005.

Legtenberg et al, "Electrostatic Curved Electrode Actuators," Journal of Microelectromechanical Systems, 6:3(257-265)(Sep. 1997).

Ravkilde et al, "Fabrication of Nickel Microshutter Arrays for Spatial Light Modulation".

Wang et al, "Highly Space-Efficient Electrostatic Zigzag Transmissive Micro-Optic Switches for an Integrated MEMS Optical Display System,".

Yasumura et al, "Fluid Damping of an Electrostatic Actuator for Optical Switching Applications," Transducers Research Foundation (2002).

Feenstra et al, "Electrowetting Displays," Liquavista BV, http://www.liquavista.com/documents/electrowetting_displays_white paper.pdf, Retrieved on Aug. 17, 2006.

Den Boer, "Active Matrix Liquid Crystal Displays," Elsevier Science & Technology Books, ISBN #0750678135, Aug. 2005.

Judy, M. W., "Micromechanisms Using Sidewall Beams," Dissertation 1994.

* cited by examiner

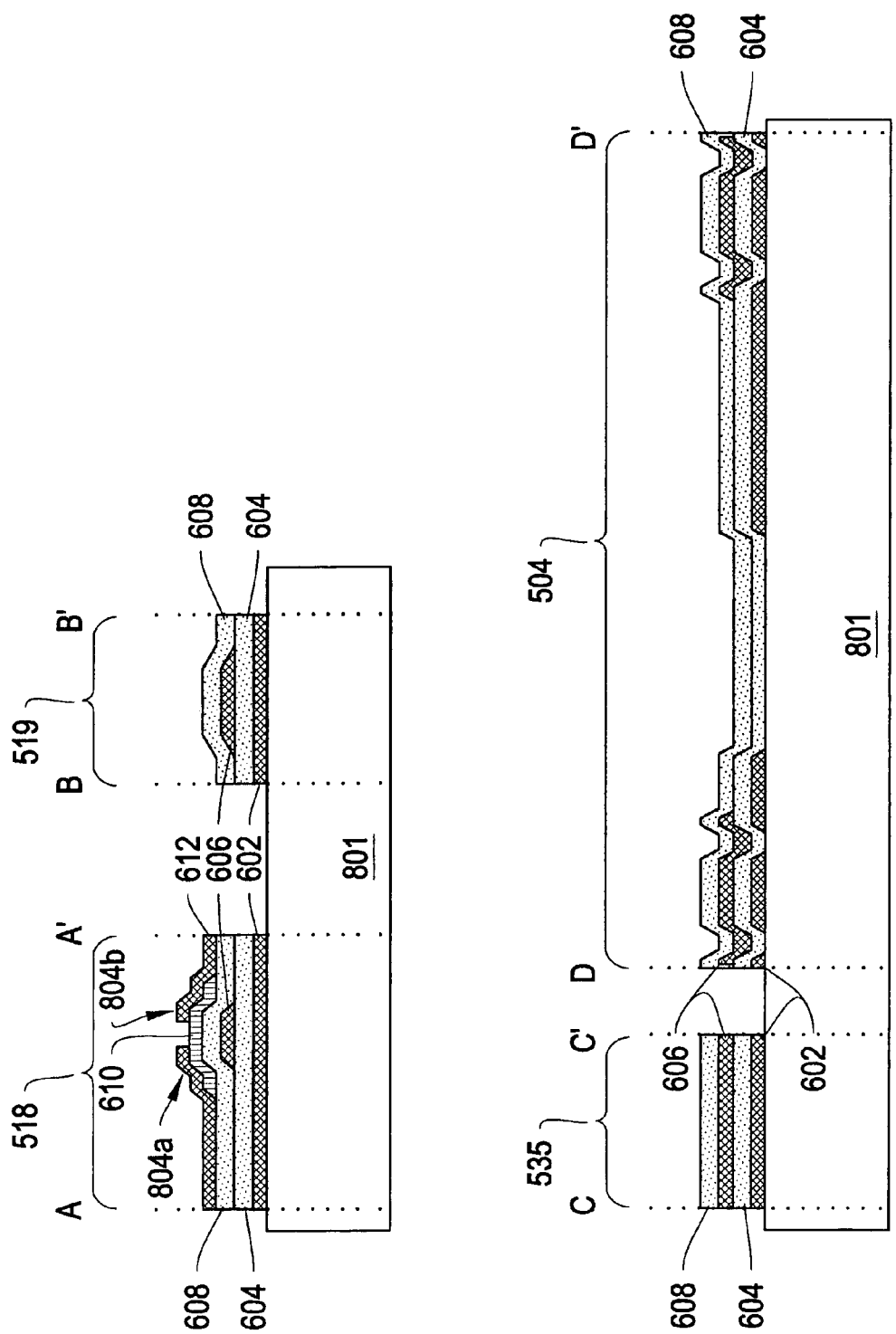

DISPLAY APPARATUS AND METHODS FOR MANUFACTURE THEREOF

CROSS-REFERENCE TO RELATED APPLICATIONS

The instant application claims priority from Provisional Application No. 60/655,827, filed Feb. 23, 2005 and Provisional Application No. 60/676,053, filed Apr. 29, 2005, the disclosures of which are incorporated herein by reference in their entirety. This application is a continuation-in-part of patent application Ser. No. 11/251,035, filed Oct. 14, 2005 now U.S. Pat. No. 7,271,945, patent application Ser. No. 11/218,690 filed Sep. 2, 2005 and patent application Ser. No. 11/326,696 filed Jan. 6, 2006, the disclosures of all of which are incorporated herein by reference in their entirety.

FIELD OF THE INVENTION

In general, the invention relates to the field of imaging displays, in particular, the invention relates to MEMS-based displays and the manufacture thereof.

BACKGROUND OF THE INVENTION

Displays built from mechanical light modulators are an attractive alternative to displays based on liquid crystal technology. Mechanical light modulators are fast enough to display video content with good viewing angles and with a wide range of color and grey scale. Mechanical light modulators have been successful in projection display applications. Backlit displays using mechanical light modulators have not yet demonstrated sufficiently attractive combinations of brightness and low power. There is a need in the art for fast, bright, low-powered mechanically actuated displays. Specifically there is a need for mechanically actuated displays that can be driven at high speeds and at low voltages for improved image quality and reduced power consumption.

In addition, a significant manufacturing industry has developed around the manufacturing of liquid crystal displays. Typical MEMS manufacturing techniques, however, are often incompatible with the processes used by the liquid crystal display industry in manufacturing the thin-film components used to control liquid crystal displays. To take advantage of the capital already invested in the display manufacturing industry, there is a need in the art, for methods of manufacturing MEMS-based displays that are compatible with of the processes used for liquid crystal display manufacturing.

SUMMARY OF THE INVENTION

In one aspect, the invention relates to methods for manufacturing actuators utilized in MEMS-based light modulators which incorporate shutters supported over a substrate by mechanical beams. In particular the method includes forming a mold on a substrate, wherein the mold includes a lower horizontal surface, an upper horizontal surface and a wall. Beam material is then deposited on the lower horizontal surface and the wall of the mold. Next, beam material deposited on the lower horizontal surface of the mold is removed, for example, via an anisotropic etch, while the majority of the beam material deposited on the wall of the mold is left intact, forming a compliant beam.

A shutter is formed coupled to the compliant beam. In one implementation, the compliant beam and the shutter material are formed of the same material in one step. In alternative implementations, the beam material is different from the shutter material. The shutter is formed on the upper horizontal surface of the mold. The shutter material and/or the beam material may include a composite of materials, including, for example, amorphous silicon and a metal. The formation of the composite may yield an unbalanced stress on the resulting beam due to, for example, different coefficients of expansion of the various layers of material in the composite.

The beam material, in one embodiment, also couples the beam, mechanically and electrically to an anchor disposed on the substrate. The beam material may be deposited, for example to a thickness of less than about 2 microns. In various embodiments, the beam material is deposited to thicknesses of less than about 1.5 microns or even less than about 1 μm. After the compliant beam and the shutter are formed, the mold is removed, freeing the shutter and the compliant beam to move.

In one embodiment, the lower horizontal surface of the mold is formed from the top of a first sacrificial layer. The mold wall may be formed from a second sacrificial layer and is substantially normal to the lower horizontal surface. Removing the mold, in one embodiment, includes removing one or both of the sacrificial layers.

In another aspect, the invention relates to spatial light modulators with thin actuator beams, yielding a increased compliance resulting in requiring less power for actuation. In one embodiment, the actuator beams suspend a shutter over a substrate. The actuator beams are compliant have a cross-sectional thickness in a dimension parallel to the plane of the substrate of less than about 2 microns. In other embodiments, the cross-sectional thickness is less than about 1.5 microns or less than about 1.0 microns.

In a further aspect, the invention relates to a method of manufacturing a display. The method includes depositing a layer of a dielectric material directly on top of a substantially transparent substrate followed by depositing a layer of metal directly on top of the dielectric material. A plurality of apertures are formed in the layer of metal. The method includes forming a control matrix on top of the metal layer and a plurality of light modulating shutter assemblies on top of and in electrical communication with the control matrix.

The control matrix controls the light modulation functionality of the plurality of shutter assemblies. The control matrix, in one embodiment, includes a plurality of thin film components. In particular, the thin-film components can be switches in the form of transistors or diodes.

In another aspect, the invention relates to a similar method of manufacturing a display device in which a second dielectric layer is deposited between the first dielectric layer and the layer of metal. In one embodiment, the second dielectric material has a refractive index lower than that of the first dielectric material.

In still another aspect, the invention relates to a method of manufacturing a display device in which a high-reflectance layer is deposited on a substantially transparent glass substrate. The method also includes forming a plurality of apertures in the high-reflectance layer. An insulating layer is deposited directly on top of the high-reflectance layer, followed by the forming of a plurality of thin-film components on the insulating layer. Then, the method includes forming a plurality of light-modulating shutter assemblies above, and in electrical communication with, the plurality of thin film components such that the thin-film components form a control matrix for controlling the light modulation of the plurality of light-modulating shutter assemblies.

In one embodiment, the high-reflectance layer has a reflectance of greater than 90%. It can be formed, for example, from a composite layer of at least one metal and at least one dielectric. Alternatively, it can be formed from a densely deposited metal. The metal is deposited, in various embodiments by a sputter process or by an ion assisted evaporation process.

In one embodiment, the method also includes forming a plurality of via holes in the insulating layer before the thin film components are formed. The thin-film components, when formed, make electrical connections to the high reflectance layer at the via holes.

In another aspect, the invention relates to a similar method of manufacture in which a light blocking layer is deposited on the transparent substrate instead of a high-reflectance layer. The light-blocking layer, in various implementations, may be highly reflective, it may be light absorbing, or it may block light in other ways. In one embodiment, the light blocking layer absorbs light impacting one side of the light blocking layer and reflects light impacting on the opposite side of the light blocking layer.

In an additional aspect, the invention relates to a method of manufacturing a display device by forming a plurality of thin-film components and forming a plurality of light modulating shutter assemblies on top of the thin film components. The light modulating shutter assemblies are formed, in part, by etching a layer of amorphous silicon to form at least a portion of the movable shutters included in the assemblies for modulating light.

BRIEF DESCRIPTION OF THE DRAWINGS

The foregoing discussion will be understood more readily from the following detailed description of the invention with reference to the following drawings:

FIGS. 8A-8H are cross sectional views of stages of construction of the control matrix of FIG. 5C, according to an illustrative embodiment of the invention;

DESCRIPTION OF CERTAIN ILLUSTRATIVE EMBODIMENTS

To provide an overall understanding of the invention, certain illustrative embodiments will now be described, including apparatus for displaying images and methods for manufacturing the same. However, it will be understood by one of ordinary skill in the art that the apparatus and methods described herein may be adapted and modified as is appropriate for the application being addressed and that the apparatus and methods described herein may be employed in other suitable applications, and that such other additions and modifications will not depart from the scope hereof.

Figure 1A:
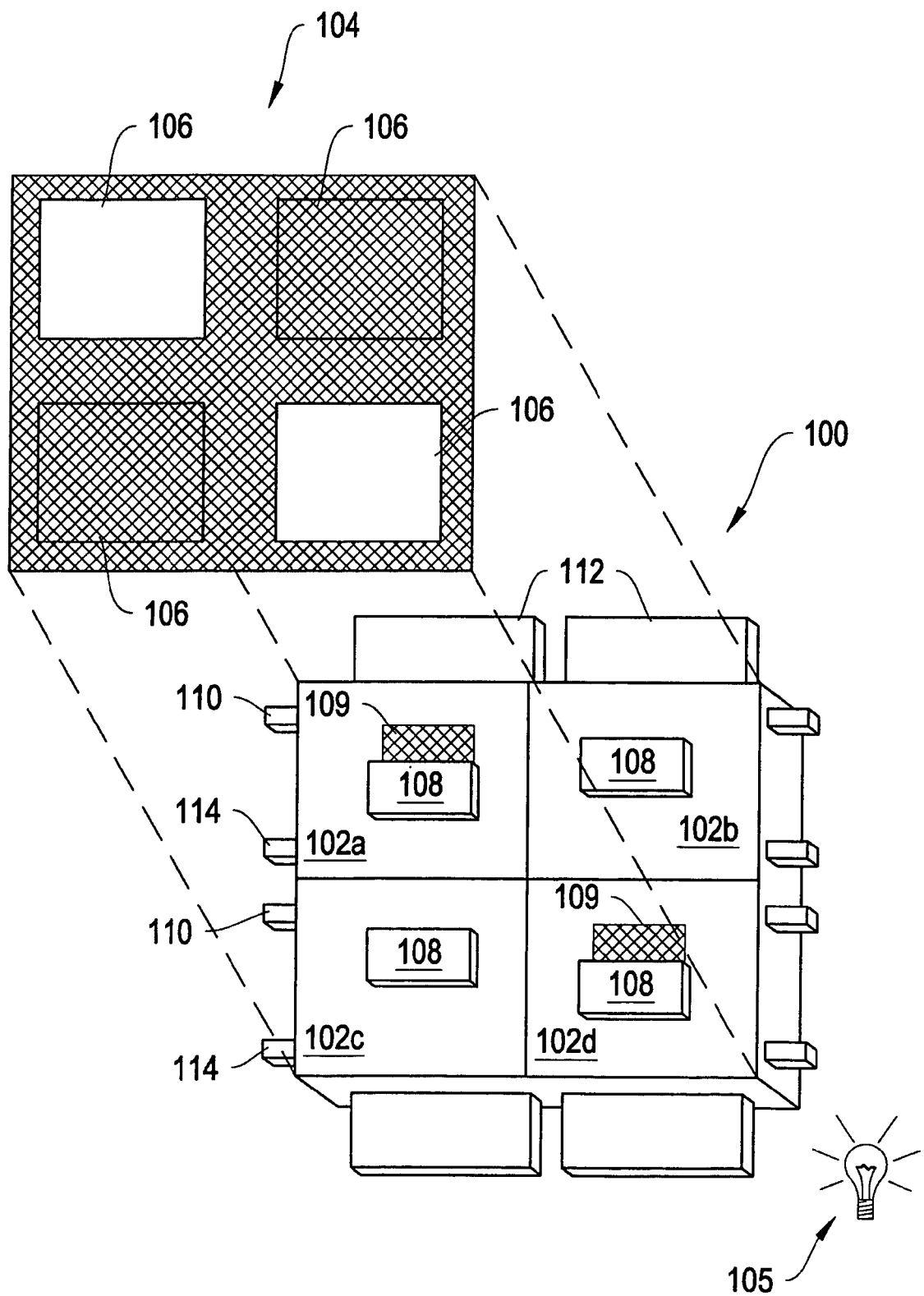
FIG. 1A is an isometric view of display apparatus, according to an illustrative embodiment of the invention.

FIG. 1A is an isometric view of a display apparatus 100, according to an illustrative embodiment of the invention. The display apparatus 100 includes a plurality of light modulators, in particular, a plurality of shutter assemblies 102a-102d (generally "shutter assemblies 102") arranged in rows and columns. In the display apparatus 100, shutter assemblies 102a and 102d are in the open state, allowing light to pass. Shutter assemblies 102b and 102c are in the closed state, obstructing the passage of light. By selectively setting the states of the shutter assemblies 102a-102d, the display apparatus 100 can be utilized to form an image 104 for a projection or backlit display, if illuminated by lamp 105. In another implementation the apparatus 100 may form an image by reflection of ambient light originating from the front of the apparatus.

In the display apparatus 100, each shutter assembly 102 corresponds to a pixel 106 in the image 104. In other implementations, the display apparatus 100 may utilize a plurality of shutter assemblies to form a pixel 106 in the image 104. For example, the display apparatus 100 may include three or more color-specific shutter assemblies 102, e.g., red, green and blue; red, green, blue and white; or cyan, magenta and yellow, etc. By selectively opening one or more of the color-specific shutter assemblies 102 corresponding to a particular pixel 106, the display apparatus 100 can generate a color pixel 106 in the image 104. In another example, the display apparatus 100 includes two or more shutter assemblies 102 per pixel 106 to provide grayscale in an image 104. With respect to an image, a "pixel" corresponds to the smallest picture element defined by the resolution of an image. With respect to structural components of the display apparatus 100, the term "pixel" refers to the combined mechanical and electrical components utilized to modulate the light that forms a single pixel of an image.

Each shutter assembly 102 includes a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each shutter assembly 102.

The display apparatus also includes a control matrix connected to the substrate and to the shutter assemblies for controlling the movement of the shutters. The control matrix includes a series of electrical interconnects (e.g., interconnects 110, 112, and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{we}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In other implementations, the data voltage pulses control switches, e.g., transistors or other non-linear circuit elements that control the application of separate actuation voltages, which are typically higher in magnitude than the data voltages, to the shutter assemblies 102. The application of these actuation voltages then results in the electrostatic driven movement of the shutters 108.

Figure 1B:
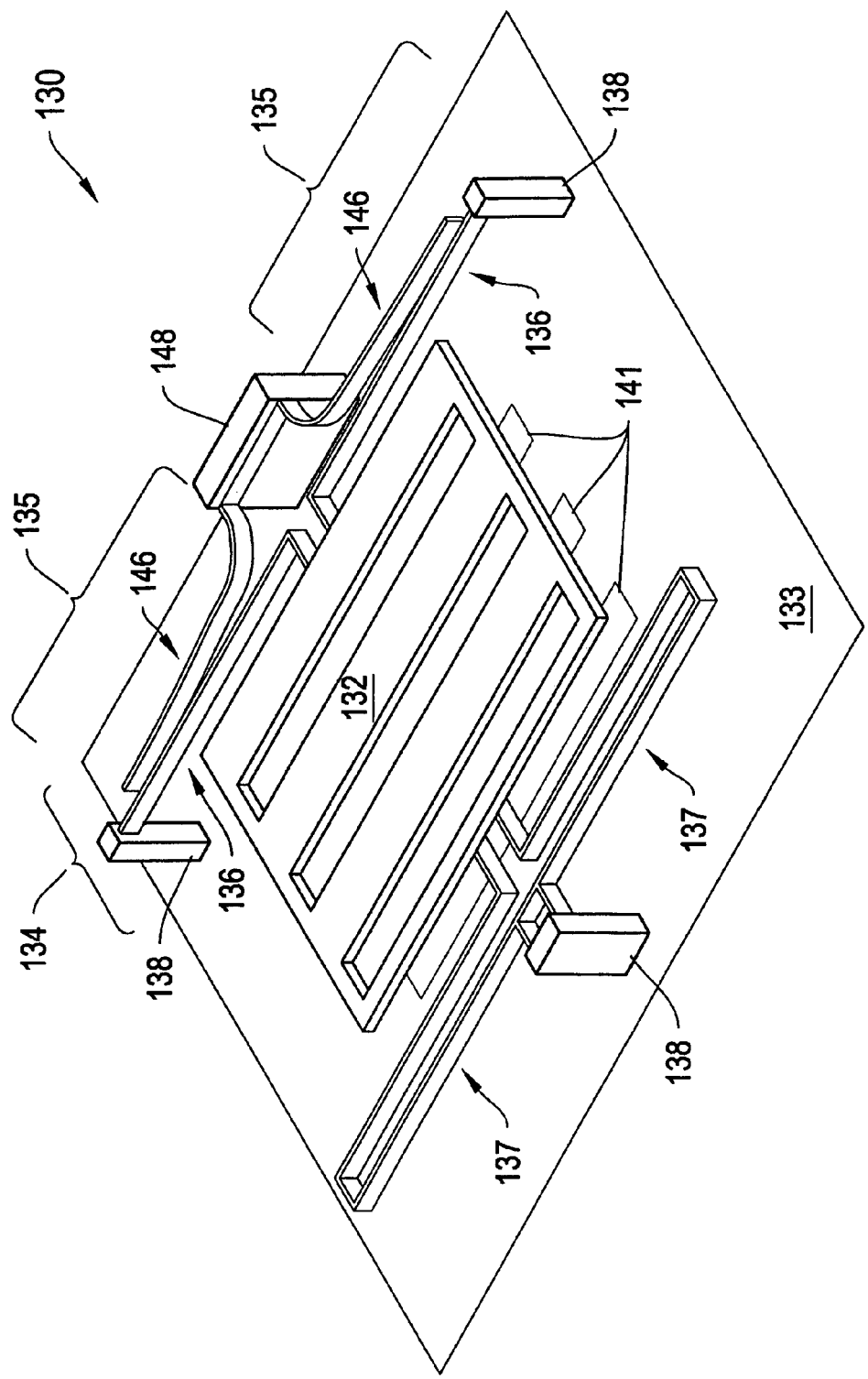
FIG. 1B is diagram of an illustrative shutter assembly suitable for incorporation into the display apparatus of FIG. 1A.

FIG. 1B is diagram of an illustrative shutter assembly 130 suitable for incorporation into the display apparatus 100 of FIG. 1A. The shutter assembly 130 includes a shutter 132 coupled to an actuator 134. The actuator 134 is formed from two separate compliant electrode beam actuators 135 (the "actuators 135"), as described in U.S. patent application Ser. No. 11/251,035, filed on Oct. 14, 2005. The shutter 132 couples on one side to the actuators 135. The actuators 135 move the shutter 132 transversely over a surface 133 in a plane of motion which is substantially parallel to the surface 133. The opposite side of the shutter 132 couples to a spring 137 which provides a restoring force opposing the forces exerted by the actuator 134.

Each actuator 135 includes a compliant load beam 136 connecting the shutter 132 to a load anchor 138. The load anchors 138 along with the compliant load beams 136 serve as mechanical supports, keeping the shutter 132 suspended proximate to the surface 133. The surface includes one or more aperture holes 141 for admitting the passage of light. The load anchors 138 physically connect the compliant load beams 136 and the shutter 132 to the surface 133 and electrically connect the load beams 136 to a bias voltage, in some instances, ground.

If the substrate is opaque, such as silicon, then aperture holes 141 are formed in the substrate by etching an array of holes through the substrate 204. If the substrate 204 is transparent, such as glass or plastic, then the first step of the processing sequence involves depositing a light blocking layer onto the substrate and etching the light blocking layer into an array of holes 141. The aperture holes 141 can be generally circular, elliptical, polygonal, serpentine, or irregular in shape.

Each actuator 135 also includes a compliant drive beam 146 positioned adjacent to each load beam 136. The drive beams 146 couple at one end to a drive beam anchor 148 shared between the drive beams 146. The other end of each drive beam 146 is free to move. Each drive beam 146 is curved such that it is closest to the load beam 136 near the free end of the drive beam 146 and the anchored end of the load beam 136.

In operation, a display apparatus incorporating the shutter assembly 130 applies an electric potential to the drive beams 146 via the drive beam anchor 148. A second electric potential may be applied to the load beams 136. The resulting potential difference between the drive beams 146 and the load beams 136 pulls the free ends of the drive beams 146 towards the anchored ends of the load beams 136, and pulls the shutter ends of the load beams 136 toward the anchored ends of the drive beams 146, thereby driving the shutter 132 transversely towards the drive anchor 148. The compliant members 136 act as springs, such that when the voltage across the beams 136 and 146 potential is removed, the load beams 136 push the shutter 132 back into its initial position, releasing the stress stored in the load beams 136.

A shutter assembly, such as shutter assembly 130, incorporates a passive restoring force, such as a spring, for returning a shutter to its rest position after voltages have been removed. Other shutter assemblies, as described in U.S. patent application Ser. Nos. 11/251,035 and 11/326,696, and as illustrated in FIG. 5, incorporate a dual set of "open" and "closed" actuators and a separate sets of "open" and "closed" electrodes for moving the shutter into either an open or a closed state.

U.S. patent application Ser. Nos. 11/251,035 and 11/326, 696 have described a variety of methods by which an array of shutters and apertures can be controlled via a control matrix to produce images, in many cases moving images, with appropriate gray scale. In some cases control is accomplished by means of a passive matrix array of row and column interconnects connected to driver circuits on the periphery of the display. In other cases it is appropriate to include switching and/or data storage elements within each pixel of the array (the so-called active matrix) to improve either the speed, the gray scale and/or the power dissipation performance of the display.

Figure 2A:
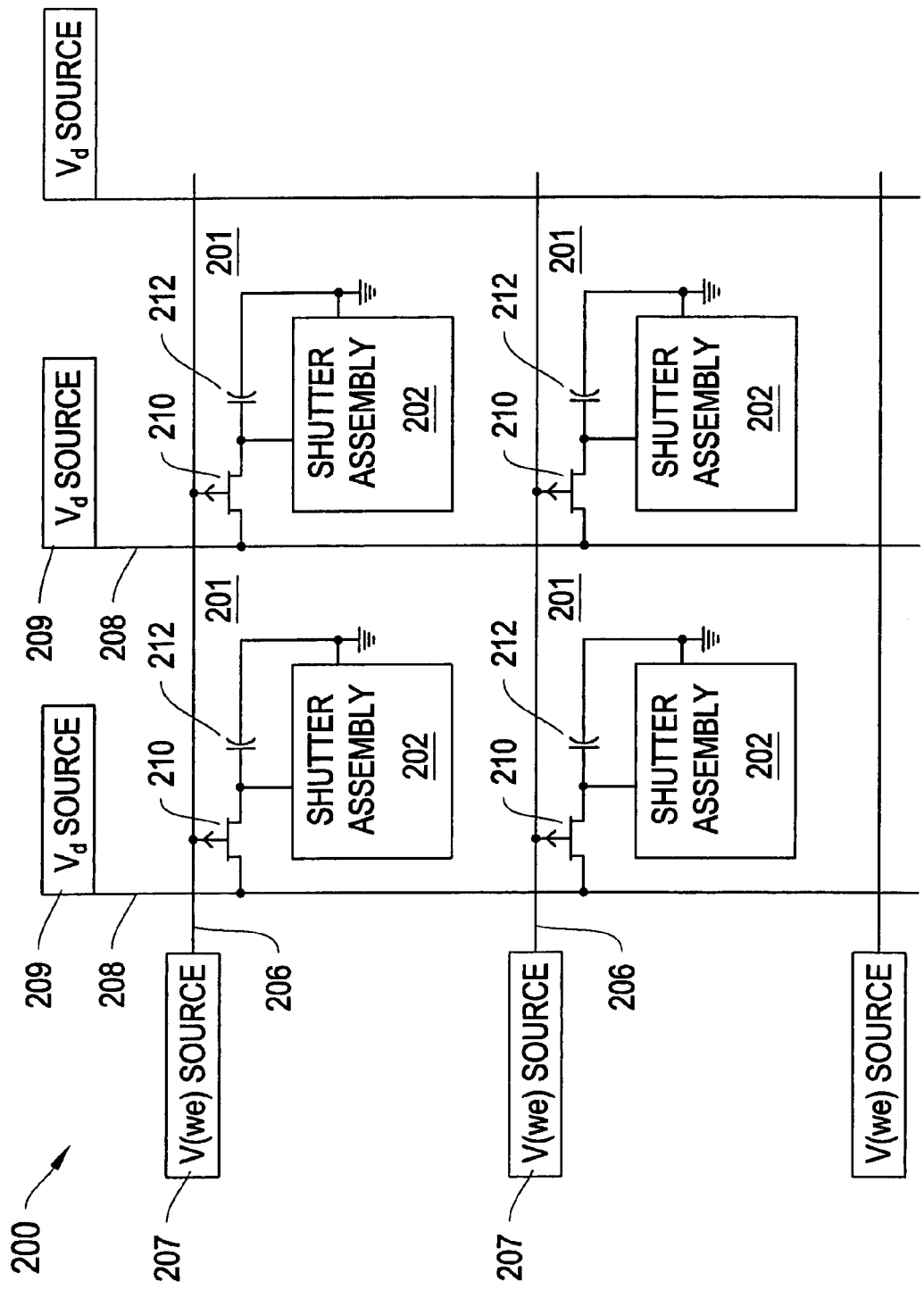
FIG. 2A is a schematic diagram of a control matrix suitable for controlling the shutter assemblies of the display apparatus of FIG. 1, according to an illustrative embodiment of the invention.

FIG. 2A is a conceptual diagram of an active control matrix 200 suitable for inclusion in the display apparatus 100 for addressing an array of pixels 240 (the "array 240"). Each pixel 201 includes an elastic shutter assembly 202, such as the shutter assembly 130 of FIG. 1B, controlled by an actuator 203. Each pixel also includes an aperture layer 250 that includes aperture holes 254. Further electrical and mechanical descriptions of shutter assemblies such as shutter assembly 202, and variations thereon, can be found in U.S. patent application Ser. Nos. 11/251,035 and 11/326,696.

The control matrix 200 is fabricated as a diffused or thin-film-deposited electrical circuit on the surface of a substrate 204 on which the shutter assemblies 202 are formed. The control matrix 200 includes a scan-line interconnect 206 for each row of pixels 201 in the control matrix 200 and a data-interconnect 208 for each column of pixels 201 in the control matrix 200. Each scan-line interconnect 206 electrically connects a write-enabling voltage source 207 to the pixels 201 in a corresponding row of pixels 201. Each data interconnect 208 electrically connects a data voltage source, ("Vd source") 209 to the pixels 201 in a corresponding column of pixels 201. In control matrix 200, the data voltage $V_d$ provides the majority of the energy necessary for actuation of the shutter assemblies 202. Thus, the data voltage source 209 also serves as an actuation voltage source.

Figure 2B:
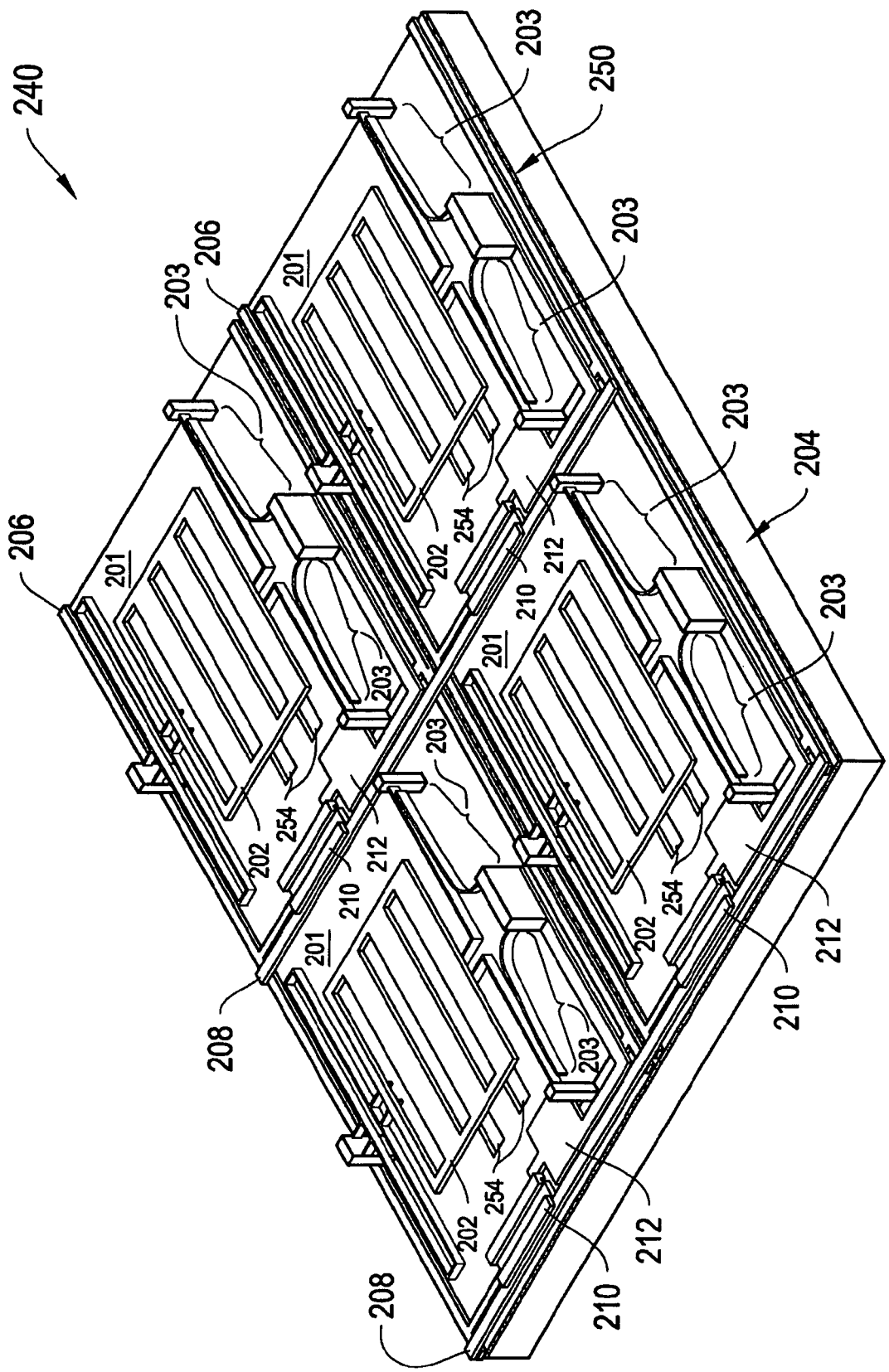
FIG. 2B is an isometric view of an array of pixels incorporating the control matrix of FIG. 2A and the shutter assembly of FIG. 1B, according to an illustrative embodiment of the invention.

FIG. 2B is an isometric view of a portion of the array of pixels 240 including the control matrix 200. Referring to FIGS. 2A and 2B, for each pixel 201 or for each shutter assembly in the array of pixels 240, the control matrix 200 includes a transistor 210 and a capacitor 212. The gate of each transistor 210 is electrically connected to the scan-line interconnect 206 of the row in the array 240 in which the pixel 201 is located. The source of each transistor 210 is electrically connected to its corresponding data interconnect 208. The actuators 203 of each shutter assembly include two electrodes. The drain of each transistor 210 is electrically connected in parallel to one electrode of the corresponding capacitor 212 and to the one of the electrodes of the corresponding actuator 203. The other electrode of the capacitor 212 and the other electrode of the actuator 203 in shutter assembly 202 are connected to a common or ground potential.

In operation, to form an image, the control matrix 200 write-enables each row in the array 240 in sequence by applying $V_{we}$ to each scan-line interconnect 206 in turn. For a write-enabled row, the application of $V_{we}$ to the gates of the transistors 210 of the pixels 201 in the row allows the flow of current through the data interconnects 208 through the transistors to apply a potential to the actuator 203 of the shutter assembly 202. While the row is write-enabled, data voltages $V_d$ are selectively applied to the data interconnects 208. In implementations providing analog gray scale, the data voltage applied to each data interconnect 208 is varied in relation to the desired brightness of the pixel 201 located at the intersection of the write-enabled scan-line interconnect 206 and the data interconnect 208. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 208, the actuator 203 in the corresponding shutter assembly 202 actuates, opening the shutter in that shutter assembly 202. The voltage applied to the data interconnect 208 remains stored in the capacitor 212 of the pixel 201 even after the control matrix 200 ceases to apply $V_{we}$ to a row. It is not necessary, therefore, to wait and hold the voltage $V_{we}$ on a row for times long enough for the shutter assembly 202 to actuate; such actuation can proceed after the write-enabling voltage has been removed from the row. The voltage in the capacitors 212 in a row remain substantially stored until an entire video frame is written, and in some implementations until new data is written to the row.

The pixels 201 of the array 240 are formed on a substrate 204. The array includes an aperture layer 250, disposed on the substrate, which includes a set of aperture holes 254 for each pixel 201 in the array 240. The aperture holes 254 are aligned with the shutter assemblies 202 in each pixel.

In alternative shutter assembly implementations, the shutter assembly together with the actuator can be made bi-stable. That is, the shutters can exist in at least two equilibrium positions (e.g. open or closed) with little or no power required to hold them in either position. More particularly, the shutter assembly can be mechanically bi-stable. Once the shutter of the shutter assembly is set in position, no electrical energy or holding voltage is required to maintain that position. The mechanical stresses on the physical elements of the shutter assembly can hold the shutter in place.

The shutter assembly together with the actuator can also be made electrically bi-stable. In an electrically bi-stable shutter assembly, there exists a range of voltages below the actuation voltage of the shutter assembly, which if applied to a closed actuator (with the shutter being either open or closed), hold the actuator closed and the shutter in position, even if an opposing force is exerted on the shutter. The opposing force may be exerted by a spring, or the opposing force may be exerted by an opposing actuator, such as an "open" or "closed" actuator.

Generalized Process Flow

Figure 3A:
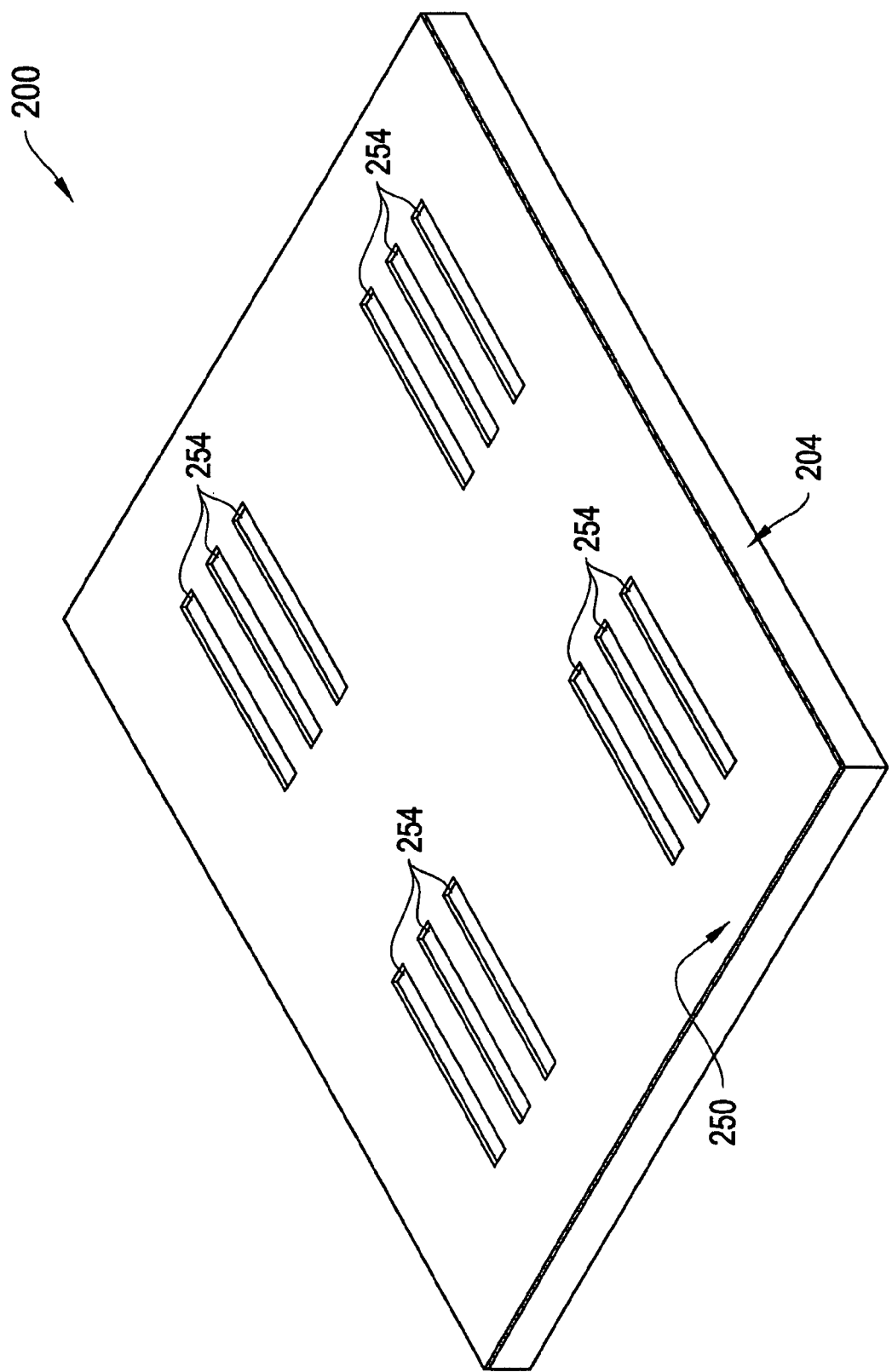
FIGS. 3A-3B are isometric views of stages of construction of the control matrix of FIG. 2B, according to an illustrative embodiment of the invention.
Figure 3B:
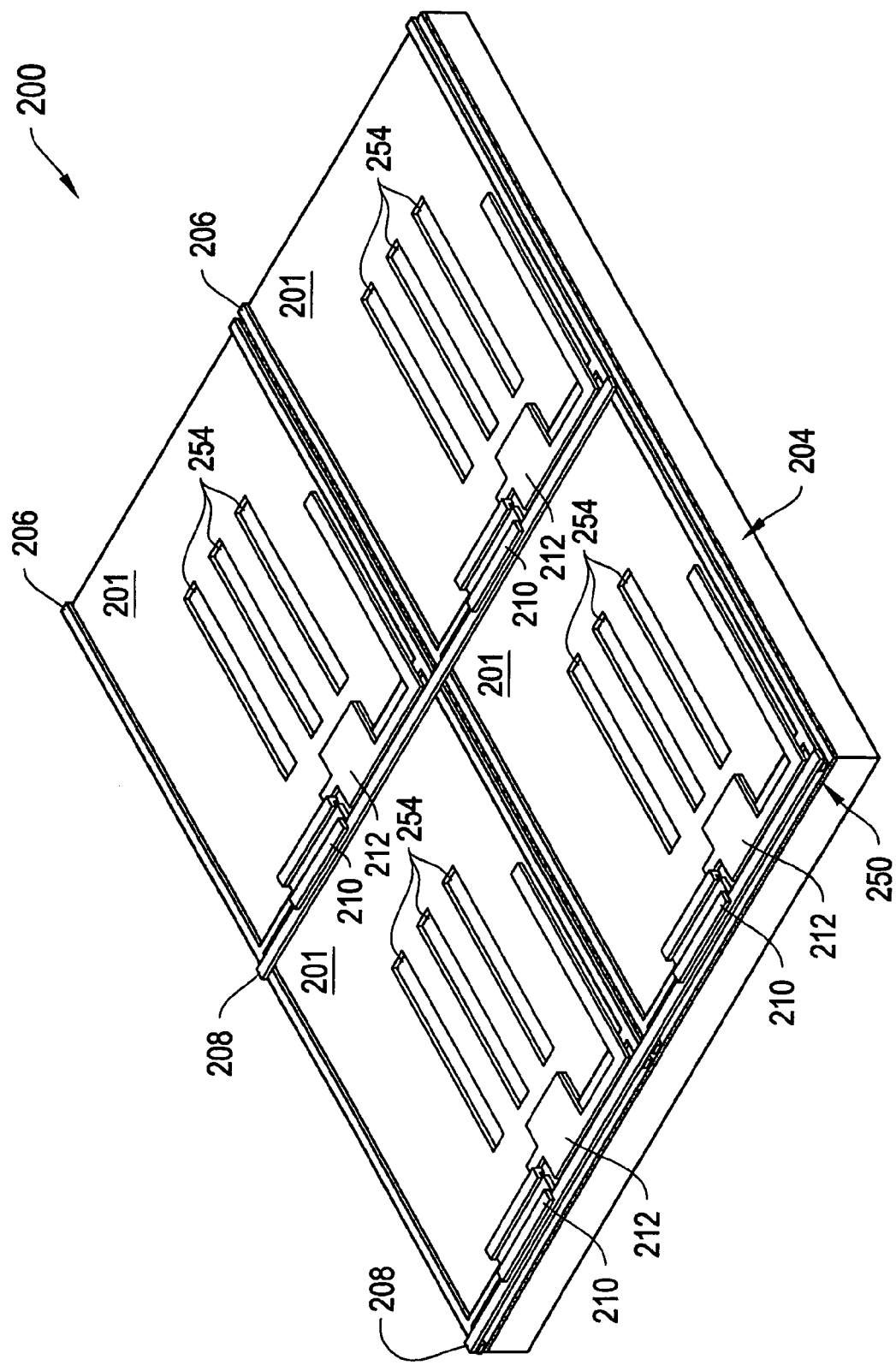

FIGS. 3A and 3B illustrate a first portion of a generalized process flow for fabrication of the pixels 201 of the array 240, according to an illustrative embodiment of the invention. In a first step, as illustrated in FIG. 3A, an aperture layer 250 is deposited and patterned onto a transparent substrate 204. In the second step, illustrated in FIG. 3B, the control matrix, including an array of thin film switches or transistors 210, is fabricated on top of the aperture layer 250 along with capacitors 212 and interconnects, such as scan-line interconnect 206 or data interconnect 208. The processes employed to fabricate the transistors 210 shown in FIG. 3B can be typical of those known in the art for manufacturing active matrix arrays for use in liquid crystal displays. In the final step, the result of which is shown as FIG. 2B, a micro-electro-mechanical (or MEMS) shutter assembly is formed on top of the array of thin film switches.

In one simple implementation, the aperture layer 250 is electrically isolated by an intervening dielectric layer from the control matrix. The aperture layer 250 can consist of thin film materials that are process compatible with the active matrix to be fabricated above it, but need not electrically connect to that active matrix. The aperture holes 254 can be generally circular, elliptical, polygonal, serpentine, or irregular in shape. In some implementations, the fabrication sequence for the second step (the formation of control matrix) need not include any switches, transistors, or capacitors but produces instead a lattice of row and column interconnects, separated by a dielectric layer. Such a control matrix is also referred to as a passive matrix as known in the art, for example, with respect to the fabrication of field emission cathodoluminescent displays.

In other implementations of the display, as will be described with respect to FIG. 17, a separate aperture layer does not need to be fabricated as a first step in the sequence. The aperture holes may be fabricated instead using the same thin film materials and with the same processing steps used in the fabrication of active matrices or passive matrices directly onto glass substrates, as typically known in the art. Only the mask designs or pixel layouts need to be changed to accommodate the formation of aperture holes.

In another implementation, as will be described with respect to FIG. 18, the aperture layer is fabricated as a last step in the processing sequence. The aperture layer is rigidly attached to the substrate but generally suspended above the shutter assembly, leaving room below for the free translational motion of the shutter assembly.

The Aperture Layer

Figure 4A:
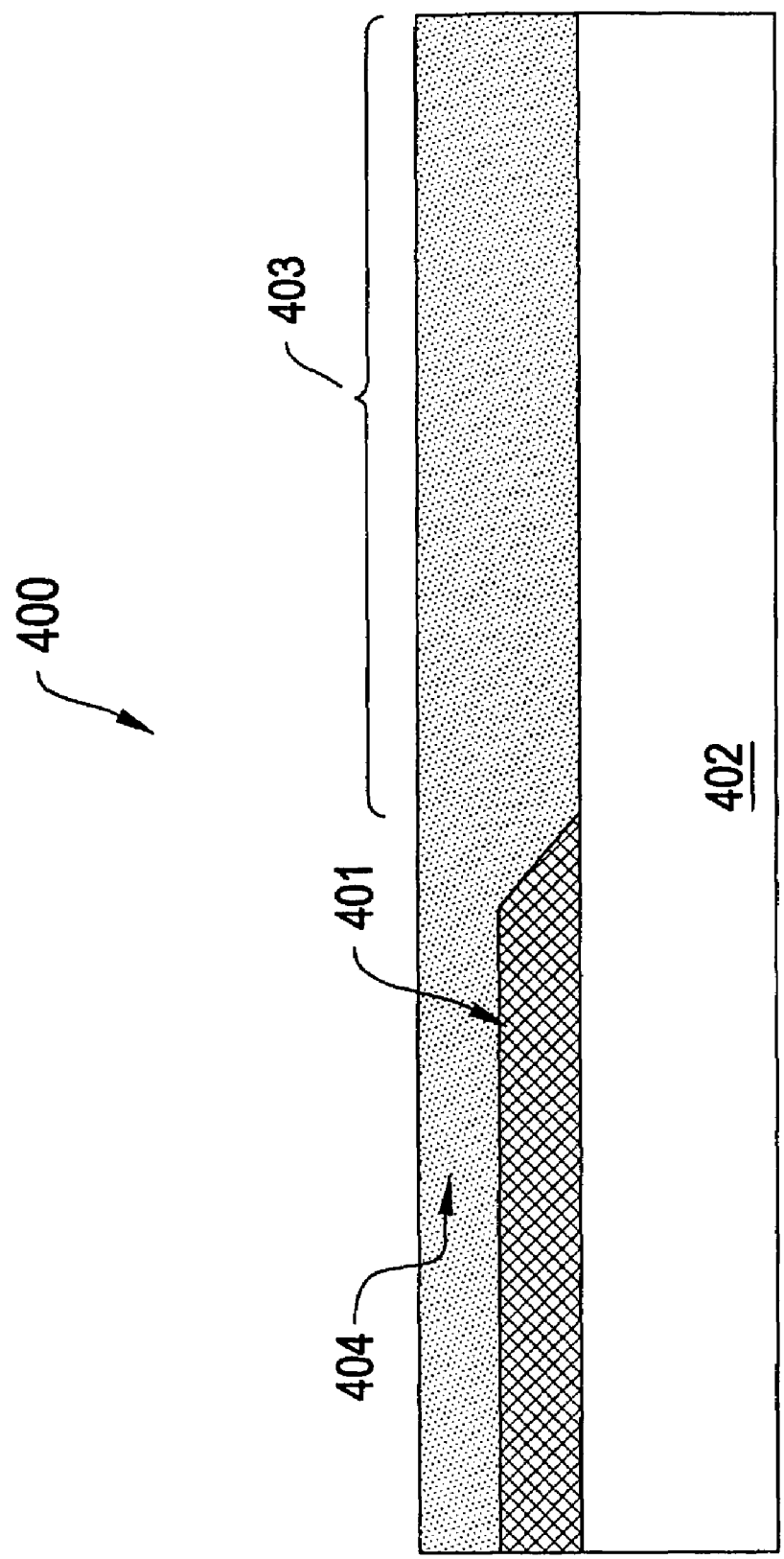
FIGS. 4A-4B are cross sectional views of the construction of FIG. 2B, according to an illustrative embodiment of the invention.

FIG. 4A illustrates one aperture layer structure 400 for the aperture layer 250 as might be produced in the first step of the fabrication sequence (FIG. 3A). The aperture layer structure 400 includes an aperture layer 401, deposited as a single thin film onto a glass substrate 402. The aperture layer 401 has been etched to produce a series of aperture holes 403 in the aperture layer 401. A dielectric layer 404 has been deposited over the top of the aperture layer 401 to isolate it from circuitry to be fabricated on top of it. The etched edge of the aperture layer 401 has been intentionally beveled to reduce the probability of cracks in the overlying dielectric layer 404.

The aperture layer 401 is designed to block the passage of light from the backlight to the viewer. Appropriate materials for use as a light blocking aperture layer include metals, including without limitation Al, Cr, Au, Ag, Cu, Ni, Ta, Ti, Nd, Nb, W, Mo and/or alloys thereof. If deposited to thicknesses in excess of 30 nm such materials are effective at blocking the transmission of light. Deposition can be accomplished by evaporation, sputtering, or chemical vapor deposition.

In many implementations, it is preferable that the aperture layer 401 have the ability to absorb light. Most metal films absorb a certain fraction of light and reflect the rest. In some applications it is desired to avoid the reflection of ambient light impinging upon the aperture layer 401 to improve the contrast of the display. For such applications, the aperture layer 401 may be referred to as a "black matrix." Some metal alloys which are effective at absorbing light, i.e. for use in a black matrix, include, without limitation, MoCr, MoW, MoTi, MoTa, TiW, and TiCr. Metal films formed from the above alloys or simple metals, such as Ni and Cr with rough surfaces can also be effective at absorbing light. Such films can be produced by sputter deposition in high gas pressures (sputtering atmospheres in excess of 20 mtorr). Rough metal films can also be formed by the liquid spray or plasma spray application of a dispersion of metal particles, following by a thermal sintering step. A dielectric layer such as a dielectric layer 404 is then added to prevent spalling or flaking of the metal particles.

Semiconductor materials, such as amorphous or polycrystalline Si, Ge, CdTe, InGaAs, colloidal graphite (carbon) and alloys such as SiGe are also effective at absorbing light. These materials can be deposited in films having thicknesses in excess of 500 nm to prevent any transmission of light through the thin film. Metal oxides or nitrides can also be effective at absorbing light, including without limitation CuO, NiO, $Cr_2O_3$, AgO, SnO, ZnO, TiO, $Ta_2O_5$, $MoO_3$, CrN, TiN, or TaN. The absorption of these oxides or nitrides improves if the oxides are prepared or deposited in non-stoichiometric fashion—often by sputtering or evaporation—especially if the deposition process results in a deficit of oxygen in the lattice. As with semiconductors, the metal oxides should be deposited to thicknesses in excess of 500 nm to prevent transmission of light through the film.

A class of materials, called cermets, is also effective at absorbing light. Cermets are typically composites of small metal particles suspended in an oxide or nitride matrix. Examples include Cr particles in a $Cr_2O_3$ matrix or Cr particles in an $SiO_2$ matrix. Other metal particles suspended in the matrix can be Ni, Ti, Au, Ag, Mo, Nb, and carbon. Other matrix materials include $TiO_2$, $Ta_2O_5$, $Al_2O_3$, and $Si_3N_4$.

It is possible to create multi-layer absorbing structures using destructive interference of light between suitable thin film materials. A typical implementation would involve a partially reflecting layer of an oxide or nitride along with a metal of suitable reflectivity. The oxide can be a metal oxide e.g. $CrO_2$, $TiO_2$, $Al_2O_3$ or $SiO_2$ or a nitride like $Si_3N_4$ and the metal can be suitable metals such as Cr, Mo, Al, Ta, Ti. In one implementation, for absorption of light entering from the substrate a thin layer, ranging from 10-500 nm of metal oxide is deposited first on the surface of substrate 402 followed by a 10-500 nm thick metal layer. In another implementation, for absorption of light entering from the direction opposite of the substrate, the metal layer is deposited first followed by deposition of the metal oxide. In both cases the absorptivity of bi-layer stack can be optimized if the thickness of the oxide layer is chosen to be substantially equal to one quarter of 0.55 microns divided by the refractive index of the oxide layer.

In another implementation, a metal layer is deposited on a substrate followed by a suitable oxide layer of calculated thickness. Then, a thin layer of metal is deposited on top of the oxide such that the thin metal is only partially reflecting (thicknesses less than 0.02 microns). Partial reflection from the metal layer will destructively interfere with the reflection from substrate metal layer and thereby produce a black matrix effect. Absorption will be maximized if the thickness of the oxide layer is chosen to be substantially equal to one quarter of 0.55 microns divided by the refractive index of the oxide layer.

Figure 4B:
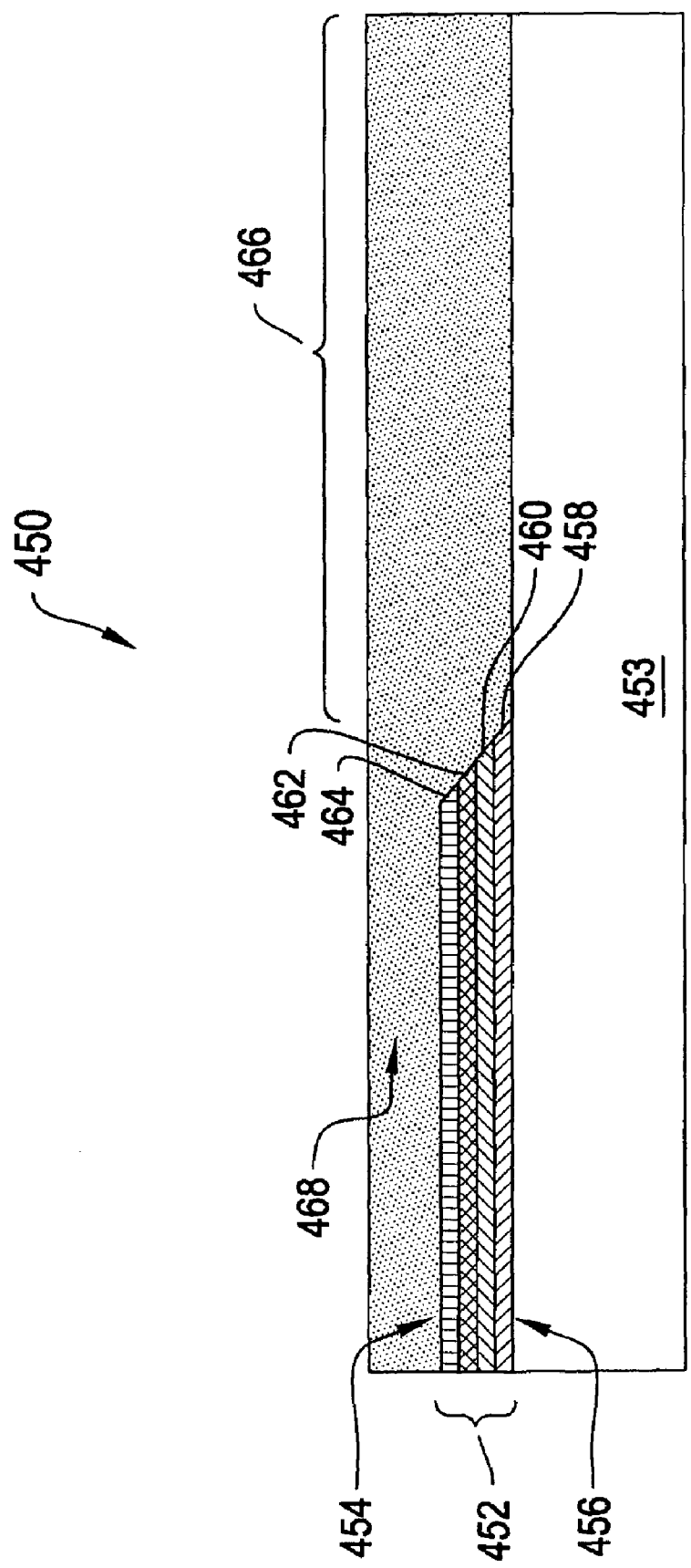

FIG. 4B is an illustrative embodiment of a second aperture layer structure 450. The second aperture layer structure 450 includes aperture layer 452, which has one side which is reflective, while the other side is light-absorbing. As described in U.S. patent application Ser. No. 11/218,690, filed on Sep. 2, 2005, if one surface of an aperture layer is made of a reflective material, such as a metal, then the aperture layer can act as a mirror surface which recycles non-transmitted light back into an attached backlight for increased optical efficiency. Such reflectance can be enhanced if the metal is deposited in such as way as to produce a dense and smooth thin film, as can be achieved via sputtering or by ion assisted evaporation. Metal films with enhanced reflectivity include Ag, Au, and aluminum.

The aperture layer 452 is formed from a composite structure deposited on a substrate 453. The aperture layer 452 of FIG. 4B is designed to absorb light that impinges on the top surface 454 of the aperture layer 452, while reflecting light that is incident on the bottom 456 of the aperture layer 452, i.e. after transmission through the substrate 453. The aperture layer 452 includes 4 layers, a high refractive index layer 458, a low refractive index layer 460, a metal reflecting layer 462, and an absorbing layer 464. The aperture layer 452 is etched to form an aperture hole 466, and overlaid with a dielectric layer 468. Those skilled in the art will recognize that the coupling of refractive layers 458 and 460 with different refractive indices leads to a set of partially reflecting surfaces. By controlling the spacing between at least two of these partially reflecting surfaces it is possible to enhance the reflectivity of the film stack by means of optical interference.

Multi-layer films can be designed to provide high reflectivity across a broad band of wavelengths or to have high reflectivity at a discrete number of individual wavelengths, for instance wavelengths that are matched to those emitted from the backlight.

Thin films which are candidates for the high refractive index layer 458 include, without limitation, $TiO_2$, $HfO_2$, $Ta_2O_5$, $Nb_2O_5$, $Cr_2O_3$, $Sc_2O_3$, $Bi_2O_3$, $In_2O_3$, and $Al_2O_3$. Thin films which are candidates for the low index refractive layer 460 include $SiO_2$, $Si_3N_4$, $MgF_2$, $CaF_2$, and $HfF_4$, and diamond-like carbon. These films can be deposited by reactive sputtering, reactive evaporation, ion-assisted evaporation, ion-assisted ion beam sputtering, or by chemical vapor deposition. FIG. 4B shows only a single pairing of a high index refractive layer with a low index refractive layer. Those skilled in the art will appreciate that the reflectivity can be enhanced by depositing, in sequence, multiple pairs of these refractive layers. In many cases the reflectivity can be maximized for the visible spectrum if the thickness of each refractive layer (460 and 458) is chosen to be substantially equal to one quarter of 0.55 microns divided by the refractive index of the layer.

Any one of the two refractive layers 458 or 460 can be eliminated from the aperture layer 456 while still enhancing to a substantial degree the reflectivity of the aperture layer 452 over that of a simple metal deposited on top of a transparent substrate 453. Improvements can result as long as the refractive layer that is interposed between the metal layer 462 and the transparent substrate 453 has a refractive index less than that of the substrate 453.

The metal reflecting layer 462 in the aperture layer 452 will not only reflect incident light but also acts to block the transmission of light. Any of the metal films, and/or semiconductor materials, listed above for use as a light blocking aperture layer, may be utilized for the metal reflecting layer.

The absorbing layer 464 acts to prevent reflections of light that arrive from the side opposite to that of the substrate 453. Any of the absorbing materials listed above for use with a black matrix may be employed as the top-most layer of the aperture layer 452.

The etch processes needed to form the aperture holes 466 can include RF or DC plasma etching, ion sputtering, or wet chemical etching.

In another implementation of the aperture layer 452, a 2-layer thin film stack can be formed. First a metal film with enhanced reflectivity, such as Ag, Au, or Al, is deposited on a surface. Then one of the absorbing black matrix materials, listed above, is deposited on top of the metal.

There are implementations in which the order of the layers in the composite aperture layer shown in FIG. 4B are preferably reversed, with the absorbing layer lying next to the substrate and the reflecting film stack pointing away from the substrate. Such implementations will be described with respect to FIG. 22.

A preferred embodiment for fabrication of composite aperture layer 452 proceeds as follows: First, for the high refractive index layer 458, a 54 nm±3 nm thick layer of $TiO_2$ is deposited by reactive sputter deposition of Ti in a partial pressure of $O_2$. Next, for the low refractive index layer 460, a 91 nm±5 nm film of $SiO_2$ is deposited by reactive sputter deposition of $SiO_2$ in a partial pressure of $O_2$. Next, for the metal reflecting layer 462, a 100 nm ±5 nm film of smooth Al is deposited by sputter deposition in a high vacuum, non-oxidizing ambient. Next, the three film 458, 460, and 462 are patterned to form aperture holes 466. Typical photoresists are applied as known in the art, then UV-exposed through photomask with the pattern of aperture holes 466. The photoresist is then chemically developed into an etching mask. The etching of the 3-film stack is performed with an ion beam milling system, with Ar ions, which removes each of the films in sequence but does not remove all the photoresist. After the etch of the thin films is complete the remaining photoresist is removed with either an aqueous or solvent-based stripper compound or through ozone and/or plasma ashing.

Next, as the first component of absorbing layer 464, a thin film of $Si_3N_4$ with thickness 250 nm±10 nm is deposited by plasma assisted chemical vapor deposition. Next, as the second component of absorbing layer 464, a 500 nm±40 nm thick layer of amorphous silicon is deposited by plasma assisted chemical vapor deposition. These films are then patterned with a similar photomask to form aperture holes 466 using a photoresist expose and develop step similar to that described above. The etching of $Si_3N_4$ and the amorphous silicon is then performed by means of reactive ion etching. Finally a 50 nm±4 nm film of $Al_2O_3$ is deposited in blanket fashion by atomic layer deposition.

The Control Matrix

Figure 5A:
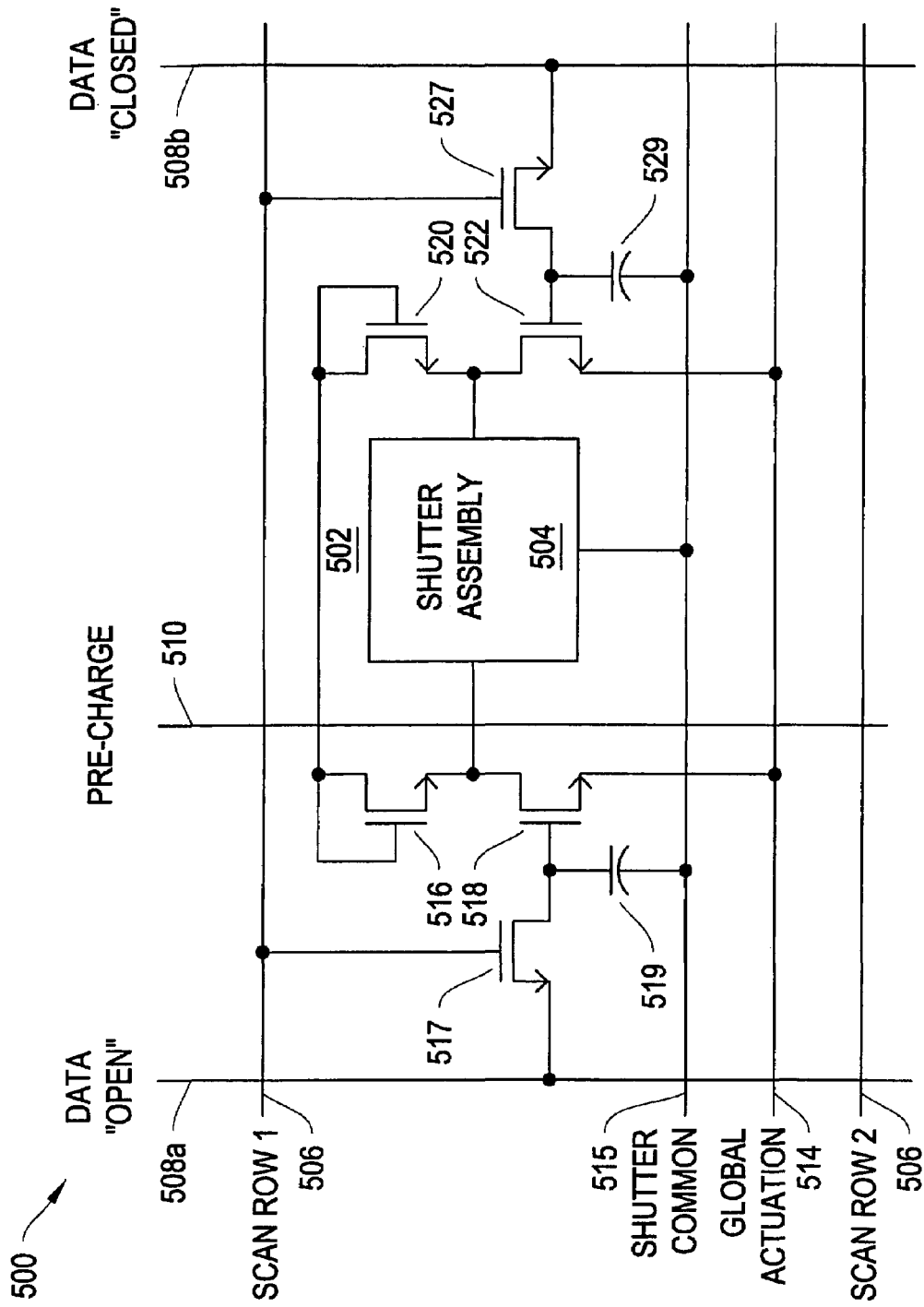
FIG. 5A is a schematic diagram of a control matrix suitable for controlling the shutter assemblies of the display apparatus of FIG. 1, according to an illustrative embodiment of the invention.
Figure 5B:
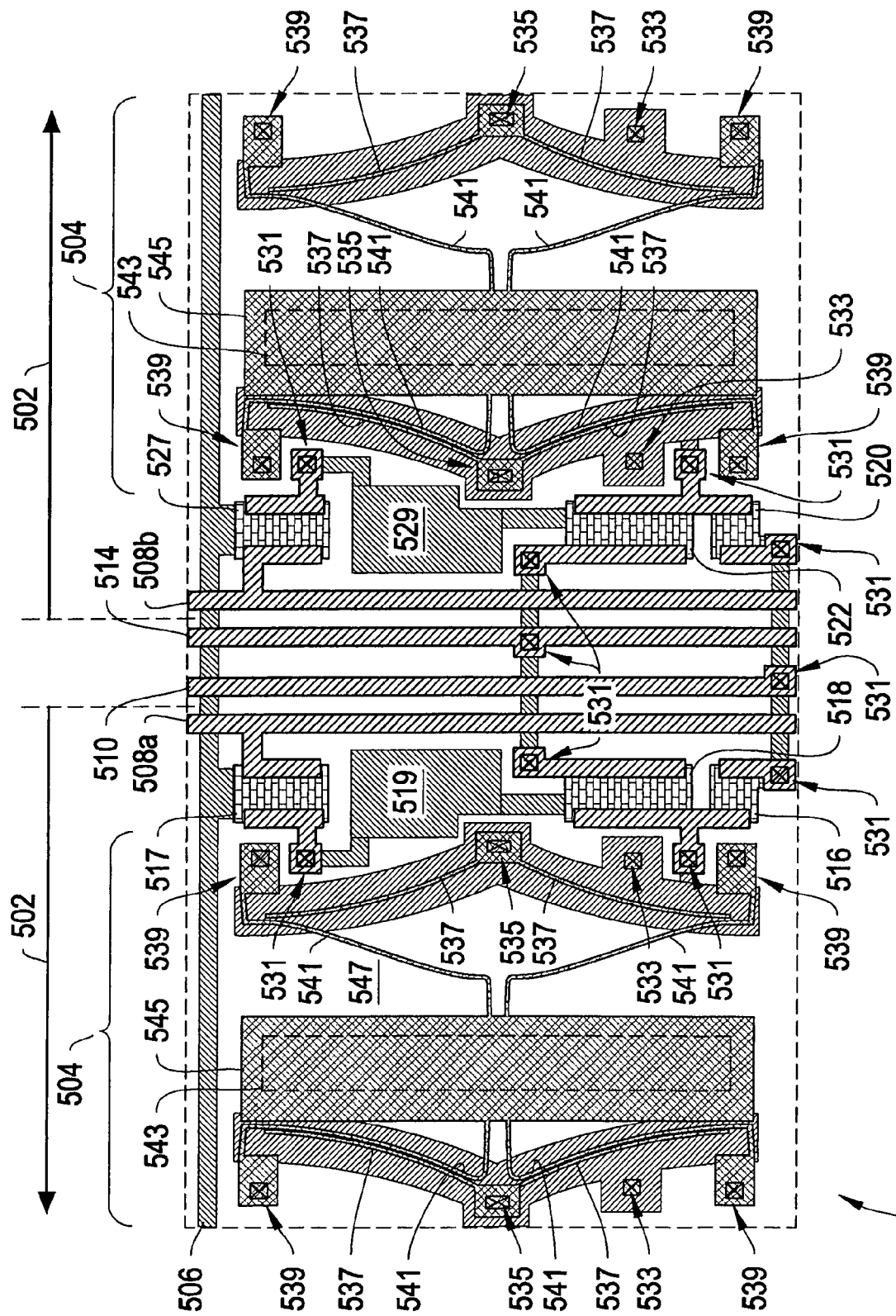
FIGS. 5B and 5C are plan view layouts of the control matrix from FIG. 5A, according to an illustrative embodiment of the invention.
Figure 5C:
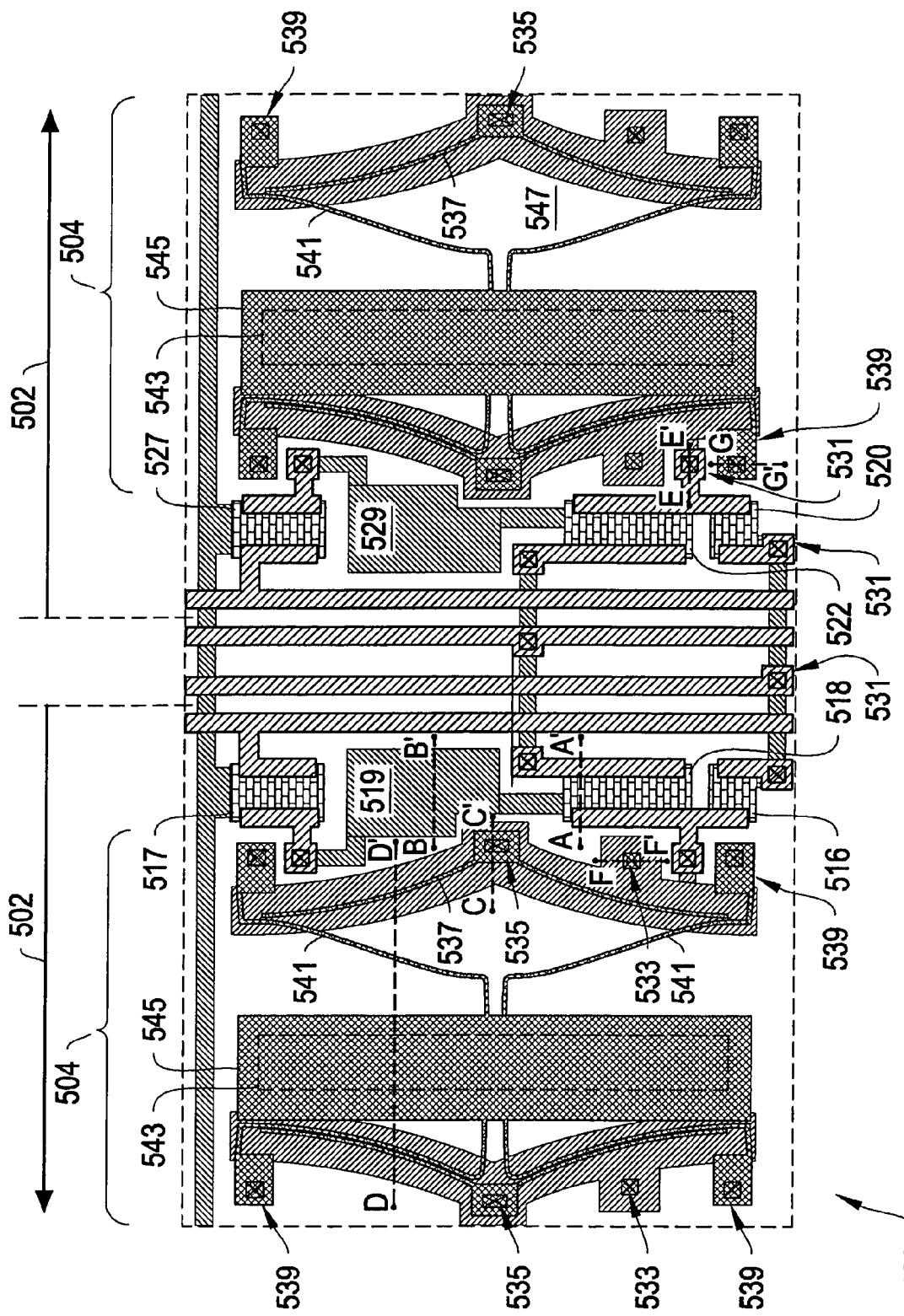

In another implementation the aperture layer can be utilized as one of the electrical components of the control matrix, with its own electrical connections to the control matrix in the upper layers. FIGS. 5A through 5C illustrate such an integrated design.

FIG. 5A is a schematic diagram of another control matrix 500 suitable for inclusion in the display apparatus 100 for addressing an array of pixels. Control matrix 500 controls an array of pixels 502 that include dual-actuator shutter assemblies 504 (i.e., shutter assemblies with both shutter-open and shutter-close actuators). FIG. 5B is a plan view layout of portions of two neighboring pixels 502 from an array of pixels 502. The layout of FIG. 5B provides one example of how the electrical components of control matrix 500 can be arranged within a pixel 502 for concurrent fabrication of an array of pixels 502 on a substrate. FIG. 5C is identical to FIG. 5B, and calls out additional features of the pixels 502. A layout such as FIG. 5B/5C can be utilized to produce photomasks for each of the functional layers of the pixels 502. The components of control matrix 500 are built up from a sequence of functional layers, and the photomasks are used to print the arrayed pattern for each layer across the substrate SOS. The pixels in the array 502 are each substantially square in shape with a pitch, or repeat distance between pixels, in the range of 180 to 200 microns. FIG. 5C shows cross sectional markers AA'-GG', used as reference for the cross-sectional illustration of the sequential layers of various electrical and mechanical components, to be described with reference to FIGS. 6, 7, 8 and 10.

For purposes of illustration, only the conductor layers, semiconductor layers, and shutter layers are provided in detail in FIG. 5B/5C. The locations of other patterned features, such as vias cut into dielectric layers or holes patterned into the aperture layer are indicated by symbol markings and/or dotted lines.

Referring to FIGS. 5A and 5B, the control matrix 500 includes a scan-line interconnect 506 for each row of pixels 502 in the control matrix 500. The control matrix 500 also includes two data interconnects: one data-open interconnect 508a and one data-closed interconnect 508b, for each column of pixels 502 in the control matrix 500. The control matrix 500 further includes a pre-charge interconnect 510, a global actuation interconnect 514, and a shutter common interconnect 515. These interconnects 510, 514 and 515 are shared among pixels 502 in multiple rows and multiple columns in the array. In one implementation (the one described in more detail below), the interconnects 510, 514 and 515 are shared among all pixels 502 in the control matrix 500.

Each pixel 502 in the control matrix includes a shutter-open charge transistor 516, a shutter-open discharge transistor 518, a shutter-open write-enable transistor 517, and a data store capacitor 519. Each pixel 502 in the control matrix 500 also includes a shutter-close charge transistor 520, and a shutter-close discharge transistor 522, a shutter-close write-enable transistor 527, and a data store capacitor 529.

Each pixel 502 in the control matrix includes a variety of via structures, which are indicated by the symbol of a box with diagonals in FIG. 5B/5C. Control matrix 500 includes several M1-M2 vias 531 (i.e., a via connecting a first metal layer M1 to a second metal layer M2), an Ap-M1 via 533 (i.e., a via connecting an aperture layer 547 to the first metal layer M1), two drive anchors 535, four compliant drive beams 537, four shutter anchors 539, four compliant load beams 541, an aperture hole 543, and a shutter 545. The aperture hole 543 is indicated by dotted line.

Portions of two neighboring pixels 502 are illustrated in FIGS. 5B and 5C. For each pixel 502 the shutter 545 closes over the aperture hole 543 by moving to the left. The shutter open actuation electronics for each pixel, including the transistors 516, 517, and 518, are positioned immediately to the right of each shutter assembly 504, (the two pixels are equivalent, but the shutter-open electronics are only included in FIG. 5B/5C for the left-most shutter assembly 504). The shutter close electronics for each pixel, including the transistors 520, 522, and 527, are positioned immediately to the left of each shutter assembly (again, the pixels 502 are equivalent, but the shutter-closed electronics are only illustrated for the right-most shutter assembly 504).

For a given pixel 502, the compliant load beams 541 mechanically connect the shutter 545 to the four shutter anchors 539 and suspend the shutter 545 above the substrate surface. The compliant drive beams 537, positioned adjacent to the load beams 541, are mechanically connected to the drive anchors 535. One set of drive beams 537 (located to the right of the shutter 545) is mechanically connected to a drive anchor and electrically connected, by means of both drive anchor 535 and an M1-M2 via 531, to the drain of the shutter-open charge transistor 516. By applying a voltage, greater than a minimum actuation voltage, between the drive beams 537 and load beams 541 on the right side of the shutter 545, the shutter 545 can be caused to move into the open position—i.e. to move away from the aperture hole 543. Together, the set of drive beams 537 and load beams 541 to the right of the shutter forms a shutter open actuator. The other set of drive beams 537 (located to the left of each shutter 545) is mechanically connected to a drive anchor 535 and electrically connected, by means of both the drive anchor 535 and an M1-M2 via 531, to the drain of the shutter-close charge transistor 520. By causing a voltage, greater than a minimum actuation voltage, to appear between the drive beams 537 and load beams 541 on the left side of the shutter 545, the shutter 545 can be caused to move into the closed position (as illustrated in FIG. 5B/5C)— i.e. to position over the top of aperture hole 543. The set of drive beams 537 and load beams 541 located to the left of the shutter 545 form a shutter close actuator.

In operation, the control matrix 500 is designed for independent control of distinct electrical functions, namely a) pre-charge of the actuators, b) pixel addressing and data storage, and c) global actuation of the pixels.

At the beginning of each frame addressing cycle the control matrix 500 applies a voltage to the pre-charge interconnect 510 which, because it is connected to both gate and drain of the shutter-open and shutter-close charge transistors 516 and 520, acts to turn both of these transistors 516 and 520 on. The pre-charge interconnect 510 is pulsed to a voltage in excess of the minimum required for actuation of the shutter 545, for instance to a voltage that exceeds 15 volts or in some embodiments exceeds 30 volts. After the actuators of each of the shutter-open and shutter-closed actuators have become charged, the voltage on the pre-charge interconnect 510 is returned to zero, and both of the shutter-open and shutter-close transistors 516 and 520 then return to their off states. The charge provided to each of the shutter-open and shutter-close actuators remains stored on each of the actuators since the transistors that feed these actuators have been returned to their off states.

Each row is then write-enabled in sequence, by placing a write-enable voltage $V_{we}$ onto the scan line interconnect 506. While a particular row of pixels 502 is write-enabled, the control matrix 500 applies a data voltage to either the data-open interconnect 508a or the data-closed interconnect 508b corresponding to each column of pixels 502 in the control matrix 500. The application of $V_{we}$ to the scan-line interconnect 506 for the write-enabled row turns on both of the write-enable transistors 517 and 527 of the pixels 502 in the corresponding scan line. The voltages applied to the data interconnects 508a and 508b are thereby allowed to be stored on the data store capacitors 519 and 529 of the respective pixels 502. Generally, to ensure proper actuation, a data voltage is allowed to be stored on only one storage capacitor 519 or 529 per shutter assembly 504.

In control matrix 500 the global actuation interconnect 514 is connected to the source of the both the shutter-open discharge switch transistor 518 and the shutter-close discharge transistor 522. Maintaining the global actuation interconnect 514 at a potential significantly above that of the shutter common interconnect 515 prevents the turn-on of any of the discharge switch transistors 518 or 522, regardless of what charge is stored on the capacitors 519 and 529. Global actuation in control matrix 500 is achieved by bringing the global actuation interconnect 514 to a potential that is equal to or less than that of the shutter common interconnect 515, making it possible for the discharge switch transistors 518 or 522 to turn-on in accordance to the whether a data voltage has been stored on ether capacitor 519 or 520. When switched to the on state, the shutter-open discharge switch transistor 518 or the shutter-close discharge transistor 522 will allow the charge to drain away from one or the other of their respective actuators. By turning on only the shutter-open discharge transistor 518, for example, the charge stored on drive beams 537 to the right of shutter 545 will drain out through the drive anchor 535, the M1-M2 via 531, through transistor 518, and out through the global actuation interconnect 514. As a result, a voltage exceeding the minimum actuation voltage will remain only between the shutter and the drive beams to the left of the shutter, and the shutter will be caused to move to the left and into the closed position.

Applying partial voltages to the data store capacitors 519 and 521 allows partial turn-on of the discharge switch transistors 518 and 522 during the time that the global actuation interconnect 514 is brought to its actuation potential. In this fashion, an analog voltage can be created on the shutter assembly 504, providing for analog gray scale.

The layout shown in FIG. 5B/5C includes portions of two neighboring pixels, between which some of the interconnects are singly assigned and some of the interconnects are shared in common. Each of these pixels contains one data-open interconnect 508a and one data-closed interconnect 508b, connecting all of the pixels 502 vertically along a single column of control matrix 500. The two neighboring pixels 502 in FIG. 5B/5C also share a common scan-line interconnect 506, which connects all pixels 502 horizontally along a single row of control matrix 500. The two neighboring pixels, however, share the pre-charge interconnect 510 and the global actuation interconnect 514 between them. These two interconnects, oriented along the column direction, are placed between each of the two pixels 502 with electrical connections, through M1-M2 vias 531, feeding voltage signals to both pixels on the right and on the left. At the periphery of the display (not shown) the pre-charge interconnect lines 510 and the global actuation interconnect lines 514 from multiple columns are further connected, respectively, to other pre-charge interconnect lines and other global actuation interconnect lines.

The control matrix 500 includes a shutter common interconnect 515, which in the layout of FIG. 5B/5C is established by a separate conducting layer, referred to as the aperture layer 547. The aperture layer 547, as was illustrated in FIGS. 3A and 3B, is fabricated as a distinct layer that underlies all other layers of the control matrix 500. In the preferred embodiment, the aperture layer 547 is fabricated from conductive materials. The patterned outline of the aperture layer is not illustrated in FIG. 5B/5C except for the location of the aperture hole 543. In control matrix 500, the aperture layer is used to make common electrical connection between all shutters 545 in all rows and all columns by means of the shutter anchors 539.

Alternate Layouts

It should be appreciated that FIG. 5B/5C is just one example of a layout appropriate to the construction of control matrix 500. Many other equivalent layouts are possible. For instance the common interconnects 510 and 514 have been routed along the column direction in FIG. 5B/5C, but other embodiments are possible in which these interconnects are routed along the row direction. In FIG. 5B/5C the common interconnects 510 and 514 are established and/or patterned at the same metal level as the source and drain connections to the transistors, such as transistor 518. Other embodiments are possible, however, where these common interconnects 510 and 514 are established at the gate level of the thin film transistors, and still other embodiments are possible where these interconnects can be patterned as independent electrical connectors located in the underlying conductive aperture layer 547.

In the layout of control matrix 500 shown in FIG. 5B/5C, the shutter assemblies 504 are aligned such that the shutters 545 move in a direction parallel to the scan line interconnect 506. Other embodiments are possible in which the shutters 545 move parallel to the data interconnects 508a and 508b. Embodiments are also possible in which the electrical components such as transistor 518 or capacitor 519 are disposed not just to the left or right but also above or below the shutter assemblies 504. In FIG. 5B/5C the electrical components occupy different areas within the pixel 502. Other embodiments are possible, however, where components such as transistor 518 or capacitor 519 are built on other thin film layers which underly the shutter assembly 504.

Figure 6:
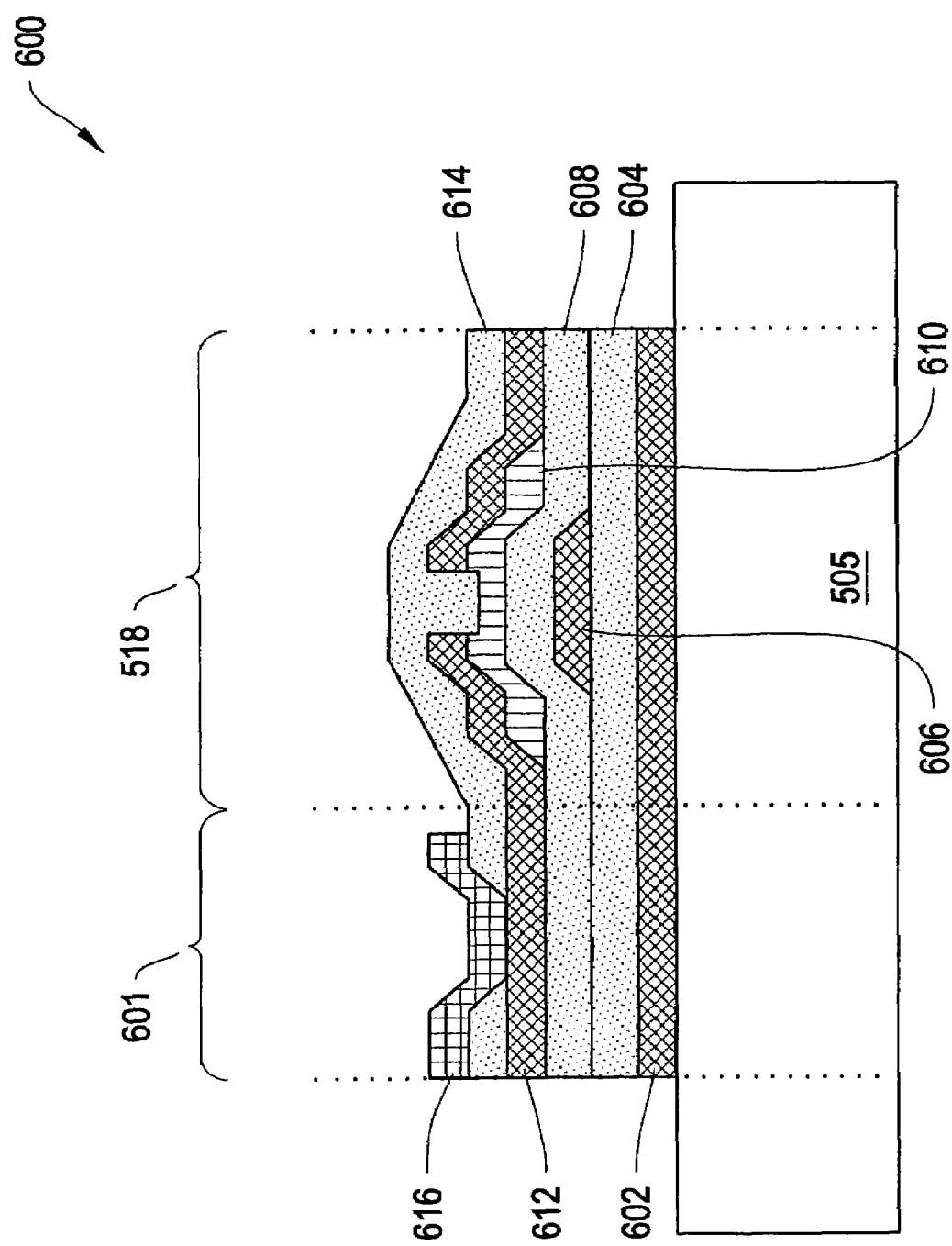
FIG. 6 is a cross sectional view of a transistor in the control matrix shown in FIG. 5B, according to an illustrative embodiment of the invention.

A number of different thin film switches, known in the art, can be utilized for the operation of control matrix 500. FIG. 6 illustrates one of several suitable switch structures in cross section. The structure illustrated in FIG. 6 includes the cross section of a transistor, such as shutter open discharge transistor 518. The structure of transistor 518 is similar to that used in the art for active matrix liquid crystal displays. The structure 600 of FIG. 6 also includes an electrode interconnect 601, such as are commonly used to connect to pixel capacitors in a liquid crystal display or as are commonly used connect to driver circuits on the periphery of a display. Transistor 518 represents, in particular, a structure that is known in the art as the inverted staggered back-channel-etched thin film transistor. Descriptions of the formation and function of this particular transistor as well as others can be found in the literature, such as in *Active Matrix Liquid Crystal Displays* by Willem den Boer (Elsevier, Amsterdam, 2005).

The transistor 518 is built from a distinct set of thin films or layers, the fabrication process for which will be described in more detail with respect to FIGS. 7-10. In particular the transistor 518 is disposed on top of an aperture layer 602. On top of the aperture layer is placed a first dielectric layer 604. The elements of the transistor 518 include a first conductor layer 606, a second dielectric layer 608, a first semiconductor layer 610, a second conductor layer 612, a third dielectric layer 614, and a third conductor layer 616. The first conductor layer is also referred to in the art as a gate metal layer and transistor 518 is referred to as a bottom-gate transistor. The second conductor layer is also referred to in the art as a connector to the source and drain of the transistor 518. The third conductor layer is also referred to in the art as an electrode or contact metal.

The semiconducting layer 610 is commonly formed from amorphous or polycrystalline silicon. The amorphous silicon can be deposited by either plasma enhanced chemical vapor deposition (PECVD) or by hot wire deposition from a precursor gas such as $SiH_4$. Other semiconducting materials that can be used at layer 610 include diamond-like carbon, Si, Ge, GaAs, CdTe or alloys thereof. Other techniques for formation of the semiconducting layer include low pressure chemical vapor deposition and sputtering.

The top surface of semiconducting layer 610 is doped with an impurity to increase the conductivity of the amorphous silicon and to provide for an ohmic contact between the amorphous silicon and the second conductor layer 612. Conductivity-enhancing dopants typically used with either amorphous or polycrystalline silicon include phosphorus, arsenic, boron, or aluminum. These dopants can be included as part of a deposition step, i.e. by mixing dopant precursors with $SiH_4$ in the PECVD chamber, or added later by means for diffusion from a dopant gas or by ion implantation.

Thin film switches, such as representative transistor 518 shown in FIG. 6, are fabricated from a sequence of deposition, masking, and etch steps. The number of masks and/or deposition steps required for the formation of thin film switches, such as transistor 518, can vary between 3 and 10. At the same time, the deposition, patterning, and etching steps used to form the thin film switches are also used to form thin film components such as array interconnects between pixels, capacitors, or to form electrode contacts to driver chips on the periphery of the display. Similar and/or additional processing steps can be adapted to form thin film components useful in the MEMS shutter display, e.g. to form electrical connections between thin film switches and the aperture layer, such as aperture layer 602, or to form electrical connections between the switches, array interconnects, and the shutter assembly, such as shutter assembly 202 or shutter assembly 504.

Fabrication Procedure 700

Figure 7:
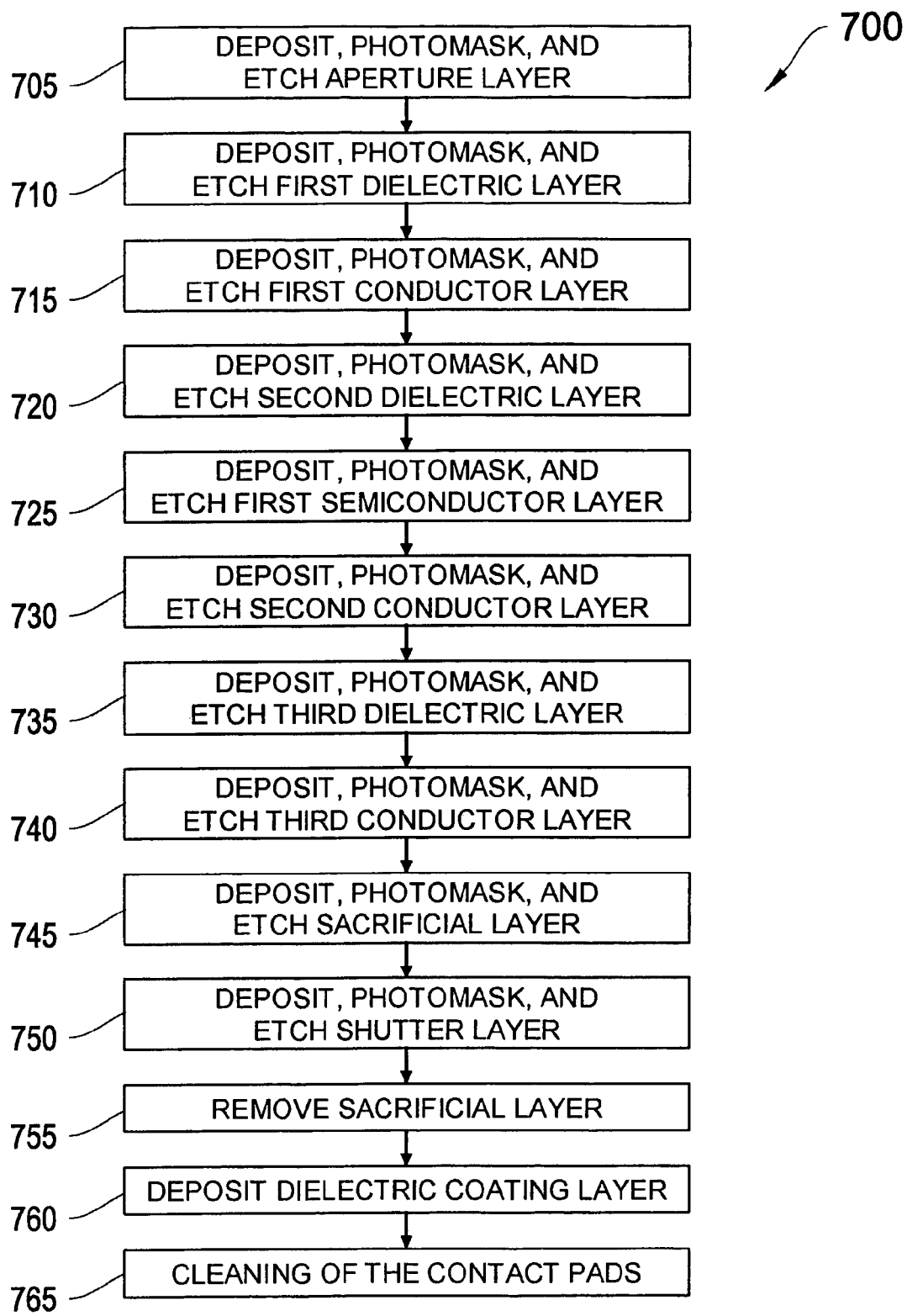
FIG. 7 is a flow chart of a method of fabricating the control matrix illustrated in FIG. 5B, according to an illustrative embodiment of the invention.

FIG. 7 illustrates one example of a manufacturing process or procedure 700 for construction of a control matrix and associated shutter assembly. The procedure 700 of FIG. 7 includes steps for the formation of an aperture layer, such as aperture layer 250 or aperture layer 602. The procedure 700 also includes steps for the formation of a switch or transistor, such as transistor 210 or transistor 518. The procedure 700 also includes steps for the fabrication of a shutter assembly, such as shutter assembly 202 or shutter assembly 504. Procedure 700 of FIG. 7 is described below with respect to the formation of an inverted, staggered, back-channel etched transistor such as transistor 518. Modifications or alternatives to procedure 700, as may be appropriate for simplification of the process or for the formation of alternative thin film switches and control matrices will be discussed later with respect to FIG. 9.

The procedure 700 begins at step 705 with the formation of an aperture layer 602 on a substrate. The aperture layer formation 705 includes the cleaning of the substrate, which can be glass or plastic, followed by the deposition and etch of the aperture layer 602. Several implementations of step 705 have already been described with respect to FIGS. 4A and 4B. In some cases the aperture layer can be a composite aperture layer such as aperture layer 452.

The procedure 700 continues at step 710 with the deposition and etch of the first dielectric layer, such as dielectric layer 604. Suitable dielectric materials include, without limitation, $SiO_2$, $Si_3N_4$, $Al_2O_3$, $TiO_2$, $HfO_2$, and $Ta_2O_5$, which can be deposited either by sputtering, evaporation, or chemical vapor deposition to thicknesses on the order of 0.1 to 2.0 microns. Typical photoresists are applied as known in the art, then UV-exposed through photomask patterns, such as are illustrated in layouts such as FIG. 5, and finally developed into an etching mask. After the etch of the dielectric layer 604 is complete the remaining photoresist is removed with either an aqueous or solvent-based stripper compound or through ozone and/or plasma ashing. Etch processes that can be used to pattern the first dielectric layer 604 include RF or DC plasma etching, sputter etching, or wet chemical etching.

The procedure 700 continues at step 715 with the deposition and etch of the first conductor layer, such as conductor layer 606. Suitable conductor materials include, without limitation, Al, Cu, Ag, Ni, Cr, Mo, W, Ti, Ta, Nd, Nb and alloys or combinations thereof. Some typical alloys used in the art include TiW, MoW, MoCr, AlNd, AlTa, and AlCr. Bilayer metals are also useful for application as the first conductive layer 606. Some bilayer metals that are useful include Cr on Al, Ta on Al, Ta on Ag, Ti on Al, or Mo on Al. Trilayer metal configurations are also known in the art, including Cr/Al/Cr or Cr/Al/Ti or Ti/Al/Ti, Cr/Al/Ta, or Cr/Ag/Ta. These metals or combinations of metals can be applied by DC or RF sputtering, evaporation, or in some cases by chemical vapor deposition. Suitable thicknesses can be in the range of 0.1 to 1.0 microns. For patterning of the first conducting layer 606, typical photoresists are applied as known in the art and exposed through photomask patterns such as are illustrated in layouts such as FIG. 5. After the etch of the conducting layer is complete the remaining photoresist is removed with either an aqueous or solvent-based stripper compound or through ozone and/or plasma ashing. Etch processes that can be used to pattern the first conductor layer include RF or DC plasma etching, sputter etching, reactive ion milling, and/or wet chemical etching.

The procedure 700 continues at step 720 with the deposition and etch of the second dielectric layer, such as dielectric layer 608. Suitable dielectric materials include, without limitation, $SiO_2$, $Si_3N_4$, $Al_2O_3$, $TiO_2$, $HfO_2$, and $Ta_2O_5$, which can be deposited either by sputtering, evaporation, or chemical vapor deposition to thicknesses on the order of 0.1 to 2.0 microns. Patterning is achieved by means of typical photoresists as known in the art and exposed through photomask patterns such as are illustrated in layouts like FIG. 5. After the etch of the dielectric is complete the remaining photoresist is removed with either an aqueous or solvent-based stripper compound or through ozone and/or plasma ashing. Etch processes that can be used to pattern the second dielectric layer 608 include RF or DC plasma etching, sputter etching, or wet chemical etching.

The procedure 700 continues at step 725 with the deposition and etch of the first semiconductor layer, such as semiconductor layer 610. Amorphous silicon is a typical semiconductor material applied at this step, deposited with a PECVD process at deposition temperatures in the range of 250 to 350 C. Polycrystalline silicon is an alternate semiconductor material for thin film transistors, but as will be shown in FIG. 9, the polycrystalline layer is typically applied at a step preceding, or situated below the first conductor layer 606. For the inverted, staggered, back channel etch transistor 518, a dual layer of amorphous silicon is deposited. For the first part of layer 610, amorphous silicon is deposited without any dopants to thicknesses in the range of 0.1 to 0.2 microns. The second part of layer 610 includes the deposition of heavily n-doped amorphous silicon, typically through the inclusion of PH3 gas in the PECVD chamber. The second or upper part of layer 610 is thinner, typically in the range of 0.02 to 0.05 microns. Patterning of the amorphous silicon transistor islands is then achieved by means of typical photoresists as known in the art and exposed through photomask patterns such as are illustrated in layouts such as FIG. 5. After the etch of the semiconductor is complete the remaining photoresist is removed with either an aqueous or solvent-based stripper compound or through plasma ashing. Etch processes that can be used to pattern semiconductor islands include RF or DC plasma etching, sputter etching, reactive ion milling, or wet chemical etching.

The procedure 700 continues at step 730 with the deposition and etch of the second conductor layer, such as conductor layer 612. Suitable conductor materials include, without limitation, Al, Cu, Ag, Au, Ni, Cr, Mo, W, Ti, Ta, Nd, Nb and alloys or combinations thereof. Some typical alloys used in the art include TiW, MoW, MoCr, AlNd, AlTa, and AlCr. Bilayer metals are also useful for application as the first conductive layer. Some bilayer metals that are useful include Cr on Al, Ta on Al, Ta on Ag, Ti on Al, or Mo on Al. Trilayer metal configurations are also known in the art, including Cr/Al/Cr, or Cr/Al/Ti, or Ti/Al/Ti, or Cr/Al/Ta, or Cr/Ag/Ta. These metals or combinations of metals can be applied by DC or RF sputtering, evaporation, or in some cases by chemical vapor deposition. Suitable thicknesses can be in the range of 0.1 to 1.0 microns. For patterning of the second conducting layer 612, typical photoresists are applied as known in the art and exposed through photomask patterns such as are illustrated in layouts like FIG. 5. After the etch of the second conducting layer 612 is complete the remaining photoresist is removed with either an aqueous or solvent-based stripper compound or through plasma ashing. Etch processes that can be used to pattern the second conductor layer 612 include RF or DC plasma etching, sputter etching, reactive ion milling, and/or wet chemical etching.

The procedure 700 continues at step 735 with the deposition and etch of the third dielectric layer, such as dielectric layer 614. Suitable dielectric materials include $SiO_2$, $Si_3N_4$, $Al_2O_3$, $TiO_2$, $HfO_2$, and $Ta_2O_5$, which can be deposited either by sputtering, evaporation, or chemical vapor deposition to thicknesses on the order of 0.2 to 2.0 microns. Patterning is achieved by means of typical photoresists as known in the art and exposed through photomask patterns such as are illustrated in layouts such as FIG. 5. After the etch of the dielectric is complete the remaining photoresist is removed with either an aqueous or solvent-based stripper compound or through plasma ashing. Etch processes that can be used to pattern the third dielectric layer 614 include RF or DC plasma etching, sputter etching, or wet chemical etching.

The procedure 700 continues at step 740 with the deposition and etch of the third conductor layer, such as conductor layer 616. Suitable conductor materials include, without limitation, Al, Cu, Ag, Au, Ni, Cr, Mo, W, Ti, Ta, Nd, Nb and alloys or combinations thereof. For the third conductor layer 616, which can serve as a contact or electrode layer, other conductive materials are applicable such as indium-tin-oxide (ITO), indium zinc oxide (IZO), Al-doped tin oxide, fluorine-doped tin oxide, silver alloys and/or gold alloys. Other alloys, bi-layers, and/or tri-layers as listed for use as the second conductor layer 612 are also applicable. These metals or combinations of metals can be applied by DC or RF sputtering, evaporation, or in some cases by chemical vapor deposition. Suitable thicknesses can be in the range of 0.1 to 1.0 microns. For patterning of the third conducting layer 616, typical photoresists are applied as known in the art and exposed through photomask patterns such as are illustrated in layouts such as FIG. 5. After the etch of the third conductor layer 616 is complete the remaining photoresist is removed with either an aqueous or solvent-based stripper compound or through plasma ashing. Etch processes that can be used to pattern the third conductor layer 616 include RF or DC plasma etching, sputter etching, and/or wet chemical etching.

The procedure 700 continues at step 745 with the deposition and patterning of the sacrificial layer, such as sacrificial layer 805 illustrated below in FIG. 8F. Suitable sacrificial layers 805 include polymers such as polyimide, dielectrics such as $SiO_2$, or soft metals such as copper or aluminum. In some cases the sacrificial material is patterned by adding a layer of photoresist as known in the art, which is then exposed through a photomask and developed to form an etching mask. Etch processes available for the sacrificial materials include RF or DC plasma etching or wet chemical etching. In some cases sacrificial materials are available which are themselves photo-defineable, meaning their patterns can be established by direct exposure to UV radiation through a photomask followed by immersion in a bath or spray of developer chemicals. In either case the pattern which is formed in the sacrificial layer 805 will act as a mold for the subsequent formation of the shutter layer 807. The sacrificial layer 805 is not removed until step 760 of procedure 700. Further details on available sacrificial materials are described with reference to FIG. 12.

Figure 8A:
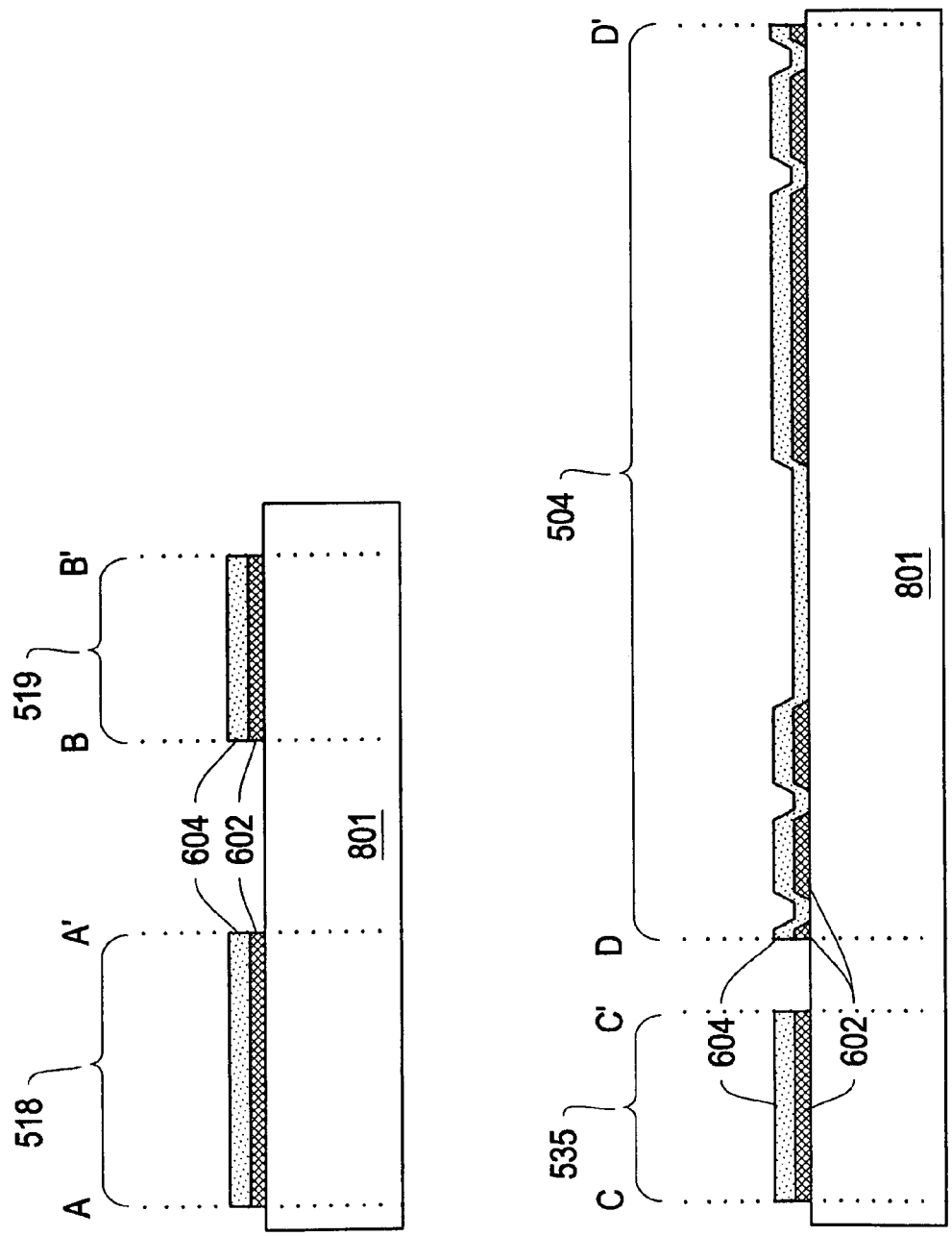
Figure 8B:
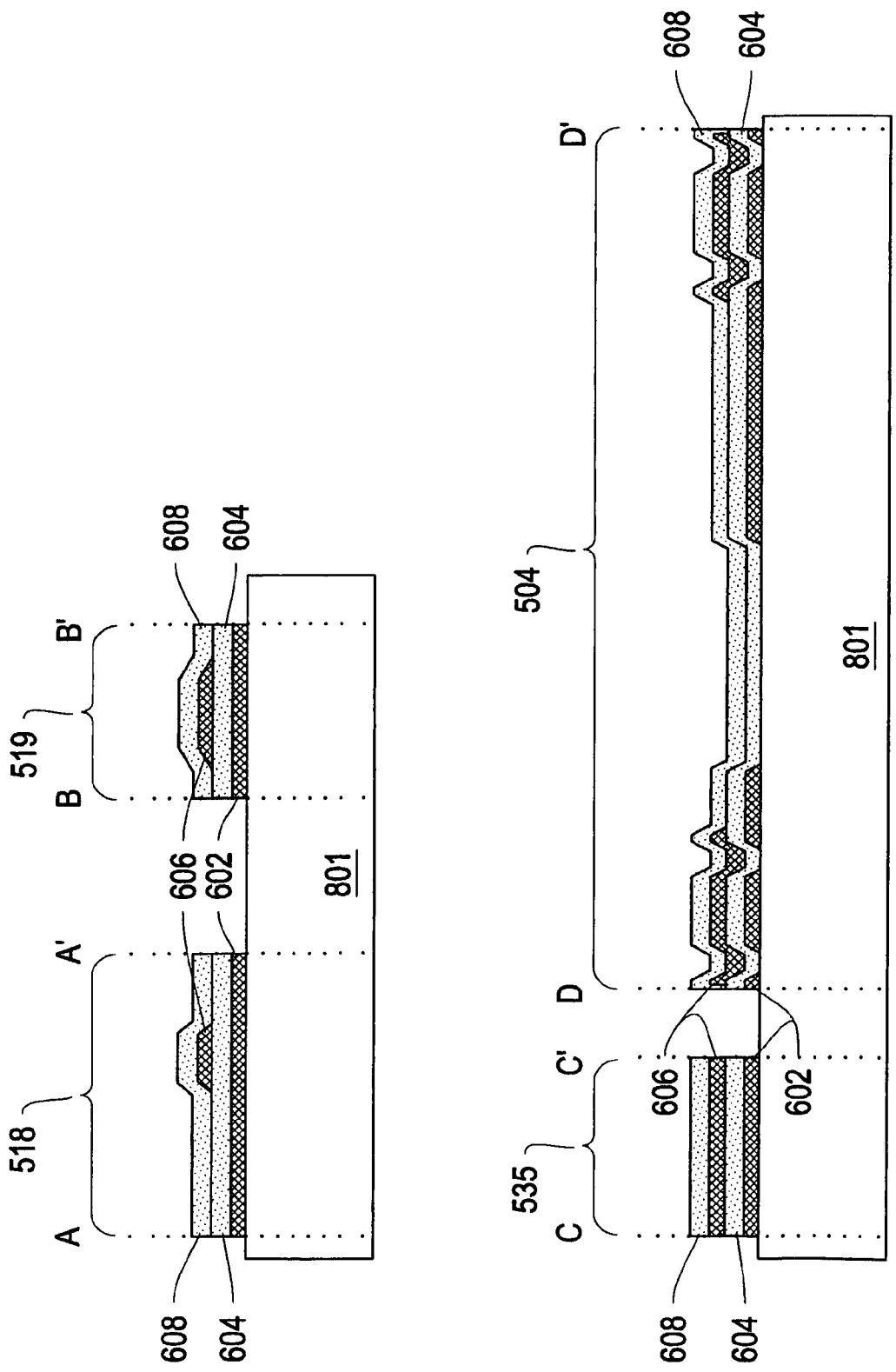
Figure 8C:
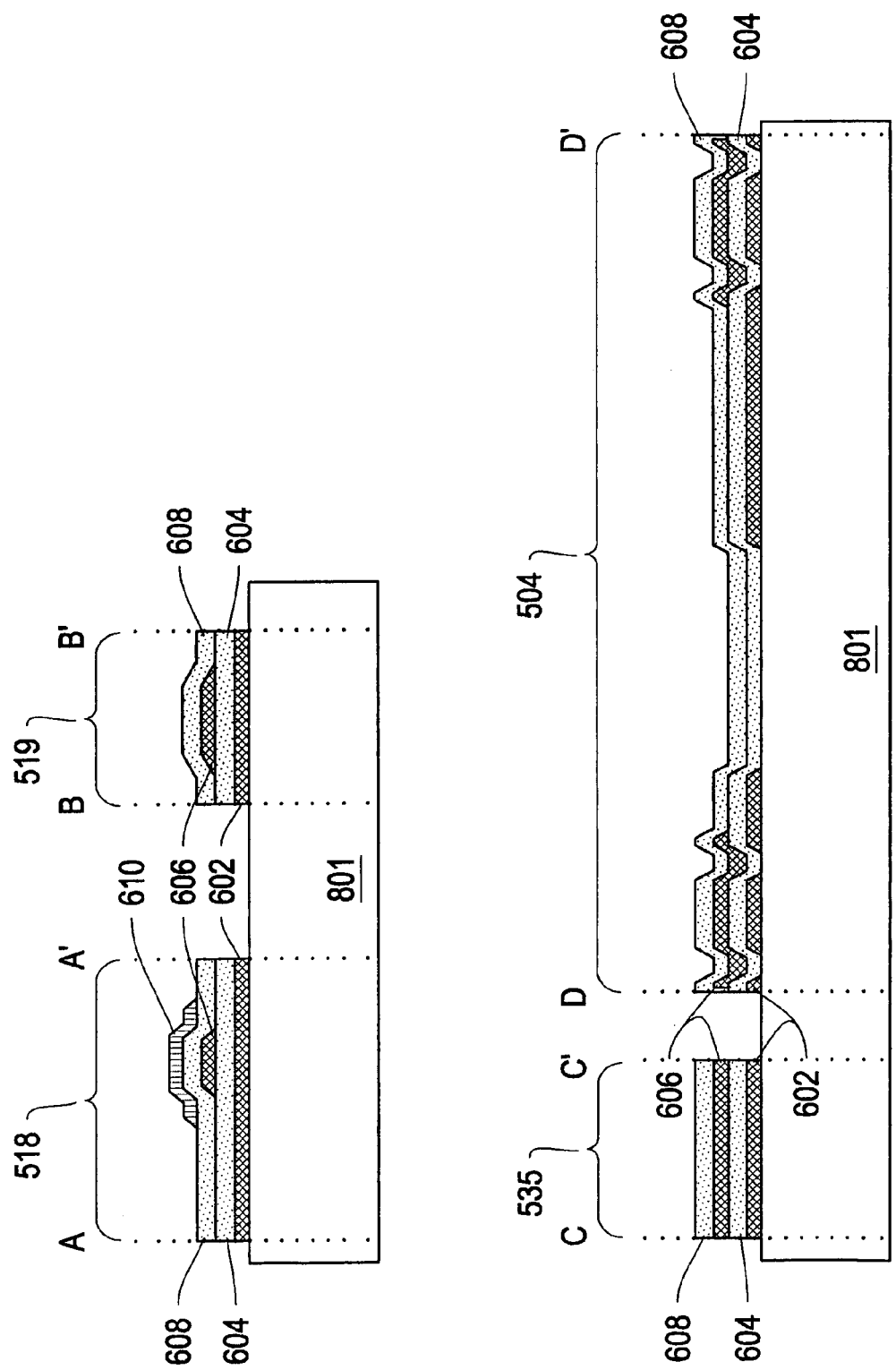
Figure 8E:
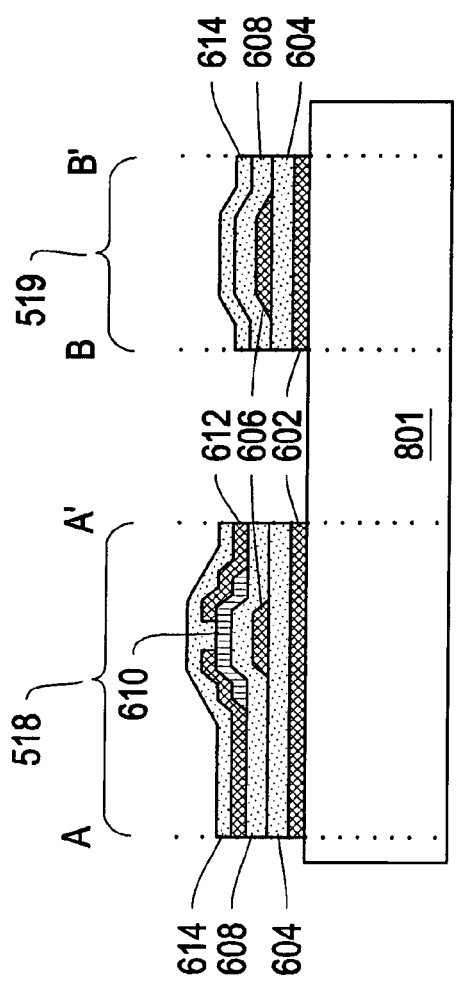
Figure 8E:
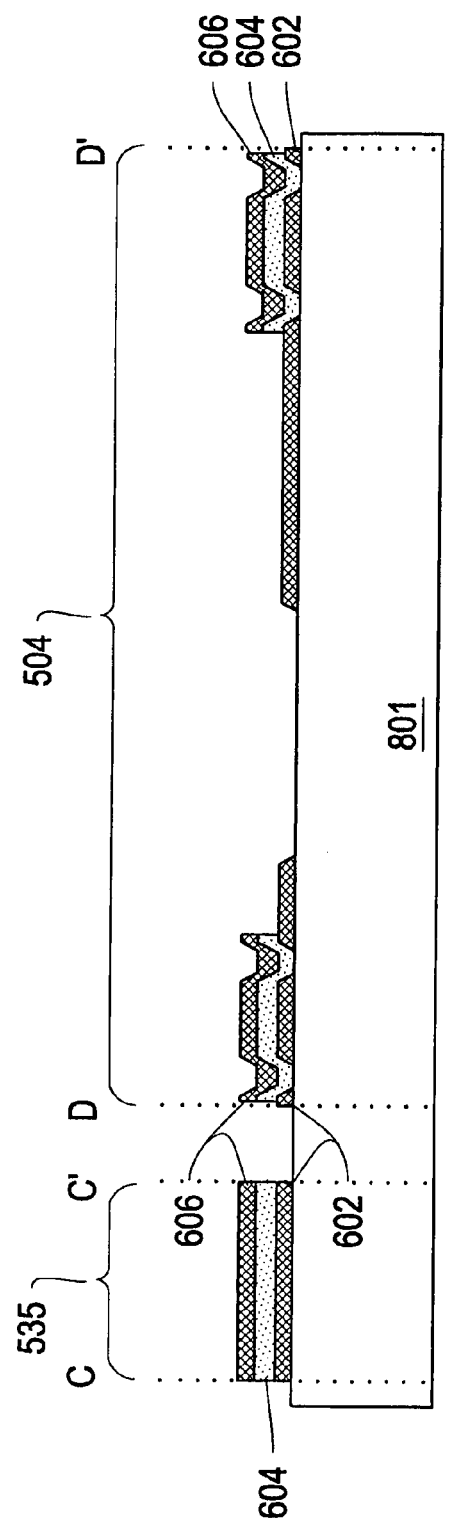
Figure 8F:
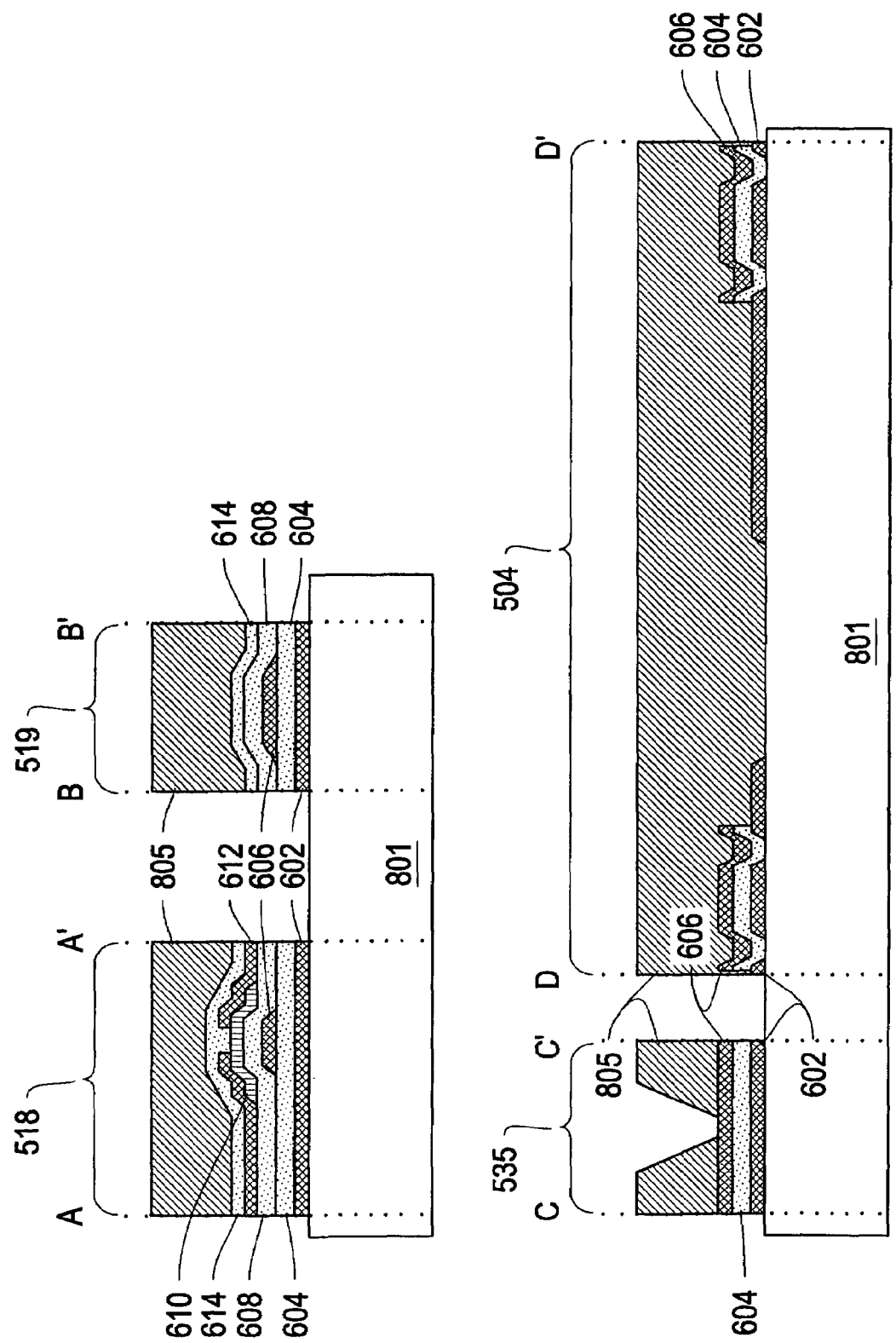
Figure 8G:
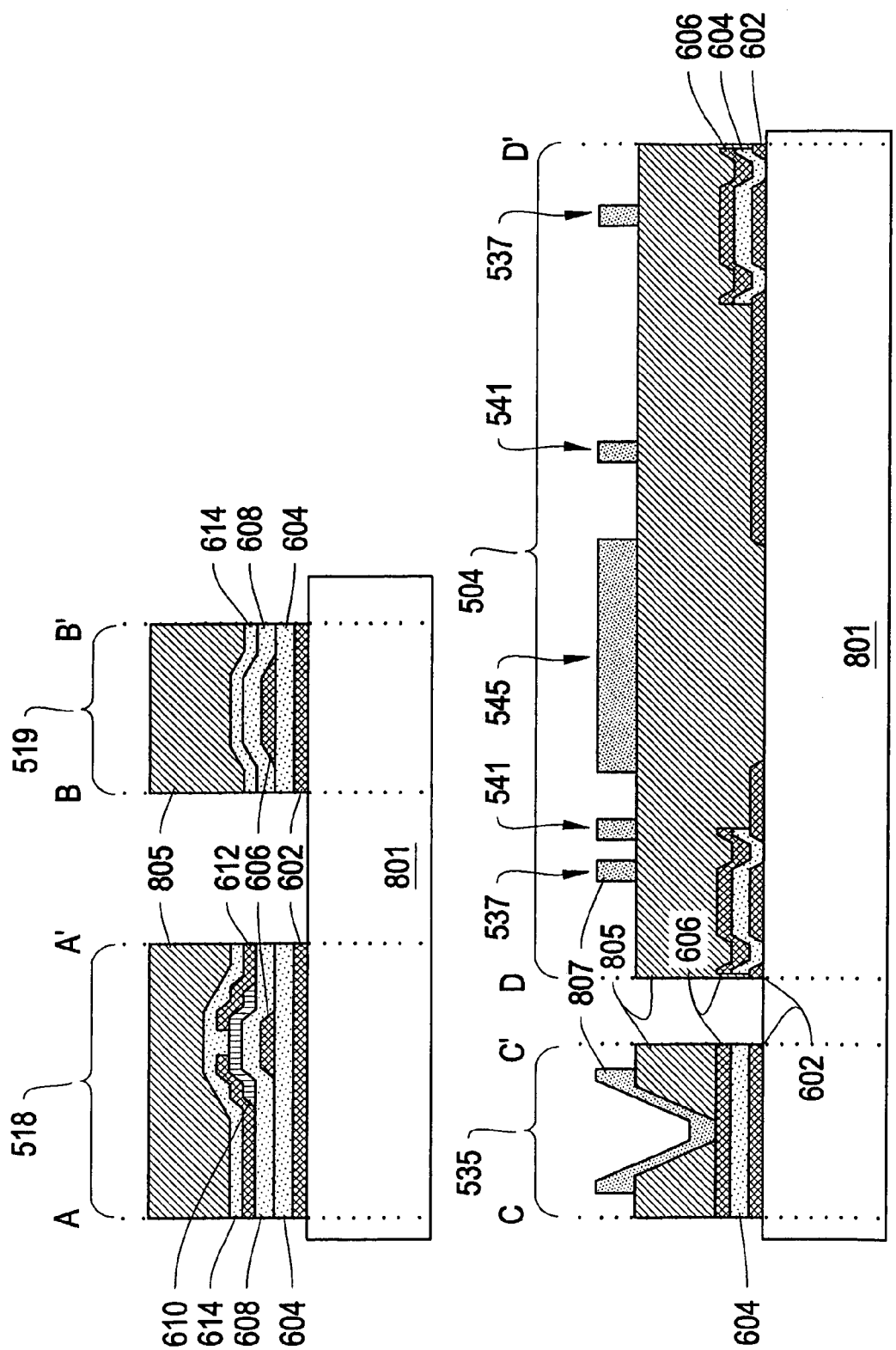

The procedure 700 continues at step 750 with the deposition and patterning of the shutter layer, such as shutter layer 807 illustrated in FIG. 8G. Suitable shutter materials used by themselves include, without limitation, metals such as Al, Cu, Ni, Cr, Mo, Ti, Ta, Nb, Nd, or alloys thereof; dielectric materials such as $Al_2O_3$, $SiO_2$, $Ta_2O_5$, or $Si_3N_4$; or semiconducting materials such as diamond-like carbon, Si, Ge, GaAs, CdTe or alloys thereof. Further discussion of the material properties preferred for the shutter layer 807 can be found with reference to FIG. 11. Layered combinations of shutter layer materials can also be employed as further described under FIG. 11. Shutter layers 807 can be deposited to thicknesses in the range of 0.1 microns to 5 microns. The deposition techniques that can be utilized for thicker shutter materials include DC or RF sputtering, chemical vapor deposition, and/or evaporation. In some cases the shutter material can be deposited from solution by electroless plating or electroplated after deposition of a conducting seed layer onto the exposed surfaces of the sacrificial layer 805.

The procedure 700 continues at step 755 with the removal of the sacrificial layer 805. This step, also referred to as the release step, is intended to free the shutter layer from the mold onto which it was deposited and enable elements formed in the shutter layer 807 to move freely, or at least move as constrained by its actuators and anchors or supports to the substrate. Polymer sacrificial layers 805 can be removed in an oxygen plasma, or in some cases by thermal pyrolysis. Certain inorganic sacrificial layers 805 (such as $SiO_2$, Si, Cu, or Al) can be removed by wet chemical etching and/or vapor phase etching.

Figure 8H:
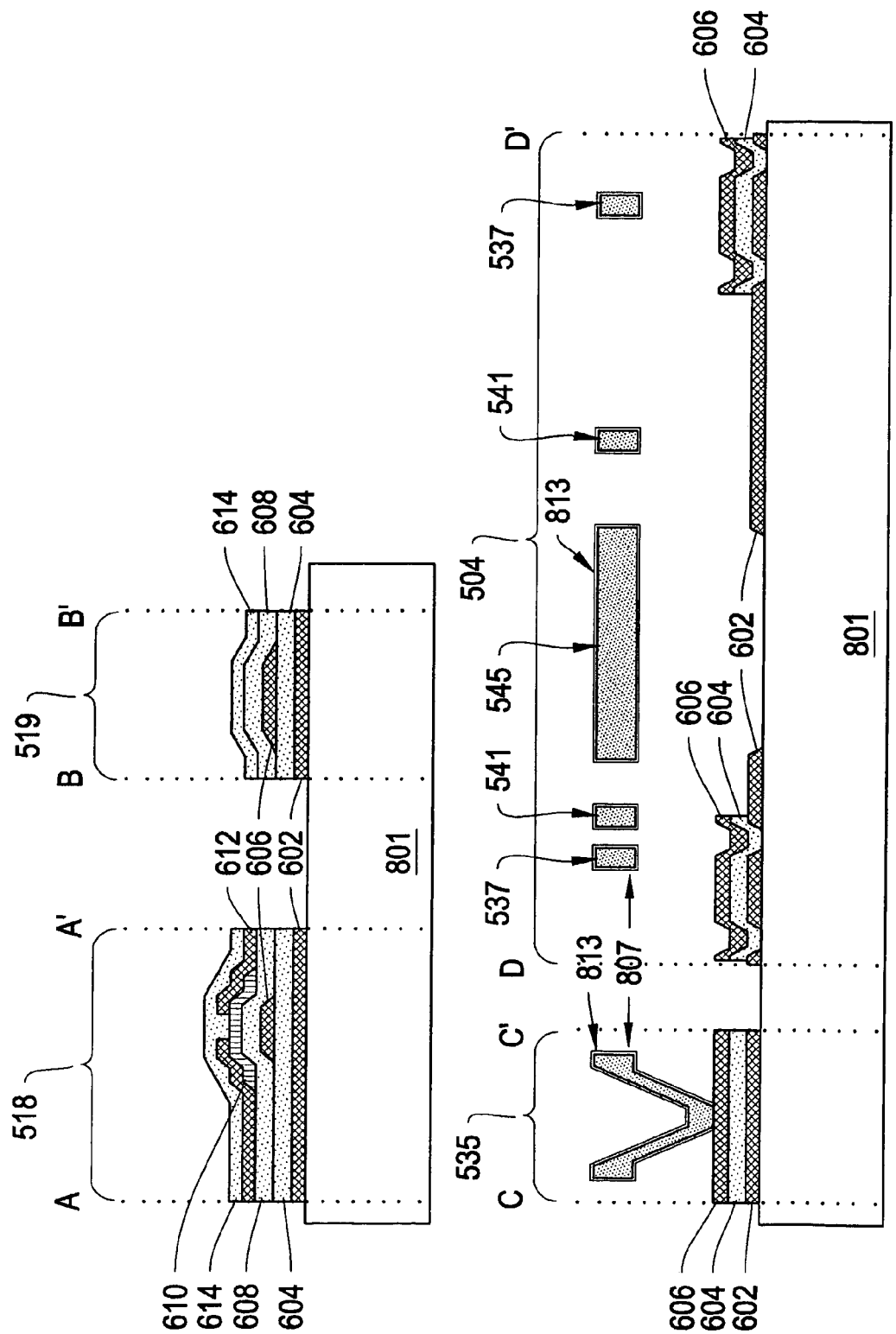

The procedure 700 continues at step 760 with the addition of a dielectric coating layer, such as dielectric coating 813 illustrated in FIG. 8H. Dielectric coatings 813 can be applied in conformal fashion, such that all bottom, tops, and side surfaces of the shutters and beams are uniformly coated. Such thin films can be grown by thermal oxidation and/or by conformal chemical vapor deposition of an insulator such as $Al_2O_3$, $Cr_2O_3$, $TiO_2$, $HfO_2$, $V_2O_5$, $Nb_2O_5$, $Ta_2O_5$, $SiO_2$, or $Si_3N_4$, or by depositing similar materials by means of atomic layer deposition. The dielectric coating layer 813 can be applied with thicknesses in the range of 10 nm to 1 micron. In some cases sputtering and evaporation can be used to deposit the dielectric coating 813 onto sidewalls.

The procedure 700 concludes at step 765 with the cleaning of contact pads. Since the dielectric coating 813 deposited at step 760 coats all surfaces uniformly, it is useful to remove the dielectric coating 813 over contact pads at the periphery of the display, where electrical connections need to be made to driver chips or source voltages. In one embodiment, a sputter etch using an inert gas such as Ar is sufficient to remove the dielectric coating 813 from all exposed surfaces. The sputter etch is preferably applied after the active area of the display has been protected or sealed with a cover sheet (such as a separate piece of glass). The cover sheet prevents the sputter etch from removing dielectric material from any of the shutter assemblies in the pixel area.

In another embodiment, which avoids the sputter etch at step 765, it is possible to pre-treat all contact areas on the periphery of the display so that the dielectric coating 813 applied at step 760 does not adhere to the contact areas and cannot therefore impede an ohmic contact. Such a non-adhering pre-treatment can be achieved by the spray or liquid-dispensed application of certain compounds around the periphery of the display which alter the chemical reactivity of the contact surface. Exemplary surface treatments include the family of trichlorosilanes of chemical composition $CH_3(CH_2)_x SiCl_3$ where x is a number greater than 7 and less than 30, perfluoro-octyltrichlorosilane (FOTS) and dimethyldichlorosilane (DMDCS). Alternative surface treatments include the group of alkanethiols of chemical composition $CH_3(CH_2)_x SH$, where x is a number greater than 7 and less than 30. Such pre-treatments can be effective at blocking the deposition of certain dielectric materials if the deposition is carried out at low temperatures, usually less than 200 degrees C. Such low temperature dielectric depositions can be achieved with the use of atomic layer chemical vapor deposition. The cleaning of the contact pads at step 765 can then be as simple as a heat treatment, exposure to UV radiation, or exposure to ozone to remove organic materials from the bond pads.

In another embodiment which avoids the sputter etch at step 765, it is possible to cover or passivate the contact areas on the periphery of the display with a sacrificial material before deposition of the dielectric material at step 760 of procedure 700. Examples of sacrificial materials which can be applied include photoresist, silicone sealing materials, or polydimethylsiloxane (PDMS). These are materials that can withstand the temperatures required for the dielectric deposition at step 760, in the range of 100 to 300 C. A nozzle dispense tool can be used to deposit a relatively thick layer of these materials selectively in the region of the contact pads.

In the latter embodiment, where the contact area has been previously coated with a sacrificial material before the dielectric deposition, step 765 of procedure 700 entails a removal of the sacrificial material as well as any overlying dielectric material. In some cases the removal of the sacrificial material can be accomplished through a combination of mechanical abrasion, wet chemical or solvent dissolution, and/or oxygen plasma. In cases where the sacrificial material was deposited as a coherent and thick (>20 micron) film of sealant or elastomeric material, the sacrificial material may simply be pulled away with forceps or tweezers. The contact pads can then be further cleaned with either a detergent or a mild acid wash.

It should be appreciated that procedure 700 illustrates one sequence of processes appropriate to the formation of a control matrix, such as control matrix 500, but many other process sequences are possible. In some cases the ordering of the steps can be altered. FIG. 9, for instance, illustrate a structure for a top-gate polycrystalline silicon thin film transistor in which the semiconducting layer 610 is deposited after the first dielectric layer 604 and before the first conducting layer 606.

There are also embodiments of the control matrix in which certain steps of procedure 700 are eliminated. FIG. 17, for instance illustrates a control matrix in which the aperture layer 602 and the first dielectric layer 604 have been eliminated, with their functions taken up by other layers in the control matrix. In other embodiments the third conductor layer 616 can be eliminated.

There are also embodiments in which all of layers of procedure 700 are included, but certain photomasking steps and/or etching steps are eliminated. If no electrical connection between the control matrix and the aperture layer 602 is required, for instance, then the patterning and etching of the first dielectric layer 604 can be eliminated. Procedure 700 includes photomasking and etching steps for each of the dielectric layers 604, 608, and 614. Generally these etching steps are included for the formation of electrical connections or vias between the conductor layers. Similar electrical connections can be made without requiring a via etching step after the deposition of each dielectric. In some cases, for instance, a masking and etching step established at step 735, for instance, can also serve to etch through underlying dielectric layers to reveal electrical connections at lower conductor layers, even to the aperture layer 602, without the aid of previous dielectric masking steps. Some examples of these via combinations are described in relation to FIG. 19.

FIGS. 8A through 8H demonstrate, by means of cross-sectional drawings, how the step by step procedure of FIG. 7 can be used to build a control matrix and associated shutter assembly. The construction of four independent structures is illustrated in FIGS. 8A through 8H. The four structures are illustrated as if they are adjacent to each other on the substrate 801, but this is for illustrative purposes so that a common height reference might be given. Cross section markers such as A-A' and B-B' are given so that the reader can identify suitable relative orientations of structures within a pixel by comparing markers in FIGS. 8A through 8H to the same markers in FIG. 5B/5C. FIGS. 8A through 8H demonstrate how to build a transistor such as transistor 518 or transistor 210 with an associated capacitor 519. The transistor labeled as transistor 518 in FIGS. 8A-8H may, in fact, represent the cross section of any of the transistors 516, 517, 520, 522, or 527 shown in FIG. 5B/5C. Also shown in FIGS. 8A through 8H is how to fabricate a representative MEMS shutter assembly such as shutter assembly 504 (which is similar to shutter assembly 202) with associated aperture hole 543 (or aperture hole 254). Also illustrated is the fabrication of a representative drive anchor such as drive anchor 535, which is similar to drive anchor 148.

FIG. 8A shows the structure of transistor 518, capacitor 519, drive anchor 535 and shutter assembly 504 after application of steps 705 and 710 of procedure 700. The structures in FIG. 8A include an aperture layer 602 and a first dielectric layer 604. Neither of these layers is patterned underneath the transistor or capacitor. A photopattern is, however, applied to the aperture layer 602 in the region of shutter assembly 504. An opening is made in the aperture layer at the point of the aperture hole 543. Openings are also made in the aperture layer 602 to electrically isolate regions of the aperture layer 602 that will underly the drive beams 537 (shown in FIG. 8E). After the first dielectric layer 604 is deposited over the aperture layer 602, it is allowed to remain in blanket fashion over the top of the aperture layer 602.

FIG. 8B shows the structure of transistor 518, capacitor 519, drive anchor 535 and shutter assembly 504 after application of steps 715 and 720 of procedure 700. FIG. 8B includes pre-existing layers 602 and 604. At step 715 the first conductor layer 606 is deposited and patterned. At the transistor 518 the first conductor layer 606 is patterned to form the gate metal. At the capacitor 519 the first conductor layer 606 is patterned to form the upper electrode of the capacitor. The lower electrode of capacitor 519 is formed by the aperture layer 602. For the drive anchor 535 the first conductor layer is allowed to remain intact, as it will form part of the electrical connection to the drive anchor. In the region of the shutter assembly 504 the first conductor layer 606 is completely etched away. At step 720 the second dielectric 608 is allowed to remain intact over all of the structures in FIG. 8B.

The patterned edges of the gate metal at transistor 518 and the upper electrode of capacitor 519 have been beveled. Bevelled edges can be useful for ensuring a conformal coating for deposition of subsequent dielectric layers and to avoid dielectric cracks which can form due to stress concentrations. Cracks in dielectric layers can lead to electrical leakage between conductor layers.

The photomasks employed at step 715 can also be used to pattern the first conductor layer 606 into any of a number of interconnect lines, such as the scan-line interconnect 506 shown in FIG. 5B/5C.

FIG. 8C shows the structure of transistor 518, capacitor 519, drive anchor 535 and shutter assembly 504 after application of step 725 of procedure 700. FIG. 8C includes pre-existing layers 602, 604, 606, and 608. At step 725 the semiconductor layer 610 is deposited and patterned. For the inverted, staggered, back-channel etch transistor 518 the deposition of the semiconductor often proceeds in two steps. First a lightly doped amorphous silicon layer is deposited followed by the deposition of a doped amorphous silicon layer. The two layers which comprise semiconductor layer 610 are then patterned together to form the "silicon island". The edges of the silicon island are often beveled. The semiconductor layer 610 is removed, via the photopattern and etch steps, from all of the other structures shown in FIG. 8C.

FIG. 8D shows the structure of transistor 518, capacitor 519, drive anchor 535 and shutter assembly 504 after application of step 730 of procedure 700. FIG. 8D includes pre-existing layers 602, 604, 606, 608, and 610. At step 730 the second conductor layer 612 is deposited and patterned to establish the source 804*a* and drain 804*b* regions of transistor 518. For the inverted, staggered, back-channel etch transistor illustrated in FIG. 8, the opening or gap formed between features of the metal layer 612 on top of transistor 518 determines the critical dimensions (length and width) of the conducting channel through the semiconducting layer 610. The etch used to separate conducting layer 612 into source and drain regions 804a and 804b is also continued into the silicon island until it consumes the upper regions or the doped amorphous silicon component of semiconductor layer 610. The only amorphous silicon which remains in the channel region of transistor 518 is the undoped or lightly doped condition. The second conductor layer 612 is removed via the photopattern and etch steps from all of the other structures shown in FIG. 8D. The underlying dielectric layer 608 forms a convenient etch stop for the patterning or removal of parts of second conductor layer 612.

The photomasks employed at step 730 can also be used to pattern the second conductor layer 612 into any of a number of interconnect lines, such as data-open interconnect 508a or pre-charge interconnect 510 shown in FIG. 5B/5C.

FIG. 8E shows the structure of transistor 518, capacitor 519, drive anchor 535 and shutter assembly 504 after application of step 735 and 740 of procedure 700. FIG. 8E includes pre-existing layers 602, 604, 606, 608, 610, and 612. At step 735 the third dielectric layer 614 is deposited and patterned. The dielectric layer 614 generally serves the purpose of passivating or protecting the transistor 518 and capacitor 519 from subsequent processing and from the packaging environment of the display. The dielectric etching step which is employed at step 735, however, has also been used to remove all of the dielectric materials that had been covering the first conductor layer 606 in the region of the drive anchor 535, and that had covered the aperture layer 602 in the region of the shutter assembly 504. Assuming that similar materials are employed at all preceding dielectric deposition steps, the etch chemicals used in the patterning of the third dielectric layer 614 can etch all underlying dielectric layers and can stop with good selectivity either on the glass substrate 801 or on either of the metal-containing layers 602 or 606. At step 740 of procedure 700 the third conductor layer is deposited and removed from all of the structures shown in FIG. 8. Optionally the third conductor layer 616 is allowed to remain in the region of the drive anchor 535 to assist with formation of an ohmic contact to the drive anchor.

FIG. 8F shows the structure of transistor 518, capacitor 519, drive anchor 535 and shutter assembly 504 after application of step 745 of procedure 700. FIG. 8E includes pre-existing layers 602, 604, 606, 608, 610, 612 and 614. At step 745 the sacrificial layer 805 is deposited and patterned. In this illustrated example, patterns in the sacrificial layer are only required in the vicinity of the anchors, such as drive anchor 535 where attachment of the shutter assembly will be made to the substrate.

FIG. 8G shows the structure of transistor 518, capacitor 519, drive anchor 535 and shutter assembly 504 after application of step 750 of procedure 700. FIG. 8G includes pre-existing layers 602, 604, 606, 608, 610, 612, 614 and 805. At step 750 the shutter layer 807 is deposited and patterned. The shutter material will generally lie flat, covering the surface of the sacrificial material, and it will also coat the sides and the bottom of the holes patterned in the sacrificial layer at step 745, as illustrated at the drive anchor 535. The pattern that is etched into shutter layer 807 will define the shutter 545, which in FIG. 8G is in a position to block the aperture hole 543. The pattern etched into the shutter layer 807 can also define the actuator beams of the shutter assembly, such as compliant load beams 541 or the compliant drive beams 537. The material of the shutter layer 807 is removed from the vicinity of the transistors, such as transistor 518 and the capacitors, such as capacitor 519.

FIG. 8H shows the final structure of the transistor 518, capacitor 519, drive anchor 535 and shutter assembly 504 after application of step 765 of procedure 700. The structures in FIG. 8H include the aperture layer 602, the first dielectric layer 604, the first conductor layer 606, the second dielectric layer 608, the first semiconductor layer 610, the second conductor layer 612, the third dielectric layer 614, and the shutter layer 807. The structures shown in FIG. 8G are achieved after removal of the sacrificial layer 805 in step 755 of procedure 700. The shutter assembly illustrated in FIG. 8G includes a patterned aperture hole 543, a shutter 545, and two sets of compliant actuator beams 537 and 541. As was illustrated in plan view figures such as FIG. 2, FIG. 3, and FIG. 5B/5C, the compliant load beams 541 mechanically connect the shutter 545 to a shutter anchor, such as shutter anchor 539 or shutter anchor 138. The structures shown in FIG. 8H are achieved after removal of the sacrificial layer in step 755 of procedure 700. Also shown are the dielectric coatings 813 that are deposited on all surfaces of the shutter assembly at step 760 of procedure 700.

It should be appreciated that variations of the structures 518, 519, 535, and 504 are possible. The capacitor 519 is illustrated in FIG. 8H as using electrodes from the aperture layer 602 and the first conductor layer 606. Similar capacitors can be established using procedure 700 by using other metal layers as electrodes. For example, the capacitor 519 could be formed using the first conductor layer 606 and the second conductor layer 612, or the third conductor layer electrodes.

FIG. 8H shows a drive anchor 535 in which electrical connection is made between the shutter layer 807 and the first conductor layer 606. In other embodiments a drive anchor can be utilized in which the electrical and mechanical connection is established at either higher or lower levels. For instance, using procedure 700, the drive anchor could be established as a direct connection to the aperture layer 602 or to the third conductor layer 616.

FIGS. 6 through 8 have illustrated the structure of control matrix 500 using the example of the inverted, staggered, back-channel etched thin film transistor (TFT). Many alternative thin film switch structures, however, are known in the art and can be adapted to the benefit of a MEMS-based shutter display. Several of alternative switches are illustrated in FIG. 9 and described in texts such as in *Active Matrix Liquid Crystal Displays* by Willem den Boer (Elsevier, Amsterdam, 2005).

Figure 9A:
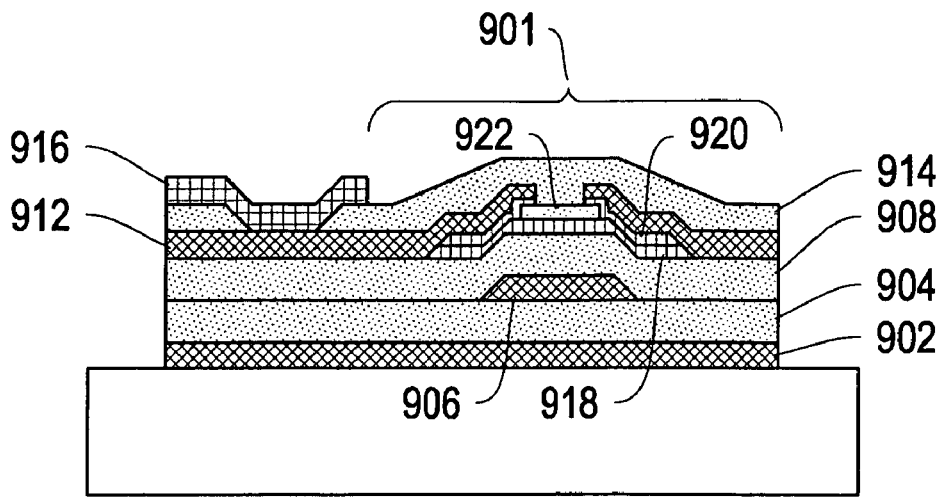
FIGS. 9A-9C are cross sectional views of alternate switch structures for use in the control matrix of FIG. 5B, according to an illustrative embodiment of the invention.
Figure 9B:
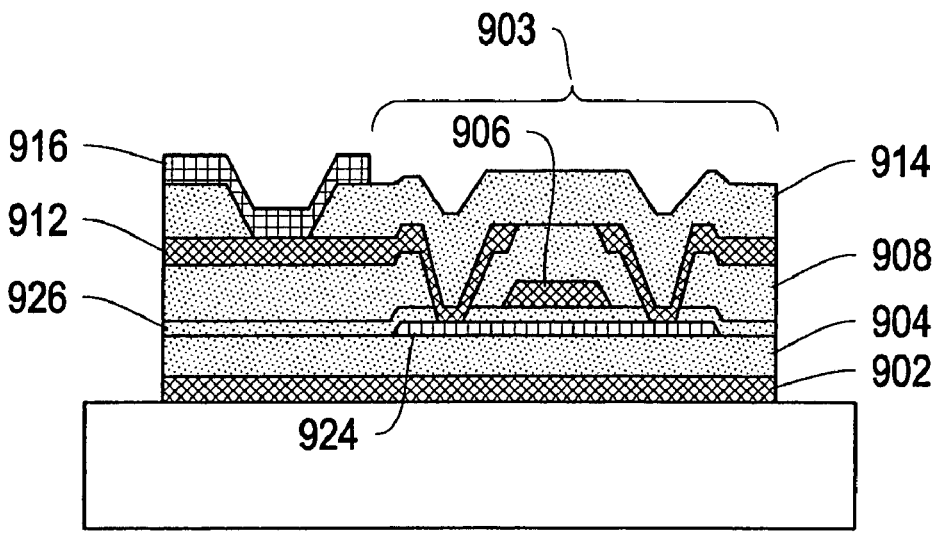
Figure 9C:
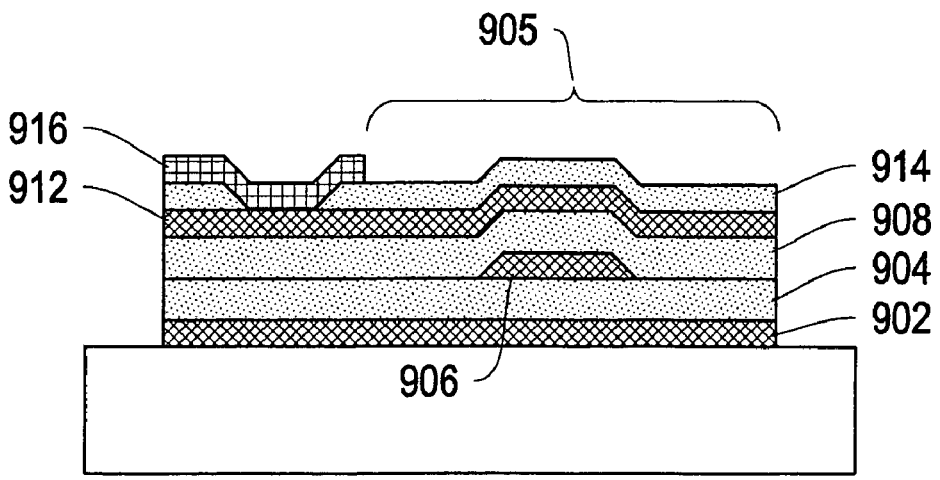

FIG. 9A illustrates the inverted, staggered, etch-stopper or trilayer TFT 901. FIG. 9B illustrates a top-gate TFT 903, commonly used with polycrystalline silicon as opposed to amorphous silicon. FIG. 9C illustrates a metal-insulator-metal (MIM) structure, often referred to as the thin film diode 905. Each of the structures 901, 903, and 905 contain certain layers with similar functions and similar deposition/patterning processes as compared to those found in transistor 518 (FIG. 6). These include an aperture layer 902, a first dielectric layer 904, a first conductor layer 906, a second dielectric layer 908, a second conductor layer 912, a third dielectric layer 914, and a third conductor layer 916.

In comparison to the transistor 518 and the process flow 700, the process for the etch-stopper TFT 901 adds two extra layers and one extra photomask. The etch stopper TFT includes two separately deposited (instead of one) semiconducting layers: an intrinsic amorphous silicon layer 918 and a doped amorphous silicon layer 920. The etch stopper TFT 901 also adds an additional etch-stopper dielectric layer 922, which is deposited immediately following the intrinsic amorphous silicon layer 918. Continuing the process for the etch stopper TFT, the etch-stopper dielectric layer 922 is typically patterned into an island over the top of the TFT. Next the doped amorphous silicon layer 920 is deposited and both semiconductor layers 918 and 920 are then patterned into a silicon island. Next the second conductor layer 912 is deposited. The process for patterning/etching the second conductor layer 912 into source and drain regions includes an etch process for the underlying doped amorphous silicon layer 920. This etch process will be naturally stopped when the etchant reaches the etch stopper dielectric layer 922, thereby giving this process considerably more latitude for variations (without serious transistor degradation) as compared to the source/drain patterning of step 730 of procedure 700. The materials used for the first and second conductor layers 906 and 912 are similar between transistor 901 and transistor 518, however, and the switching properties of the transistors are similar. Via structures, which will be described below in FIG. 10, are also substantially unaffected by the use of the structure of either transistor 518 or transistor 901.

FIG. 9B shows the structure of a common top-gate low-temperature polycrystalline thin film transistor (LTPS-TFT) 903. In comparison to transistor 518 (FIG. 6) and procedure 700, the LTPS-TFT changes the order and sequence of the semiconductor layers and the first conductor layer. FIG. 9B includes a polycrystalline silicon layer 924 that is deposited immediately after the first dielectric layer 904. The silicon layer 924 is typically deposited as an amorphous silicon layer and then converted to polycrystalline silicon by means of excimer laser annealing before patterning into a silicon island. The patterning of the polycrystalline silicon layer is then followed by the deposition in blanket fashion of an extra layer, the gate insulating layer 926. Next the first conductor layer 906 is deposited and patterned to form the gate metal. Next the source and drain areas of the silicon island are doped with either boron or phosphorus by either ion implantation, plasma-immersion, or ion shower doping techniques. (A self-aligned doping of the source and drain is made possible by the shielding of the gate metal.) Next the second dielectric layer 908 is deposited and patterned into a set of via openings, similar to the M1-M2 via 531 which is described below with respect to FIG. 10. Next the second conducting layer 912 is deposited and patterned to form the connections to source and drain. The process is completed with layers 914 and 916 in a sequence similar to that described in procedure 700.

The polycrystalline silicon material in layer 924 has significantly higher carrier mobility than what is available for amorphous silicon transistors, such as transistor 518. As a result, it is possible to drive similar currents and similar switching speeds with LTPS transistors while using significantly less area than that which is required for amorphous silicon transistors. The use of high mobility, small area LTPS transistors, therefore, makes it possible to build MEMS-based shutter displays with smaller pixels, tighter pitch and therefore higher resolution formats within a substrate of fixed size.

When adapting an LTPS transistor, such as transistor 903, to the MEMS-based shutter display, other useful modifications can be made to photopatterns and process flows. For instance, in order to form the Ap-M1 via 533, as illustrated in FIG. 10A-10F for use with an LTPS transistors like transistor 903, it is suitable to remove the polycrystalline silicon layer 924 in the region of the via 533. Also, in forming via 533, the same photopattern and etch that would normally open the via through the first dielectric layer 604 (step 710, illustrated in FIG. 10B) can be delayed until after the deposition of the gate dielectric layer 926.

Another common variation of the thin film transistor, known in the art but not illustrated in FIG. 9, is the staggered top-gate amorphous silicon transistor. In this further variation of the inverted staggered transistor 518 (FIG. 6), the roles of the two conductor layers are reversed. The first conductor layer 606 is employed to form the source and drain contacts to a semiconductor layer 610 that is deposited immediately above it. The second conductor layer 612 is used to form the gate structure. In order to adapt the MEMS-based shutter display to the amorphous top-gate transistor the scan-line interconnect 506 may preferably be patterned into the second conductor layer 612 instead of into the first conductor layer 606. Conversely, other interconnect lines, such as data-open interconnect 508a or pre-charge interconnect 510 may preferably be patterned into the first conducting layer 606. The use of the amorphous top-gate transistor may save some space within a pixel by eliminating the need of some vias such as the M1-M2 via 531 for connecting the drain of certain transistors to the drive anchors 535.

FIG. 9C shows the structure of a MIM thin film diode 905. In comparison to transistor 518 (FIG. 6) the diode 905 does not include any semiconductor layer. Instead a particular choice of materials is used for the second dielectric material 908. The materials chosen for second dielectric material 908 include $Si_3N_4$, $Ta_2O_5$, or diamond-like carbon, materials which are known for their performance as either leaky dielectrics or dielectrics that have the ability to trap charge. Techniques employed for the deposition of these materials include plasma-assisted chemical vapor deposition (PECVD), hot wire deposition, or sputtering followed by electrochemical anodization.

In operation the MIM diode 905 behaves as a varistor, which can assist with improving the selectivity, addressing, and/or contrast achievable in large pixel arrays as compared to the use of a passive matrix. The processes used to form the via structures (see FIG. 10 below) can be adapted with little change for use with the MIM diode 905. It may be less expensive to produce a control matrix using the MIM diode 905 as a switch structure since these switches can be produced with one less deposition step, one less photomask, and have easier to achieve patterning dimensions when compared to the amorphous silicon transistor 518.

The thin film switches 901, 903, and 905 are just three examples of many possible variations on the structure of a thin film switch. It will be appreciated from the examples listed above and by those skilled in the art that other variations are possible. Similar structures can be built that include either a greater or fewer number of layers than those illustrated above or listed in procedure 700 or that include variations to the order of steps described within procedure 700.

Figure 10A:
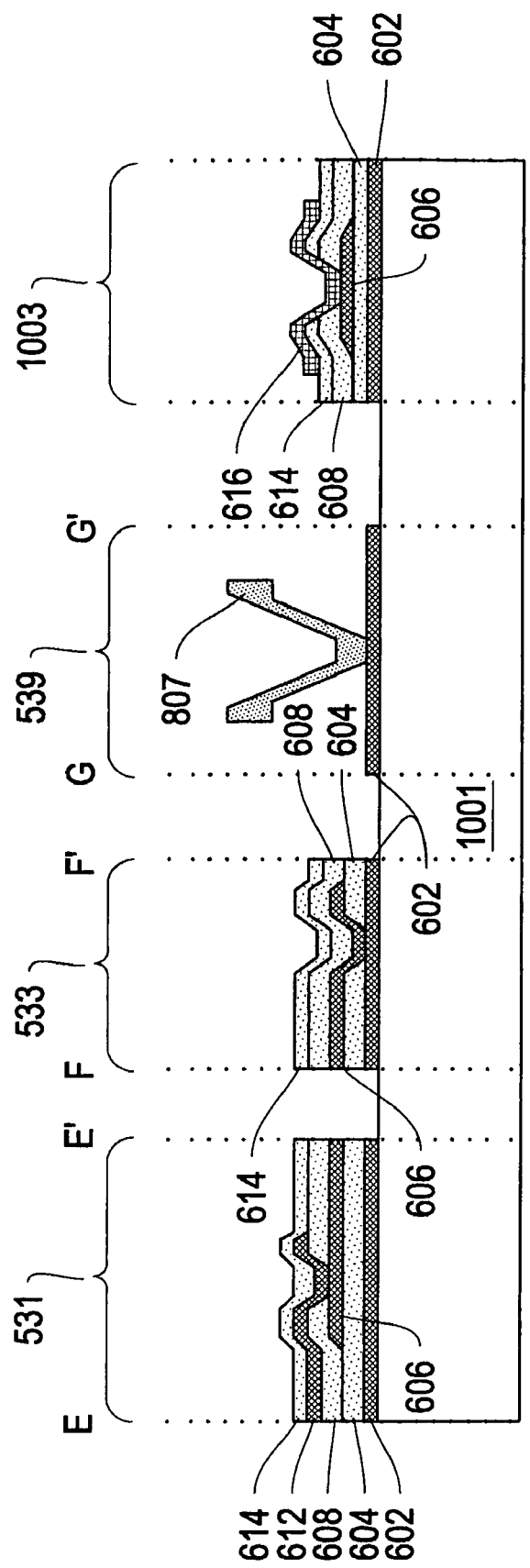
FIGS. 10A-10F are cross sectional views of stages of construction of the control matrix of FIG. 5C, according to an illustrative embodiment of the invention.

FIG. 10A presents a cross sectional view of several of the via structures that can be employed as elements of control matrix 500, especially to assist with the interconnection between transistors or between transistors and the anchors of the shutter assembly. FIG. 10A includes four distinct types of via structures. FIG. 10A includes the M1-M2 via 531, which is a via for connecting the first conductor layer 606 to the second conductor layer 612. FIG. 10A includes the Ap-M1 via 533, which is a via that connects the aperture layer 602 to the first conductor layer 606. FIG. 10A also illustrates the shutter anchor 539, which provides the mechanical and electrical support or connection between the shutter 545 and the control matrix 500. The structures in FIG. 10A are illustrated as if they are adjacent to each other on the substrate 1001, but this is for illustrative purposes only so that a common height reference might be given. Cross section markers such as E-E' or F-F' are given so that the reader can identify the positional relationships of these structures within the pixel by comparing markers in FIGS. 10A through 10F to the same markers in FIG. 5B/5C.

FIG. 10A also illustrates a cross section through a bond pad 1003. The bond pad 1003 facilitates the electrical connection between first conductor layer 606 and driver chips or voltage sources which might be mounted around the periphery of the display. The bond pad is not shown in FIG. 5B/5C.

Each of the via structures shown in FIG. 10A includes several metal and dielectric layers in common. Each of these via structures includes an aperture layer 602, a first dielectric layer 604, a first conductor layer 606, a second dielectric layer 608, a second conductor layer 612, a third dielectric layer 614, a third conductor layer 616, and a shutter layer 807.

The procedure 700 described in FIG. 7 can be used to build each of the via structures described in FIG. 10A. A step-by-step description of the manufacturing process is illustrated with respect to the via structures in FIGS. 10B-10F. FIGS. 10B-10F also illustrate typical design guidelines that are incorporated in photomasks applied at the various steps of procedure.

Figure 10B:
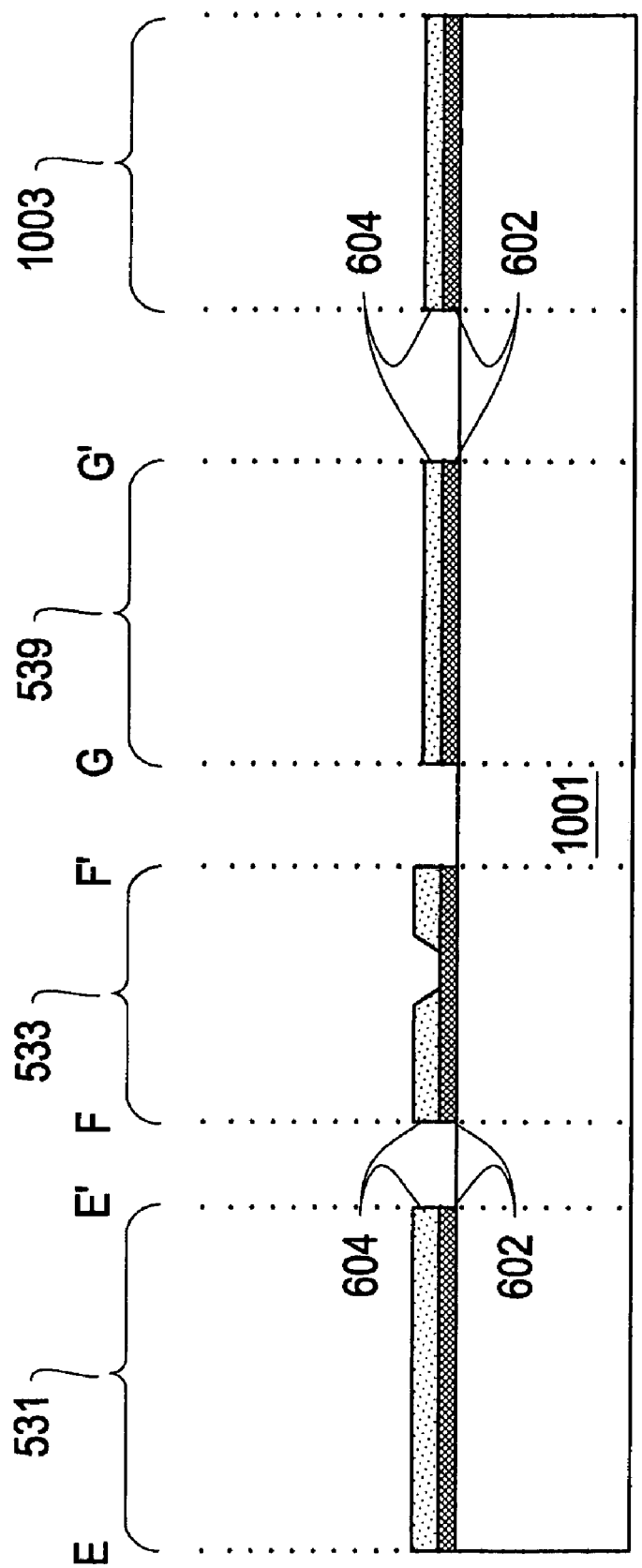

FIG. 10B shows the structure of the M1-M2 via 531, the Ap-M1 via 533, the shutter anchor 539, and the bond pad 1003 after application of steps 705 and 710 of procedure 700. The via structures in FIG. 10A receive blanket depositions of the aperture layer 602 followed by a blanket deposition of the first dielectric layer 604. The via structures in FIG. 10A do not require any patterning at step 705 for the aperture layer 602. Only one of the via structures, namely the Ap-M1 via 533, requires any patterning at the first dielectric step—step 710. In the case of Ap-M1 533, a via opening is etched through first dielectric layer 604 so that subsequent electrical contact can be made to the aperture layer 602 through the Ap-M1 via. The width of the via hole is typically 2 to 30 microns. The via holes are typically square although rectangular vias are also possible. The thickness of the first dielectric layer is typically in the range of 0.1 to 2.0 microns.

Figure 10C:
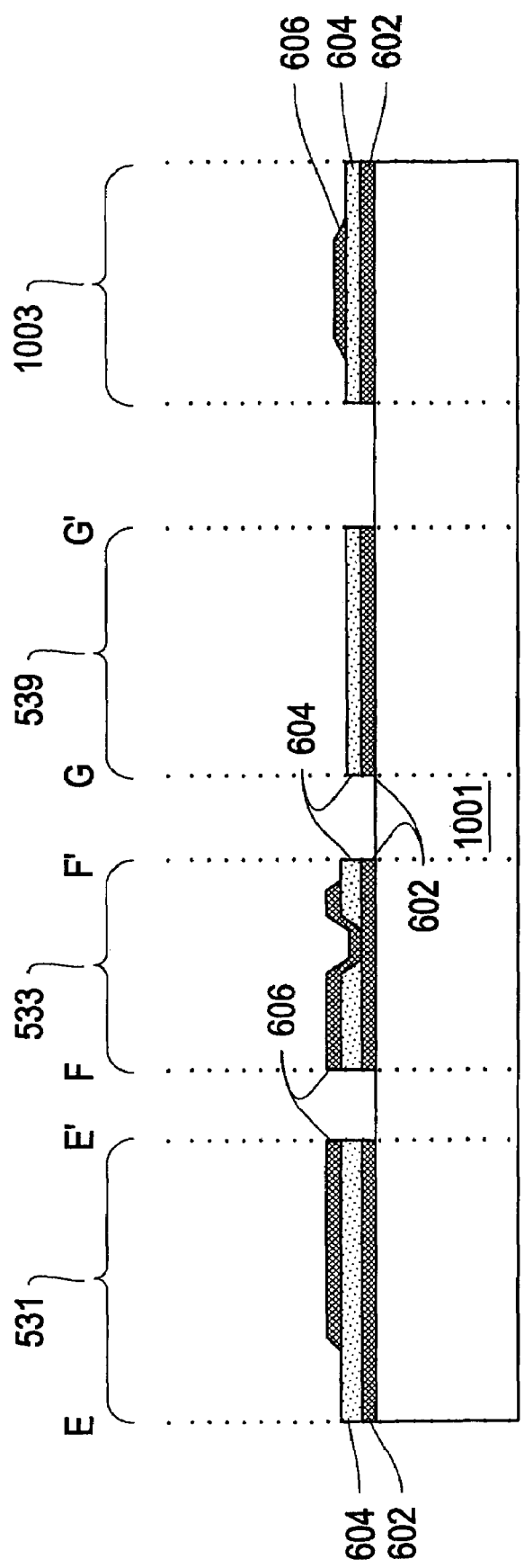

FIG. 10C shows the structure of the M1-M2 via 531, the Ap-M1 via 533, the shutter anchor 539, and the bond pad 1003 after application of step 715 of procedure 700. FIG. 10C includes pre-existing layers 602, 604. When deposited, the first conductor layer 606 completely fills the via that was opened in the first dielectric layer of the Ap-M1 via 533. Preferred design guidelines indicate that patterned metal depositions should overfill the via holes provided in previous steps by at least 2 microns. FIG. 10C also shows that, at shutter anchor 539, the first conductor layer 606 is completely etched away after deposition to reveal the first dielectric layer 604. All patterned edges of the first conductor layer 606 are beveled. Most etch chemistries available for metals in the first conductor layer 606 have a good selectivity to the underlying first dielectric layer 604, so that the metal etch does not appreciably attack the underlying dielectric layer. Preferred design guidelines avoid situations in which the etch of one metal layer is required to stop an underlying metal layer.

Figure 10D:
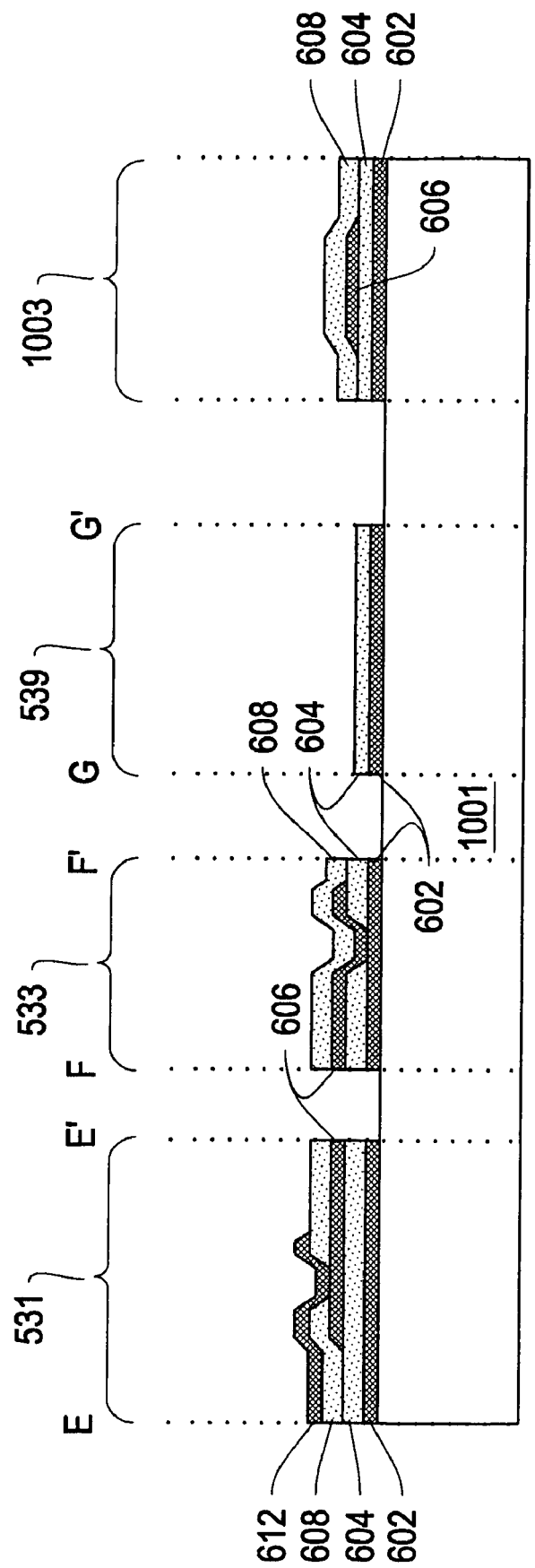

FIG. 10D shows the structure of the M1-M2 via 531, the Ap-M1 via 533, the shutter anchor 539, and the bond pad 1003 after application of application of steps 720, 725, and 730 of the procedure 700. FIG. 10D includes pre-existing layers 602, 604, and 606. Step 720 is used to deposit the second dielectric layer 608, with patterning to open up a via in the M1-M2 structure 531. Blanket (i.e. unpatterned) dielectric is allowed to remain over all of the other via structures. The semiconductor layer 610 is not included in any of the via structures in FIG. 10A. At step 725, the first semiconductor 610 is etched away from each of the structures in FIG. 10D. In step 730, the second conductor layer is allowed to completely fill the M1-M2 via 531 that was provided by etching through the second dielectric material 608. The second conductor layer 612 is completely removed from the surfaces of the other vias, with the metal etch stopping on all underlying dielectric layers.

Figure 10E:
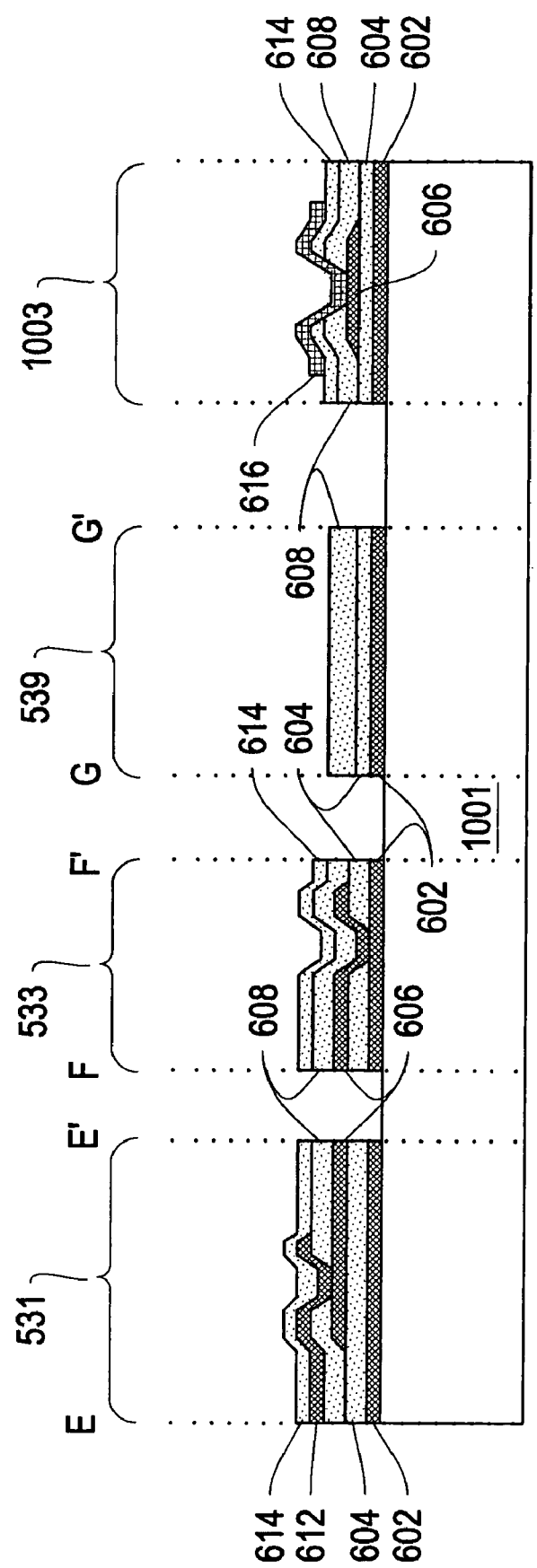

FIG. 10E shows the structure of the M1-M2 via 531, the Ap-M1 via 533, the shutter anchor 539, and the bond pad 1003 after application of application of steps 735 and 740 of the procedure 700. FIG. 10E includes pre-existing layers 602, 604, 606, 608, and 612. The purpose of step 735 is to use the third dielectric layer 614 to passivate and protect the surface of all transistors and interconnect materials, as is shown at the M1-M2 via 531 and at the Ap-M1 via 533. The third conductor layer 616 is not included and therefore completely removed from M1-M2 via 531 and from the Ap-M1 via 533 at step 740 of the process. Both the third dielectric layer 614 and the third conductor layer 616 are removed in the region of the shutter anchor 539.

FIG. 10E illustrates the completion of bond pad 1003. The purpose of bond pad 1003 is to provide a via through the third dielectric layer 614 for purpose of making electrical contact to underlying conductor layers at the periphery of the display. The bond pad 1003 shows an electrical via or contact between the third conductor layer 616 and the first conductor layer 606. The via etching step that takes place within step 735 is unusual in that it is designed to etch through both the third dielectric layer 614 and the second dielectric layer 608, and to end on any underlying metal. In the region of shutter anchor 539, the etch employed for dielectric layers 614 and 608 will etch part way into, but not all of the way into the first dielectric layer 604. Step 740 provides a for the filling of the bond pad 1003 with the third conductor layer 616, which is patterned to cover and passivate the bond pads on the periphery of the display.

Figure 10F:
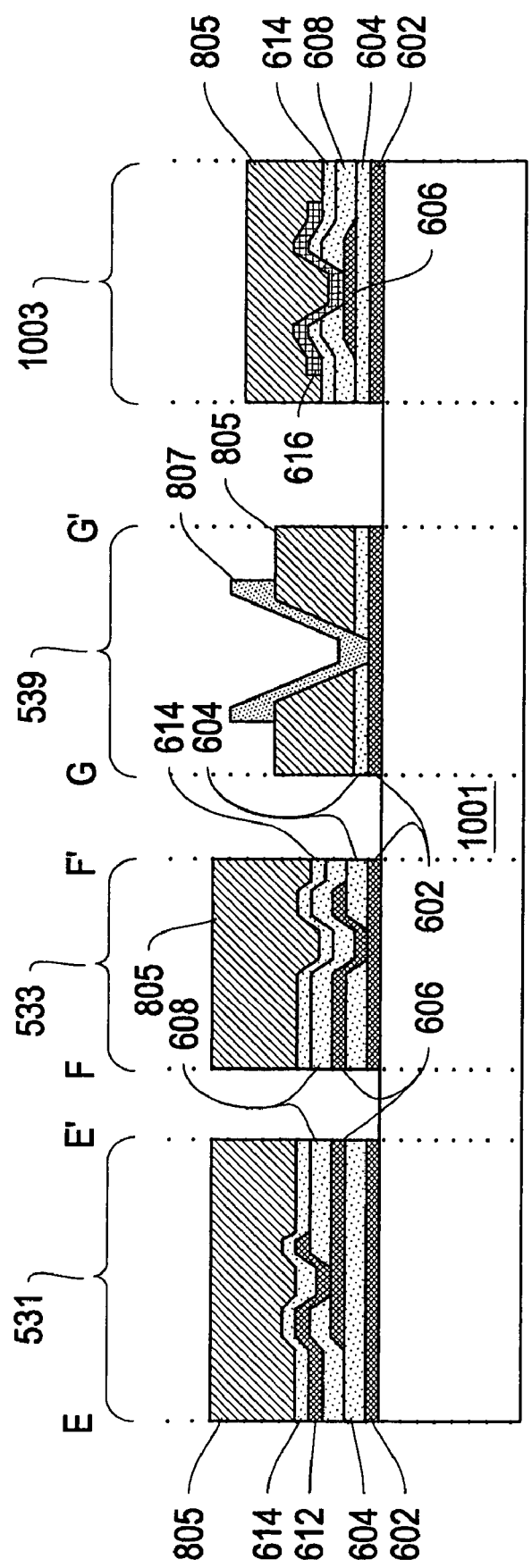

FIG. 10F shows the structure of the M1-M2 via 531, the Ap-M1 via 533, the shutter anchor 539, and the bond pad 1003 after application of steps 745 and 750 of procedure 700. FIG. 10E includes pre-existing layers 602, 604, 606, 608, 612, 614, and 616. The sacrificial layer 805 of step 745 is allowed to cover or passivate all structures except at the shutter anchor 539, which forms the mechanical attachment for the shutter and load beams. Details of this sacrificial layer will be presented layer with respect to FIG. 12. Step 750 includes the deposition and patterning of the shutter material, which will be detailed with respect to FIG. 12.

The final step in the formation of these via structures is described as step 755 of procedure 700—the removal of the sacrificial layer. After step 755 is complete the final structure of all vias is complete, as is illustrated in FIG. 10A.

It should be appreciated that other variations are possible. Comparing FIG. 10A to FIG. 8H, one sees that the shutter anchor and the drive anchor have been established at different metal layers: The drive anchor 535 connects directly to the first conductor layer 606, while the shutter anchor 539 connects directly to the aperture layer. Embodiments are also possible in which the shutter anchor and the drive anchor attach to the same metal layer, such as the first conductor layer 606, which can reduce any mechanical height differences in the shutter assembly 504.

Not shown in FIGS. 8A-8H or in FIG. 10A-10E are the formation of interconnect lines such as scan line interconnect 506, or data line interconnect 508a, or pre-charge interconnect 510. It should be appreciated that these interconnects can feasibly be created within procedure 700 by creating the appropriate photopattern in any of the conductor layers of control matrix 500, such as the aperture layer 602, first conductor layer 606, second conductor layer 608, third conductor layer 616, or in the shutter layer 807.

Figure 11:
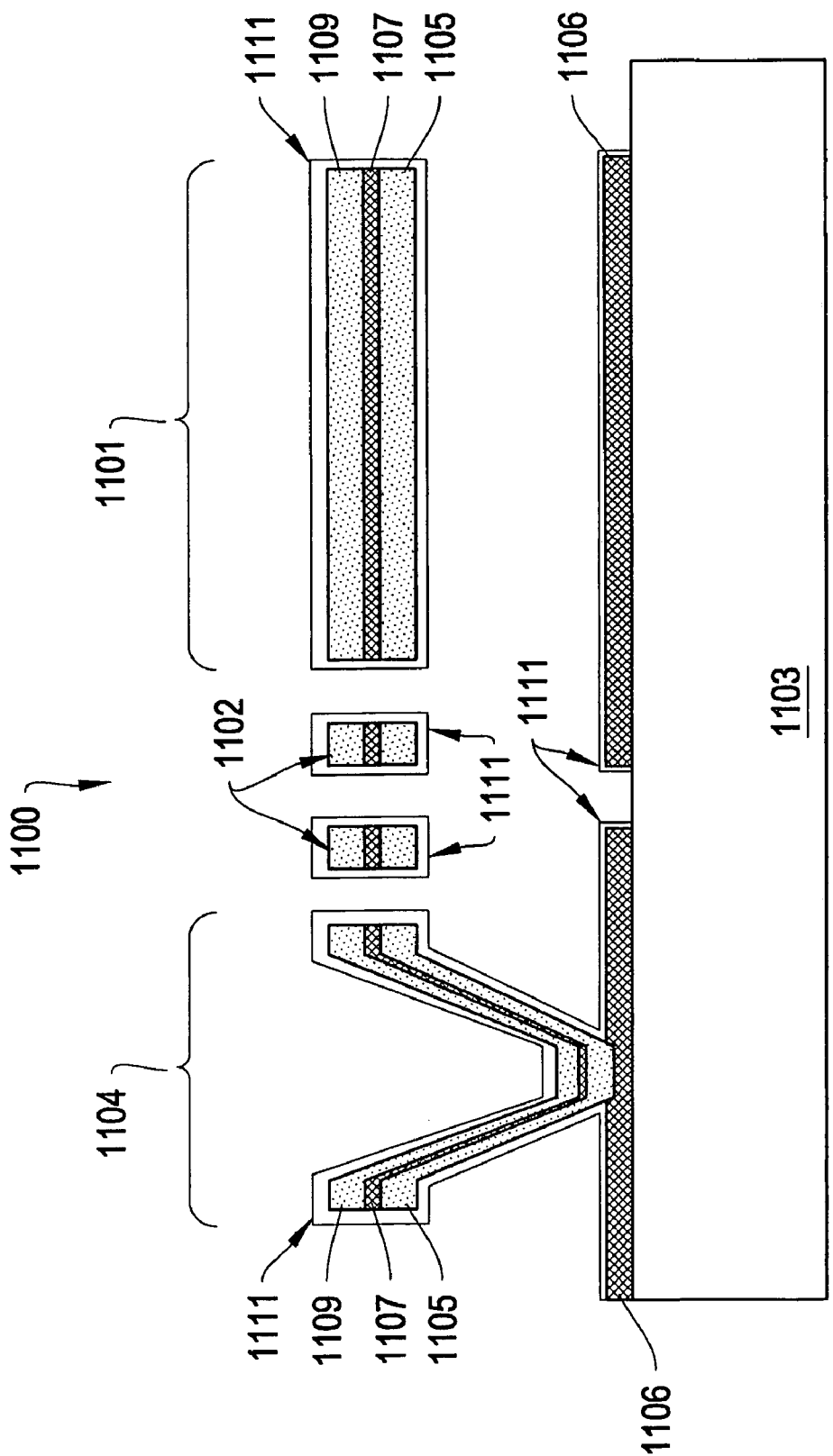
FIG. 11 is a cross sectional detail of a composite shutter assembly for use in the control matrix of FIG. 5C, according to an illustrative embodiment of the invention.

FIG. 11 shows a cross sectional detail of a composite shutter assembly 1100, including shutter 1101, a compliant beam 1102, and anchor structure 1104 built-up on substrate 1103 and aperture layer 1106 according to one implementation of the MEMS-based shutter display. The elements of the composite shutter assembly include a first mechanical layer 1105, a conductor layer 1107, a second mechanical layer 1109, and an encapsulating dielectric 1111. At least one of the mechanical layers 1105 or 1109 will be deposited to thicknesses in excess of 0.15 microns, as one or both of the mechanical layers will comprise the principle load bearing and mechanical actuation member for the shutter assembly. Candidate materials for the mechanical layers 1105 and 1109 include, without limitation, metals such as Al, Cu, Ni, Cr, Mo, Ti, Ta, Nb, Nd, or alloys thereof; dielectric materials such as $Al_2O_3$, $SiO_2$, $Ta_2O_5$, or $Si_3N_4$; or semiconducting materials such as diamond-like carbon, Si, Ge, GaAs, CdTe or alloys thereof. At least one of the layers, such as conductor layer 1107, should be electrically conducting so as to carry charge on to and off of the actuation elements. Candidate materials include, without limitation, Al, Cu, Ni, Cr, Mo, Ti, Ta, Nb, Nd, or alloys thereof or semiconducting materials such as diamond-like carbon, Si, Ge, GaAs, CdTe or alloys thereof, especially when the semiconductors are doped with impurities such as phosphorus, arsenic, boron, or aluminum. FIG. 11 shows a sandwich configuration for the composite in which the mechanical layers 1105 and 1109 with similar thicknesses and mechanical properties are deposited on either side of the conductor layer 1107. Such a sandwich structure helps to ensure that stresses that remain after deposition and/or stresses that are imposed by temperature variations will not act cause bending or warping of the shutter assembly 1100.

At least one of the materials in the thin film stack of the shutter 1101 should be a light blocker, i.e. opaque in the visible spectrum. If metals are used either in mechanical layer 1105 or for the conductor layer 1107 in the shutter, they will be effective at blocking more than 95% of the incident light. Semiconducting materials may also be opaque toward visible light, particularly if they are provided at thicknesses in excess of 0.5 microns.

It is preferable that at least one of the materials in the shutter 1101 also be a light absorber, so that incident light is substantially absorbed instead of merely reflected. (many metals will block light primarily by means of reflection instead of absorption). Some metal alloys, useful for layers 1105, 1107, or 1109 are particularly effective at absorbing the light. These include without limitation, MoCr, MoW, MoTi, MoTa, TiW, and TiCr alloys which, in some cases, absorb more than 30% of the incident light. Semiconductor materials, such as amorphous or polycrystalline Si, Ge, CdTe, InGaAs, colloidal graphite (carbon) and alloys such as SiGe are also effective at absorption of light.

In some implementations the order of the layers in composite shutter assembly 1100 can be inverted, such that the outside of the sandwich is comprised of a conducting layer while the inside of the sandwich is comprised of a mechanical layer.

If further reductions in the amount of transmitted light through the shutter 1101 and/or increases in the amount of light absorption are desired, then additional absorptive coatings can be added to the either to the top surface, the bottom surface, or to both surfaces of composite shutter 1101 (not shown). Some deposited metal coatings which are effective at light absorption include, without limitation Ni, Cr, Ti, Zr and alloys such as MoCr, MoW, MoTi, MoTa, TiW, and TiCr.

Rough metal coatings enhance absorptivity. Such rough surfaces can be produced by sputter deposition in high gas pressures (sputtering atmospheres in excess of 20 mtorr).

Semiconductor coating materials for shutter assembly 1100, such as amorphous or polycrystalline Si, Ge, CdTe, InGaAs, colloidal graphite (carbon) and alloys such as SiGe are also effective at absorption of light. Coatings made from metal oxides or nitrides can also be effective at absorbing light, including without limitation CuO, NiO, $Cr_2O_3$, AgO, SnO, ZnO, TiO, $Ta_2O_5$, $MoO_3$, CrN, TiN, or TaN. The absorption of these oxides or nitrides improves if the oxides are prepared or deposited in non-stoichiometric fashion—often by sputtering or evaporation—especially if the deposition process results in a deficit of oxygen or nitrogen in the lattice.

The class of cermet materials is also effective as an absorptive coating for shutter assembly 1100. Cermets are typically composites of small metal particles suspended in an oxide or nitride matrix. Examples include Cr particles in a $Cr_2O_3$ matrix or Cr particles in an $SiO_2$ matrix. Other metal particles suspended in the matrix can be Ni, Ti, Au, Ag, Mo, Nb, and carbon. Other matrix materials include $TiO_2$, $Ta_2O_5$, $Al_2O_3$, and $Si_3N_4$.

For the purposes of coating shutter assembly 1100 in a light absorbing material, polymer coatings or resins that include light absorbing dyes can also be employed.

It is also possible to create shutter coatings from multi-layer absorbing structures by using destructive interference of light between suitable thin film materials. A typical implementation would involve a partially reflecting layer of an oxide or nitride along with a metal of suitable reflectivity. The oxide can be a metal oxide e.g. $CrO_2$, $TiO_2$, $Al_2O_3$ or $SiO_3$ or a nitride like $Si_3N_4$ and the metal can be suitable metals like Cr, Mo, Al, Ta, Ti. In one implementation, the metal layer is deposited first followed by deposition of the metal oxide or nitride. In both cases the absorptivity of bi-layer can be optimized if the thickness of the oxide or nitride layer is chosen to be substantially equal to one quarter of 0.55 microns divided by the refractive index of the oxide layer.

For some applications it is desired that one surface of the shutter 1101 be absorptive while the opposite surface be a reflector. If any one of the mechanical layers 1105 or 1109 in FIG. 11 are comprised of a smooth metal, then substantial reflectivity will result. In other applications it may be desirable to add a reflective coating specifically to either the top or the bottom of the shutter. Good reflective coatings include smooth depositions of Al, Au, Ag, Cr, Ni, or Nb, in many cases further coated with an oxide or dielectric.

Shutter assembly 1100 includes an encapsulating dielectric layer 1111. Dielectric coatings can be applied in conformal fashion, such that all bottom, tops, and side surfaces of the shutters and beams are uniformly coated. Such thin films can be grown by thermal oxidation and/or by conformal chemical vapor deposition of an insulator such as $Al_2O_3$, $Cr_2O_3$, $TiO_2$, $HfO_2$, $V_2O_5$, $Nb_2O_5$, $Ta_2O_5$, $SiO_2$, or $Si_3N_4$, or by depositing similar materials by means of atomic layer deposition. The dielectric coating layer can be applied with thicknesses in the range of 10 nm to 1 micron. In some cases sputtering and evaporation can be used to deposit the dielectric coating onto sidewalls.

FIGS. 12A-12D show the process for building shutter assembly 1100, including shutter 1101, a compliant beam 1102, and anchor structure 1104 on top of a substrate 1103 and aperture layer 1106, starting after the point where row and column metallizations, and optionally TFTs have already been fabricated on a glass substrate, for instance starting from step 745 of procedure 700.

Figure 12A:
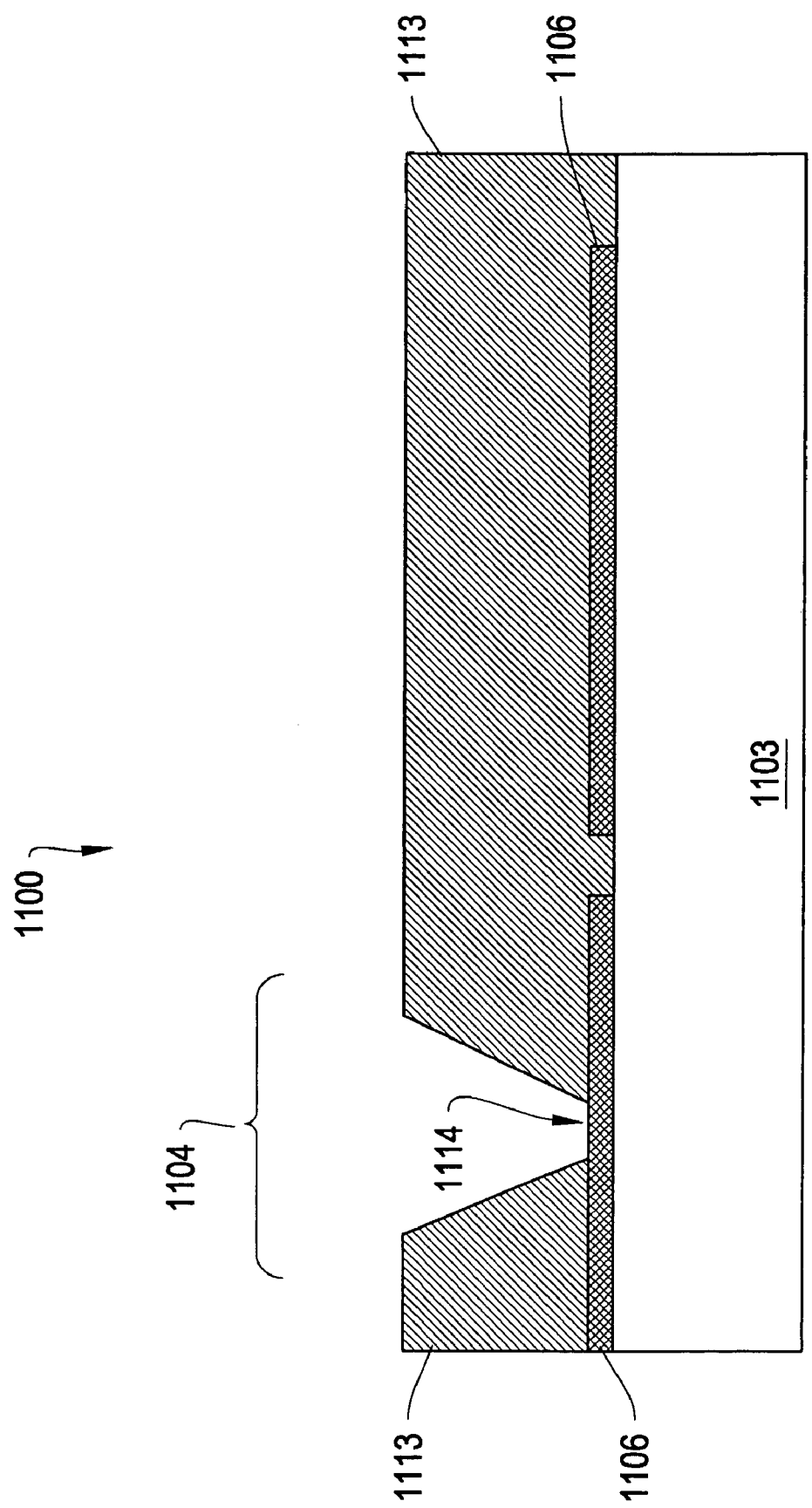
FIGS. 12A-12D are cross sectional views of stages of construction of the composite shutter assembly shown in FIG. 11, according to an illustrative embodiment of the invention.

FIG. 12A is a cross sectional view of a first step in the process of forming the shutter assembly 1100 according to an illustrative embodiment of the invention. As shown in FIG. 12A, a sacrificial layer 1113 is deposited and patterned. Polyimide is a preferred sacrificial material. Other candidate sacrificial material include polymer materials such as polyamide, fluoropolymer, benzocyclobutene, polyphenylquinoxylene, parylene, or polynorbornene. These materials are chosen for their ability to planarize rough surfaces, maintain mechanical integrity at processing temperatures in excess of 250 C, and their ease of etch and/or thermal decomposition during removal. Alternate sacrificial layers can be found among the photoresists: polyvinyl acetate, polyvinyl ethylene, and phenolic or novolac resins, although their use will typically be limited to temperatures below 350 C. An alternate sacrificial layer is $SiO_2$, which can be removed preferentially as long as other electronic or structural layers are resistant to the hydrofluoric acid solutions used for its removal ($Si_3N_4$ is so resistant). Another alternate sacrificial layer is silicon, which can be removed preferentially as long as other electronic and structural layers are resistant to the fluorine plasmas or $XeF_2$ used for its removal (most metals and/or $Si_3N_4$ are so resistant). Yet another alternate sacrificial layer is aluminum, which can be removed preferentially as long as other electronic or structural layers are resistant to strong base (concentrated NaOH) solutions (Cr, Ni, Mo, Ta, and Si are so resistant). Still another alternate sacrificial layer is copper, which can be removed preferentially as long as other electronic or structural layers are resistant to nitric or sulfuric acid solutions (Cr, Ni, and Si are so resistant).

Next the sacrificial layer 1113 is patterned to expose holes or vias at the anchor regions 1104. The preferred polyimide material and other polymer resins can be formulated to include photoactive agents—enabling regions exposed through a UV photomask to be preferentially removed in a developer solution. Other sacrificial layers 1113 can be patterned by coating the sacrificial layer in an additional layer of photoresist, photopatterning the photoresist, and finally using the photoresist as an etching mask. Other sacrificial layers can be patterned by coating the sacrificial layer with a hard mask, which can be a thin layer of $SiO_2$ or metal such as chromium. A photopattern is then transferred to the hard mask by means of photoresist and wet chemical etching. The pattern developed in the hard mask can be very resistant to dry chemical, anisotropic, or plasma etching—techniques which can be used to impart very deep and narrow anchor holes into the sacrificial layer.

After the anchor 1104 or via regions have been opened in the sacrificial layer, the exposed and underlying conducting surface 1114 can be etched, either chemically or via the sputtering effects of a plasma, to remove any surface oxide layers. Such a contact etching step can improve the ohmic contact between the underlying conductor and the shutter material.

After patterning of the sacrificial layer, any photoresist layers or hard masks can be removed through use of either solvent cleans or acid etching.

Figure 12B:
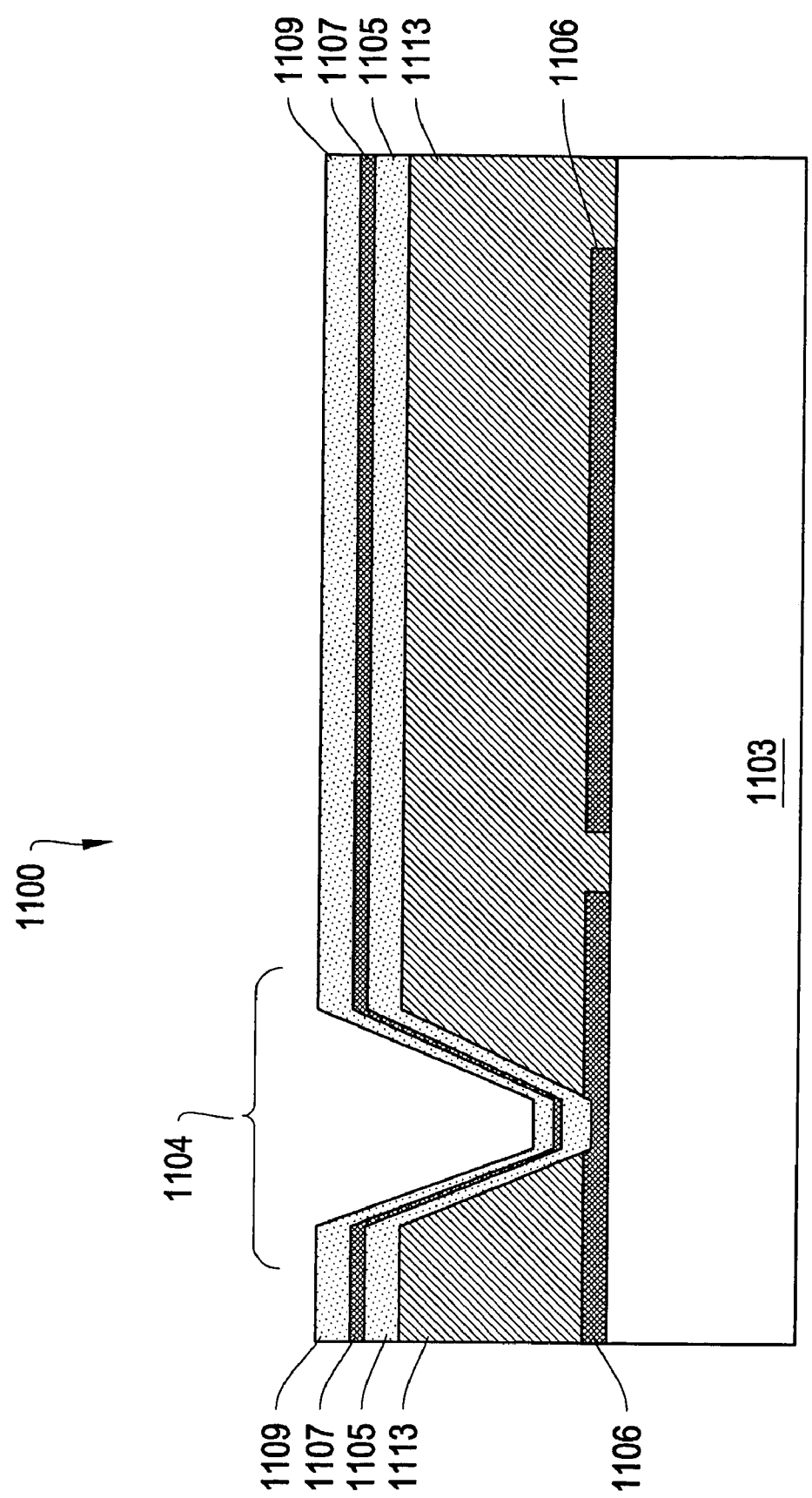

Next, in the process for building shutter assembly 1100, as shown in FIG. 12B, the shutter materials are deposited. The shutter assembly 1100 is composed of multiple thin films 1105, 1107, and 1109. In a preferred embodiment the first mechanical layer 1105 is an amorphous silicon layer, deposited first, followed by a conductor layer 1107 comprised of aluminum, followed by a second layer 1109 of amorphous silicon. The deposition temperature used for the shutter materials 1105, 1107, and 1109 is below that at which physical degradation occurs for the sacrificial layer. For instance, polyimide is known to decompose at temperatures above 400 C. The shutter materials 1105, 1107 and 1109 can be deposited at temperatures below 400 C, thus allowing usage of polyimide as a sacrificial material. Hydrogenated amorphous silicon is a useful mechanical material for layers 1105 and 1109 since it can be grown to thicknesses in the range of 0.15 to 3 microns, in a relatively stress-free state, by means of plasma-assisted chemical vapor deposition (PECVD) from silane gas at temperatures in the range of 250 to 350 C. Phosphene gas (PH3) is used as a dopant so that the amorphous silicon can be grown with resistivities below 1 ohm-cm. In alternate embodiments, a similar PECVD technique can be used for the deposition of $Si_3N_4$, silicon-rich $Si_3N_4$, or $SiO_2$ materials as the mechanical layer 1105 or for the deposition of diamond-like carbon, Ge, SiGe, CdTe, or other semiconducting materials for mechanical layer 1105. An advantage of the PECVD deposition technique is that the deposition can be quite conformal, that is, it can coat a variety of inclined surfaces or the inside surfaces of narrow via holes. Even if the anchor or via holes which are cut into the sacrificial material present nearly vertical sidewalls, the PECVD technique can provide a continuous coating between the bottom and top horizontal surfaces of the anchor.

In addition to the PECVD technique, alternate techniques available for the growth of shutter layers 1105 or 1109 include RF or DC sputtering, metal-organic chemical vapor deposition, evaporation, electroplating or electroless plating.

For the conducting layer 1107, a metal thin film such as Al is preferred, although alternates such as Cu, Ni, Mo, or Ta can be chosen. The inclusion of such a conducting material serves two purposes. It reduces the overall sheet resistance of the shutter material and it helps to block the passage of visible light through the shutter material. (Amorphous silicon, if grown to thicknesses of less than 2 microns can transmit visible light to some degree.) The conducting material can be deposited either by sputtering or, in a more conformal fashion, by chemical vapor deposition techniques, electroplating, or electroless plating.

Figure 12C:
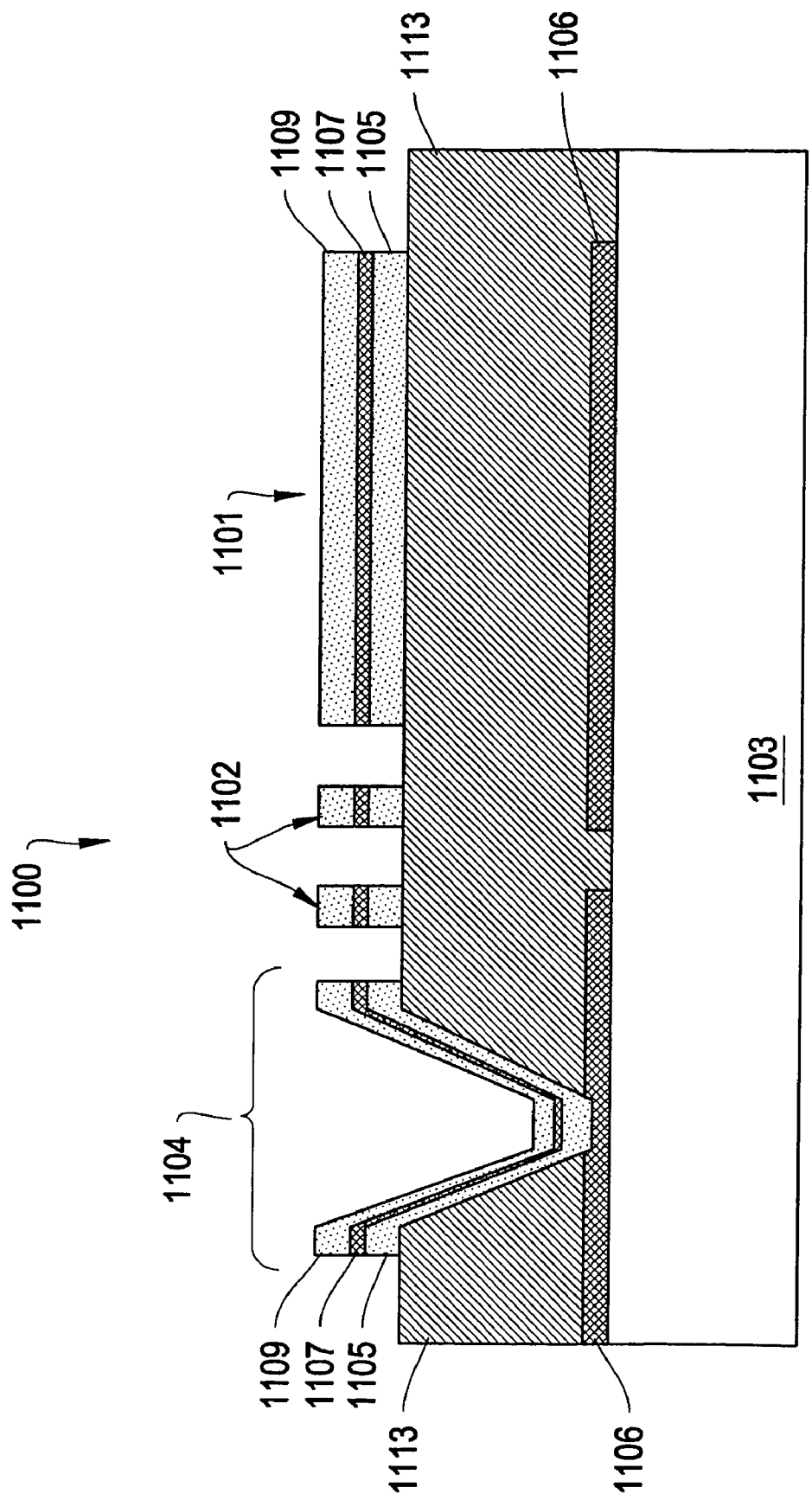

The process for building the shutter assembly 1100 continues in FIG. 12C. The shutter layers 1105, 1107, and 1109 are photomasked and etched while the sacrificial layer 1113 is still on the wafer. First a photoresist material is applied, then exposed through a photomask, and then developed to form an etch mask. Amorphous silicon, silicon nitride, and silicon oxide can then be etched in fluorine-based plasma chemistries. $SiO_2$ mechanical layers can be etched using HF wet chemicals; and any metals in the conductor layers can be etched with either wet chemicals or chlorine-based plasma chemistries.

Figure 12D:
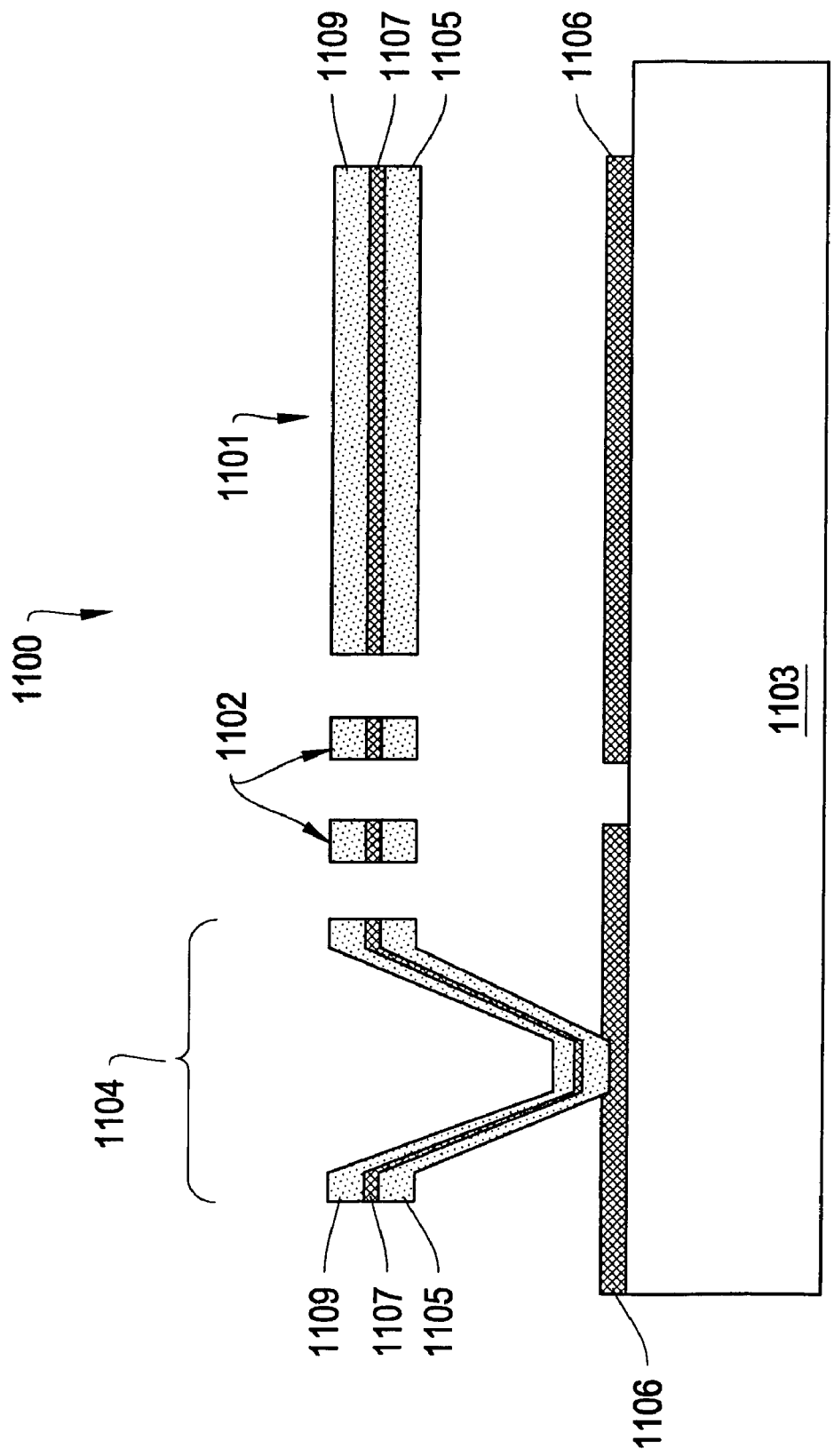

The pattern shapes applied through the photomask at FIG. 12C influence the mechanical properties, such as stiffness, compliance, and the voltage response in the actuators and shutters of the shutter assembly 1100. The shutter assembly 1100 includes a compliant beam 1102, shown in cross section. Compliant beam 1102 is shaped such that the width is less than the total height or thickness of the shutter material. It is preferable to maintain a beam dimensional ratio of at least 1.4:1, with the beams 1102 being taller or thicker than they are wide The process for building the shutter assembly 1100 continues as depicted in FIG. 12D. The sacrificial layer 1113 is removed, which frees-up all moving parts from the substrate 1103, except at the anchor points. Polyimide sacrificial materials are preferably removed in an oxygen plasma. Other polymer materials used for sacrificial layer 1113 can also be removed in an oxygen plasma, or in some cases by thermal pyrolysis. Some sacrificial layers 1113 (such as $SiO_2$) can be removed by wet chemical etching or by vapor phase etching.

In a final process, not shown in FIG. 12D but shown in FIG. 11, a dielectric coating 1111 is deposited on all exposed surfaces of the shutter. Dielectric coatings 1111 can be applied in conformal fashion, such that all bottom, tops, and side surfaces of the shutters 1101 and beams 1102 are uniformly coated using chemical vapor deposition. $Al_2O_3$ is a preferred dielectric coating for layer 1111, which is deposited by atomic layer deposition to thicknesses in the range of 10 to 30 nanometers.

Finally, anti-stiction coatings can be applied to the surfaces of all shutters 1101 and beams 1102. These coatings prevent the unwanted stickiness or adhesion between two independent beams of an actuator. Applicable coatings include carbon films (both graphite and diamond-like) as well as fluoropolymers, and/or low vapor pressure lubricants. These coatings can be applied by either exposure to a molecular vapor or by decomposition of a precursor compounds by means of chemical vapor deposition. Anti-stiction coatings can also be created by the chemical alteration of shutter surfaces, as in the fluoridation, silanization, siloxidation, or hydrogenation of insulating surfaces.

U.S. patent application Ser. No. 11/251,035 describes a number of useful designs for shutter assemblies and actuators. One class of suitable actuators for use in MEMS-based shutter displays include compliant actuator beams for controlling shutter motion that is transverse to or in-the-plane of the display substrate. The voltage necessary for the actuation of such shutter assemblies decreases as the actuator beams become more compliant. The control of actuated motion also improves if the beams are shaped such that in-plane motion is preferred or promoted with respect to out-of-plane motion. In a preferred design the compliant actuator beams have a rectangular cross section, such as beam 1102 of FIG. 12C, such that the beams are taller or thicker than they are wide.

The stiffness of a long rectangular beam with respect to curvature in a plane scales with the thinnest dimension of that beam in that plane to the third power. It is of interest, therefore, to reduce the width of the compliant beams as far as possible to reduce the actuation voltages for in-plane motion. Using the patterning techniques of FIGS. 11 and 12, however, the width of the beams is limited to the resolution of available (and economical) photolithography equipment. Although lithography equipment is available for defining patterns in photoresist with features as narrow as 15 nanometers, such equipment is expensive and the areas which can be patterned from a single exposure are limited. For economical photolithography over large panels of glass the resolution limit is more typically 1 micron or 2 microns.

FIGS. 13A-13D are isometric views of a shutter assembly 1300 in various stages of construction. Together, they demonstrate a processing method by which very narrow beams can be produced at dimensions well below the conventional lithography limits for large glass panels. In particular, FIGS. 13A-13D demonstrate a process by which the compliant beams of a shutter assembly 1300 are formed as sidewall features on a mold made of sacrificial material. FIGS. 13A-13D also demonstrate how a three-dimensional mold can be utilized to produce a shutter assembly 1300 with more complex three-dimensional (i.e. non-flat) shapes.

Figure 13A:
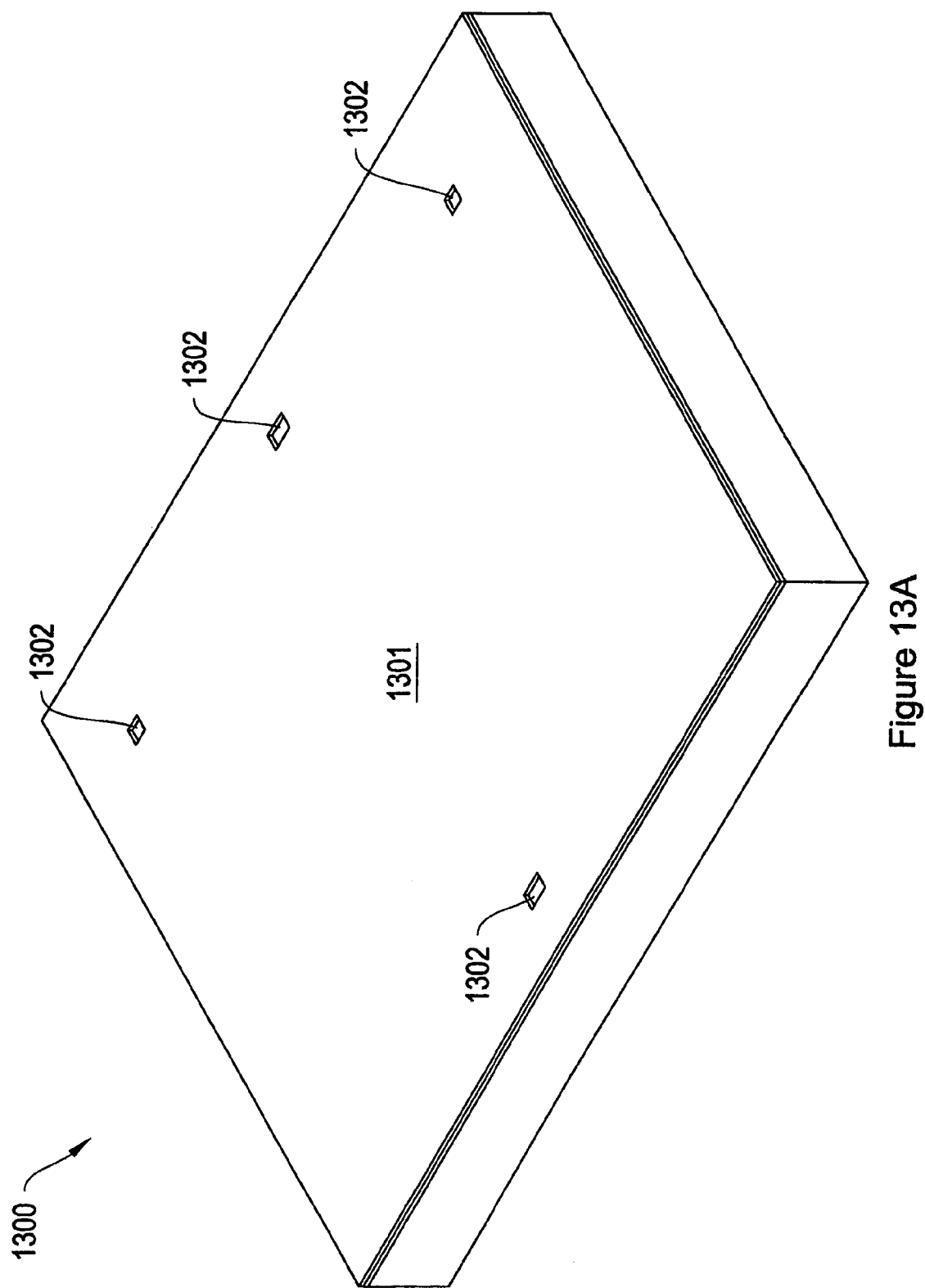
FIGS. 13A-13D are isometric views of stages of construction of an alternate shutter assembly with narrow sidewall beams, according to an illustrative embodiment of the invention.

The process of forming a shutter assembly 1300 with sidewall beams begins, as shown in FIG. 13A, with the deposition and patterning of a first sacrificial material 1301. The pattern defined in the first sacrificial material creates openings or vias 1302 within which anchors for the shutter will eventually be formed. The deposition and patterning of the first sacrificial material 1301 is similar in concept, and uses similar materials, as those described for the deposition and patterning described in relation to FIG. 7, FIG. 8, and FIG. 12.

Figure 13B:
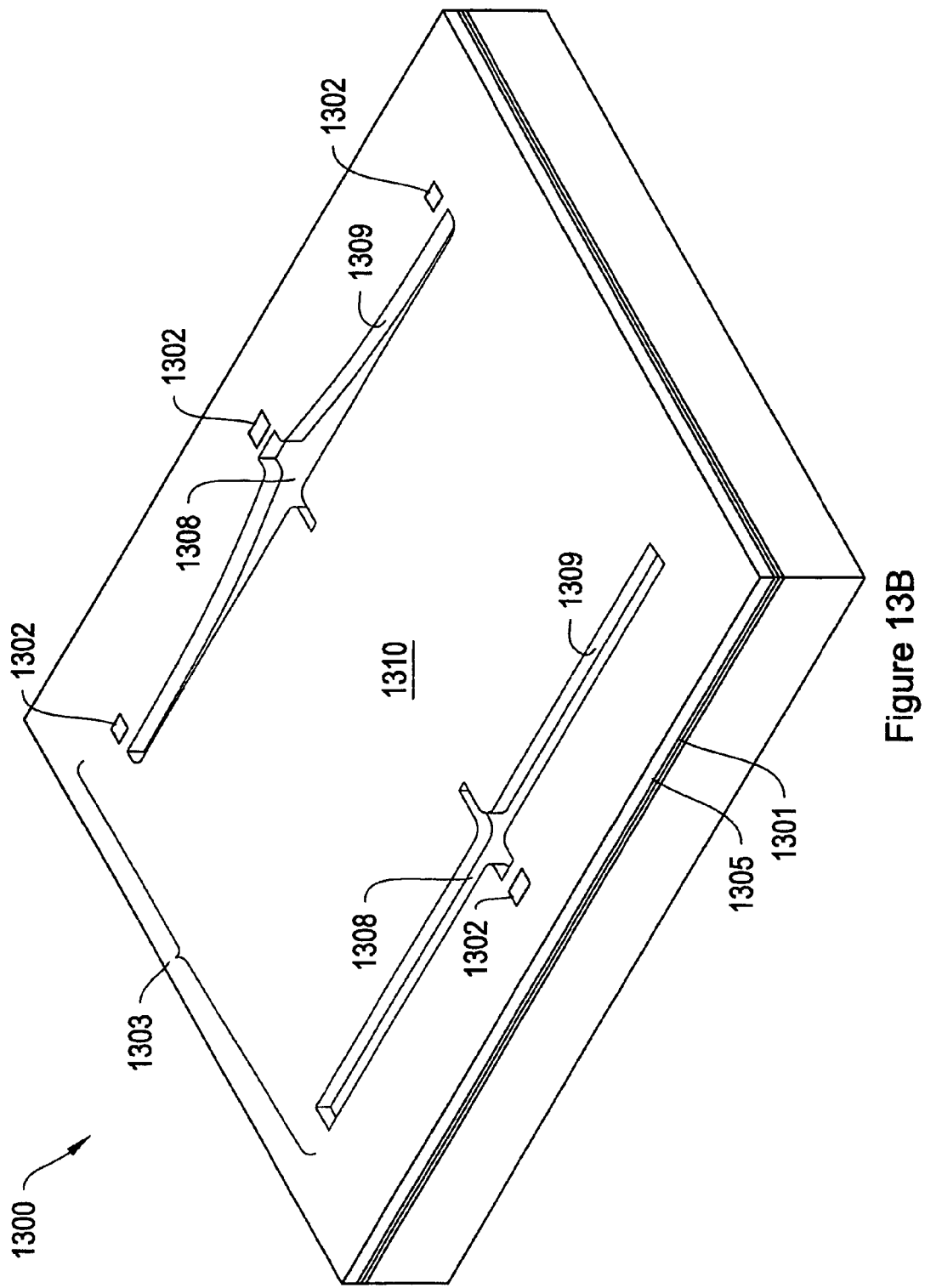

The process of forming sidewall beams continues with the deposition and patterning of a second sacrificial material 1305. FIG. 13B shows the shape of a mold 1303 that is created after patterning of the second sacrificial material 1305. The mold 1303 also includes the first sacrificial material 1301 with its previously defined vias 1302. The mold 1303 in FIG. 13B includes two distinct horizontal levels: The bottom horizontal level 1308 of mold 1303 is established by the top surface of the first sacrificial layer 1301 and is accessible in those areas where the second sacrificial layer 1305 has been etched away. The top horizontal level 1310 of the mold 1303 is established by the top surface of the second sacrificial layer 1305. The mold 1303 illustrated in FIG. 13B also includes substantially vertical sidewalls 1309.

Figure 13C:
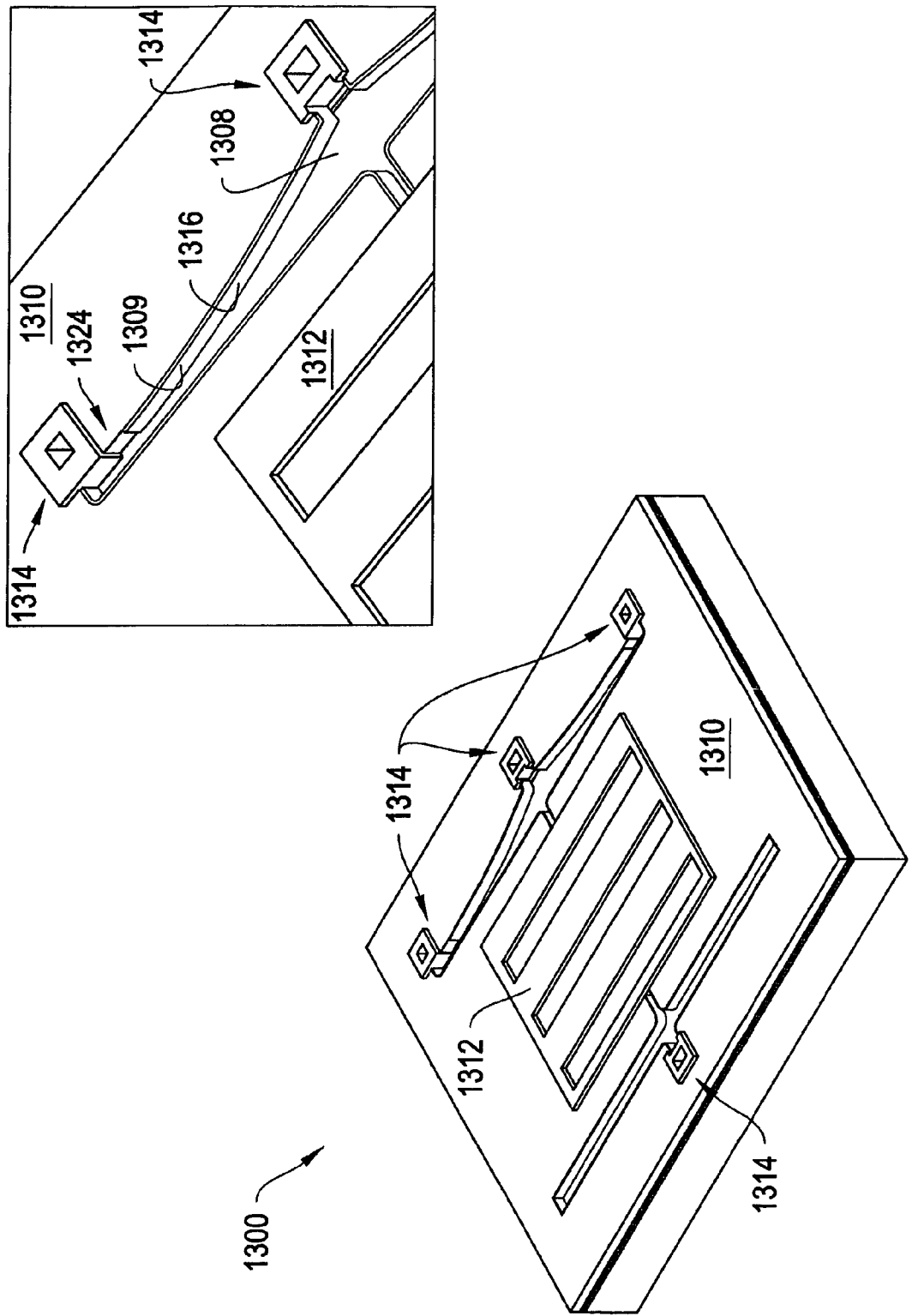

The process of forming sidewall beams continues with the deposition and patterning of the shutter material onto all of the exposed surfaces of the sacrificial mold 1303, as depicted in FIG. 13C. The shutter material is deposited to have a thickness of less than about 2 microns. In some implementations, the shutter material is deposited to have a thickness of less than about 1.5 microns. In other implementations, the shutter mater is deposited to have a thickness of less than about 1.0 microns, and as thin as about 0.15 microns. After deposition, the shutter material (which may be a composite shutter as described with respect to FIG. 11) is patterned, as shown in FIG. 13C. The pattern developed into the photoresist is designed such that shutter material remains in the region of shutter 1312 as well as at the anchors 1314.

Particular equipment and chemistries are also chosen for the etching process used at the step shown in FIG. 13C, known in the art as an anisotropic etch. The anisotropic etch of the shutter material is carried out in a plasma atmosphere with a voltage bias applied to the substrate, or to an electrode in proximity to the substrate. The biased substrate (with electric field perpendicular to the surface of the substrate) leads to acceleration of ions toward the substrate at an angle nearly perpendicular to the substrate. Such accelerated ions, coupled with the etching chemicals, lead to etch rates that are much faster in a direction that is normal to the plane of the substrate as compared to directions parallel to the substrate. Undercut-etching of shutter material in the regions protected by photoresist is thereby substantially eliminated. Along sidewall surfaces 1309 of mold 1303, which are substantially parallel to the track of the accelerated ions, the shutter material is also substantially protected from the anisotropic etch. Such protected sidewall shutter material will later form compliant beams 1316 for supporting the shutter 1312. Along other (non-photoresist-protected) horizontal surfaces of the mold, such as top horizontal surface 1310 or bottom horizontal surface 1308, the shutter material has been completely removed by the etch.

The anisotropic etch used to form sidewall beams 1316 can be achieved in either an RF or DC plasma etching device as long as provision for electrical bias of the substrate, or of an electrode in close proximity of the substrate, is supplied. For the case of RF plasma etching, an equivalent self-bias can be obtained by disconnecting the substrate holder from the grounding plates of the excitation circuit, thereby allowing the substrate potential to float in the plasma. In one implementation it is possible to provide an etching gas such as $CHF_3$, $C_4F_8$, or $CHCl_3$ in which both carbon and hydrogen and/or carbon and fluorine are constituents in the etch gas. When coupled with a directional plasma, achieved again through voltage biasing of the substrate, the liberated C, H, and/or F atoms can migrate to the sidewalls 1309 where they build up a passive or protective quasi-polymer coating. This quasi-polymer coating further protects the sidewall beams 1316 from etching or chemical attack.

Figure 13D:
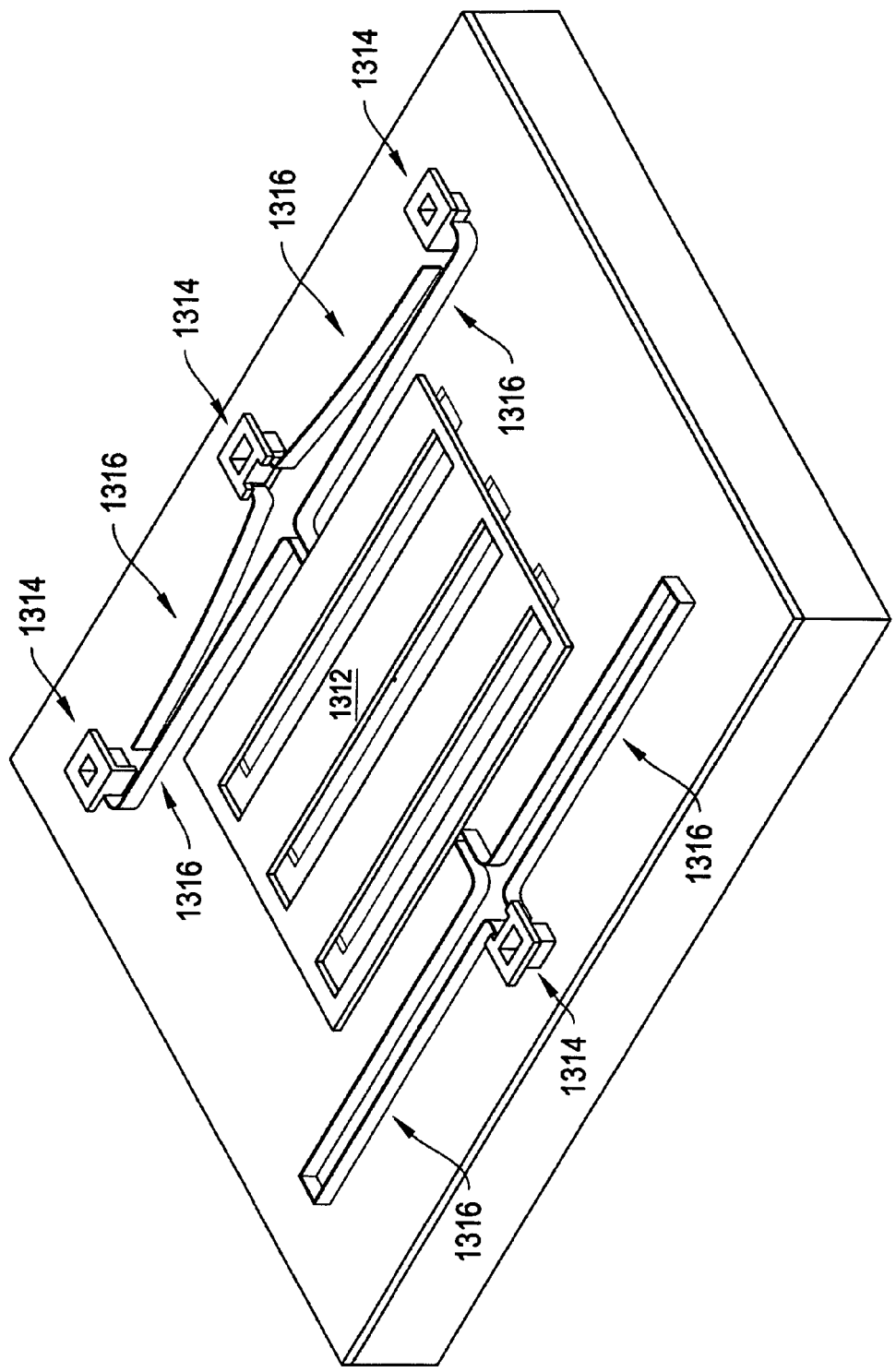

The process of forming sidewall beams is completed with the removal of the remainder of the second sacrificial layer 1305 and the first sacrificial layer 1301, the result being shown in FIG. 13D. The material deposited on the sidewalls 1309 of the mold 1303 remain as the compliant beams 1316. The compliant beams 1316 mechanically connect the anchors 1314 to the shutter 1312. The anchors connect to an aperture layer 1325. The compliant beams 1316 are tall and narrow. The width of the sidewall beams 1316, as formed from the surface of the mold 1303, is similar to the thickness of the shutter material as deposited. In some cases the beam width at 1316 will be the same as the thickness of the horizontal shutter material at 1312, in other cases the beam width will be only about ½ the thickness of the shutter material. The height of the sidewall beams 1316 is determined by the thickness of the second sacrificial material 1305, or in other words, by the depth of the mold 1303 as created during the patterning step described in relation to FIG. 13B. As long as the thickness of the deposited shutter material is chosen to be less than 2 microns (for many applications the thickness range of 0.2 to 2.0 micron is suitable), the method illustrated in FIGS. 13A-13D is well suited for the production of very narrow beams. Conventional photolithography would limit the patterned features shown in FIGS. 13A, 13B, and 13C to much larger dimensions, for instance allowing minimum resolved features no smaller than 2 microns or 5 microns.

FIG. 13D depicts an isometric view of a shutter assembly 1300, formed from the above-described process, yielding compliant beams with cross sections of high aspect ratio. As long as the thickness of the second sacrificial layer is, for example, greater than 4 times larger than the thickness of the shutter material, the resulting ratio of beam height to beam width will be produced to a similar ratio, i.e. greater than 4.

An optional step, not illustrated above but included as part of the process leading to FIG. 13C, involves isotropic etching of sidewall beams 1316 to separate or decouple beams formed along the sidewalls of mold 1303. For instance, the shutter material at point 1324 has been removed from the sidewall through use of an in isotropic etch. An isotropic etch is one whose etch rate is the same in all directions, so that sidewall material in regions such as point 1324 is no longer protected. The isotropic etch can be accomplished in the typical plasma etch equipment as long as a bias voltage is not applied to the substrate. Isotropic etch can also be achieved using wet chemical or vapor phase etching techniques. The separation of beams at point 1324 is achieved through a distinct sequence of photoresist dispense, patterning, and etch. The photoresist pattern in this case is designed to protect the sidewall beams 1316 from the isotropic etch chemistry but expose the sidewall beams at point 1324.

In order to protect the shutter material deposited on sidewalls 1309 of the mold 1303 and to produce sidewall beams 1316 of substantially uniform cross section, some particular process guidelines can be followed. For instance, in FIG. 13B, the sidewalls 1309 can be made as vertical as possible. Slopes at the sidewalls 1309 and/or exposed surfaces become susceptible to the anisotropic etch. Vertical sidewalls 1309 can be produced if the patterning step at FIG. 13B, the patterning of the second sacrificial material 1305, is also carried out in anisotropic fashion. The use of an additional photoresist coating or a hard mask in conjunction with patterning of the second sacrificial layer 1305 (see the discussion with respect to FIG. 12A) makes it possible to employ aggressive plasmas and/or high substrate bias in the anisotropic etch of the second sacrificial material 1305 without fear of excessive wear of the photoresist. Vertical sidewalls 1309 can also be produced in photoimageable sacrificial materials as long as care is taken to control the depth of focus during the UV exposure and excessive shrinkage is avoided during final cure of the resist.

Another process guideline that can be helpful during sidewall beam processing is the conformality of the shutter material deposition. The surfaces of the mold 1303 are preferably covered with similar thicknesses of shutter material, regardless or the orientation of those surfaces, either vertical or horizontal. Such conformality can be achieved when depositing with a chemical vapor deposition technique (CVD). In particular, the following conformal techniques can be employed: plasma enhanced chemical vapor deposition (PECVD), low pressure chemical vapor deposition (LPCVD), and atomic or self-limited layer deposition (ALD). In the above CVD techniques the growth rate of the thin film can be limited by reaction rates on a surface as opposed to exposing the surface to a directional flux of source atoms. In such conformal deposition techniques, the thickness of material grown on vertical surfaces is preferably at least 50% of the thickness of material grown on horizontal surfaces. Alternatively, shutter materials can be conformally deposited from solution by electroless plating or electroplated, as long as a metal seed layer is provided that uniformly coats all surfaces before plating.

The shutter assembly 1300 shown in FIG. 13D has flat elements that are disposed parallel to the substrate surface, e.g., the shutter 1312, as well as elements that are disposed perpendicular to the substrate surface, e.g., the compliant beams 1316. It is also possible to produce shutter assemblies that have a three-dimensional, folded, or corrugated aspect using the technique of conformal deposition and anisotropic etch. In this fashion, even though the shutter 1312 was built from a deposition of only 0.5 microns thickness, the structure can be made very stiff and light through proper design of a corrugated box and/or with three dimensional joined surfaces.

Another useful variation on the process for forming shutter assembly 1300 involves the formation of beams with unbalanced stresses. The compliant beams 1316, for instance, can be formed from a laminate of two different materials. The stress state in the laminate can result in a spontaneous bending of the beams. The shutter assembly 1300, for instance, can be comprised of separate load beams and drive beams, such as load beam 136 and drive beam 146 in FIG. 1B. After removal of sacrificial mold materials, such as first and second sacrificial layers 1301 and 1305, the separate compliant beams with unbalanced stresses can bend towards each other until they touch. Such contact between load beams and drive beams can reduce the voltage required for actuation.

The formation of laminated beams can lead advantageously to unbalanced stresses. For instance, if one surface of the laminated beam is under tensile stress while the other surface is under compressive stress, then the beam will curve in a direction that reduces the stress—with the compressive surface appearing on the outside of the curve. The unbalanced stresses can originate in some cases from growth stresses, usually stresses that are caused by the lattice mismatches between two different materials or from the columnar growth of grains. In other cases the unbalanced stresses originate from differences in thermal expansion coefficient between two materials—such that after the materials are cooled from their growth temperature a non-symmetric stress distribution is induced in the laminate.

In one embodiment of a laminated beam with unbalanced stress, the shutter material can be formed from amorphous silicon, or from a composite of amorphous silicon and aluminum as described with reference to FIG. 11. Before the sacrificial materials are removed from shutter assembly 1300, however, an additional coating of dielectric material, such as $SiO_2$ or $Si_3N_4$, is deposited on the exposed surfaces of beams 1316. The beam surface that is still in contact with mold material 1305 will not be coated with the dielectric—therefore the stress state of the laminate will be unbalanced. If the dielectric material is deposited in a state of tensile stress, or if the shutter material at its interface with the dielectric material in a state of tensile stress, then after removal of the sacrificial material 1316 the sidewall beams will bend and come into contact with each other. The use of a dielectric material in the laminate helps to ensure mechanical contact between actuator beams, without the formation of an electrical contact or short circuit.

In addition to the method described above for sidewall beams, other methods exist for producing compliant beams, in shutter assemblies where widths go substantially below 2 microns or substantially below the practical photolithographic limit. In one such technique, instead if depositing the shutter material in conformal fashion on the top 1310 and vertical sides 1309 of a mold 1303, it is possible to employ the sidewall process for only a thin metal seed layer. After anisotropic etch of the seed layer, it is possible to use the metal seed layer as a basis for electroplating a thicker shutter material. Conformal deposition of the shutter material over all surfaces is not required in this case, only an electrically continuous deposition of the seed layer on the sidewalls 1309 of the mold 1303 followed by anisotropic etching.

Figure 14B:
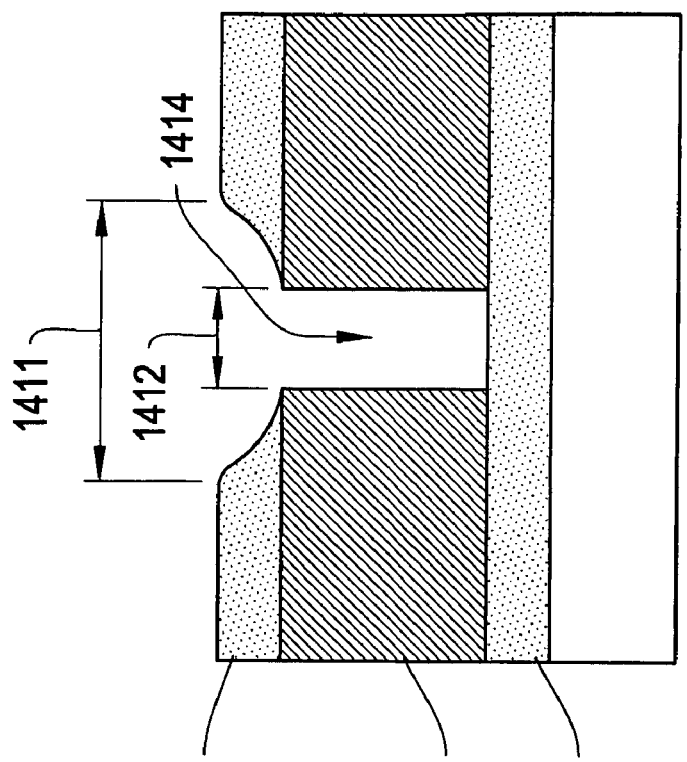
FIGS. 14A and 14B are cross sectional views of alternate methods for the formation of narrow beams, according to an illustrative embodiment of the invention.
Figure 14A:
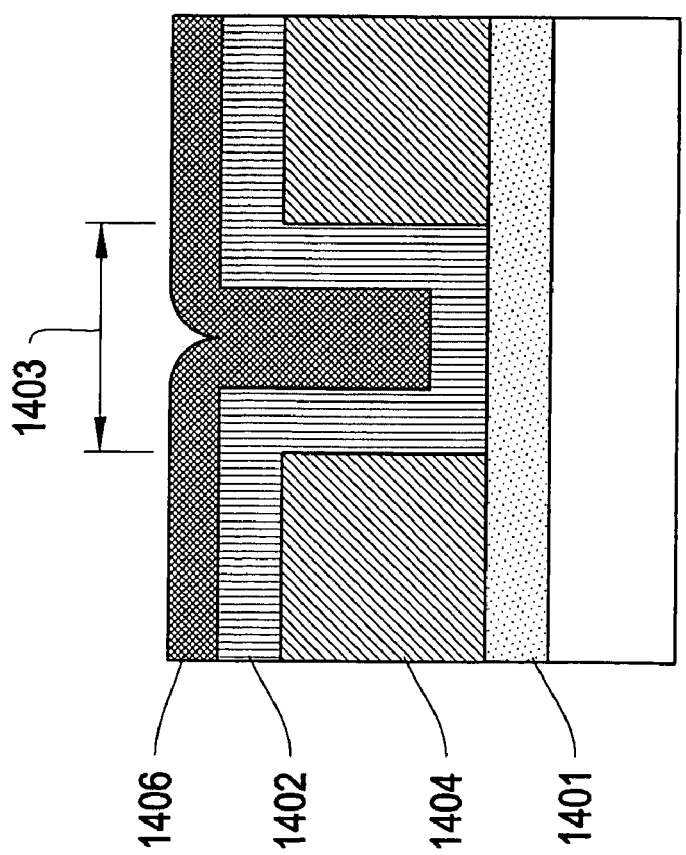

Another method for forming narrow compliant beams is illustrated in FIG. 14A, which utilizes a third sacrificial layer 1402. In the first step of this method, a second sacrificial mold material 1404 is deposited onto a layer 1401. Layer 1401 can be part of a conductor layer or it can be a first sacrificial layer. Next, a relatively wide trench 1403 (perhaps 3 to 5 microns in width) is patterned into a second sacrificial mold material 1404. Next, the third sacrificial material 1402 is deposited on top of the second sacrificial material 1404. The third sacrificial material is deposited in conformal fashion so that it covers both vertical and horizontal surfaces with similar thicknesses, which has the effect of narrowing the width of the trench. In the illustrated example, if the third sacrificial material is deposited on the sidewalls with thickness in the range of 1 to 1.5 microns, then the width of the remaining trench will be 2 microns or less. Fourth, a shutter material 1406 is deposited into the remaining trench formed by the third sacrificial material 1402. Finally, both second and third sacrificial materials 1402 and 1404 are removed by means of either wet etch or plasma etch, leaving a narrow suspended beam behind.

There are several methods that can be used to form the third sacrificial layer 1402. If $SiO_2$ is used as the sacrificial layer 1402, the $SiO_2$ can be deposited by means of plasma enhanced or low pressure chemical vapor deposition. Alternately di-para-xylylene, also known as parylene or parylene C can be deposited by molecular evaporation as a third and conformal sacrificial layer 1402. And finally, the sacrificial layer 1402 can be deposited from solution by electroless plating or electroplated. In the plating process a metal seed layer is first deposited by evaporation or sputtering onto the exposed surfaces of the mold. Then a thicker sacrificial metal coating (such as Ni or Cu) is grown by electrodeposition.

Another method for narrow beam formation is illustrated in FIG. 14B. In this case a narrow mold in the shape of a trench is etched into a sacrificial material. The width of the trench, as etched, is narrower than the width of the trench printed on the photomask, a narrowing which is achieved by shape changes in an overlying photoresist layer which occur between the expose and develop steps of resist processing. In the process, a first sacrificial layer 1408 is deposited onto a layer 1407 and cured and then a relatively thick (2 micron) photoresist 1410 is deposited on top of the sacrificial layer 1408. A trench 1411 is defined in the photoresist 1410. Next, as part of a baking or curing step, the photoresist is heated to temperatures in excess of 130 Centigrade where it begins to relax or flow. The steep sidewalls of the photopattern as originally developed in the resist then tend to collapse, moving the edges of the photoresist toward each other, and forming a gap with the narrower dimension 1412. In the next step this narrow pattern 1412 in the photoresist is transferred to the sacrificial material 1408, creating a trench 1414 by means of an etch step and the photoresist is removed. Fifth, the narrow trench 1414 in the sacrificial material is filled with shutter material and, finally, the sacrificial material is removed to expose a narrow suspended beam.

Another method for forming narrow compliant beams involves a thinning technique based on oxidation of the beam material. In this method, first, a beam of substantial width (e.g., 3-5 microns) is photopatterned according to the direct recipe described with respect to FIGS. 11 and 12. Second the sacrificial material is removed to expose a relatively wide beam. Second, if the beam material is composed of an oxidizable material, such as Si, Cu, Ni, Ti, or Ta, the beam is then oxidized so that more than half of its volume becomes occupied by the silicon or metal oxide instead of the silicon or metal. And finally the oxide material is etched away exposing a metal beam that is substantially narrower than the original beam. Several methods are available for such oxidation: thermal oxidation in a furnace, reaction with high pH solutions, and/or anodic oxidation as can be performed in an electrochemical bath.

Another method for forming narrow compliant beams involves a controlled isotropic etch of the beam material. In this method, first, a beam of substantial width (e.g., 3-5 microns) is photopatterned according to the direct recipe described with respect to FIGS. 11 and 12. In this method, however, the etch of the beam takes place in two steps. First an anisotropic etch is applied to etch the shutter material down to the bottom of the layer, clearing the field on either side of the beam. Then, second, an additional isotropic etch is applied which has the effect of narrowing the beam. Care must be taken to provide an uniform isotropic etch rate since this etch is stopped only by removal from the etching medium after a preset time interval. Non-uniform etch rates would lead to non-uniform beam widths across the diagonal of a display apparatus.

Another method for forming narrow compliant beams follows from the thinning techniques listed methods above, but uses the thinning technique to form a narrow hard mask instead of the beam itself. Hard masks can be composed of metals, oxides, or polymers. Hard masks can be oxidized or etched to form beams and beam widths that are considerably narrower than the conventional photolithographic limit. If the hard mask is formed on top of the shutter material, the hard mask can then protect a narrow beam of the shutter material as the shutter material is subsequently etched with an anistotropic etch.

Figure 15:
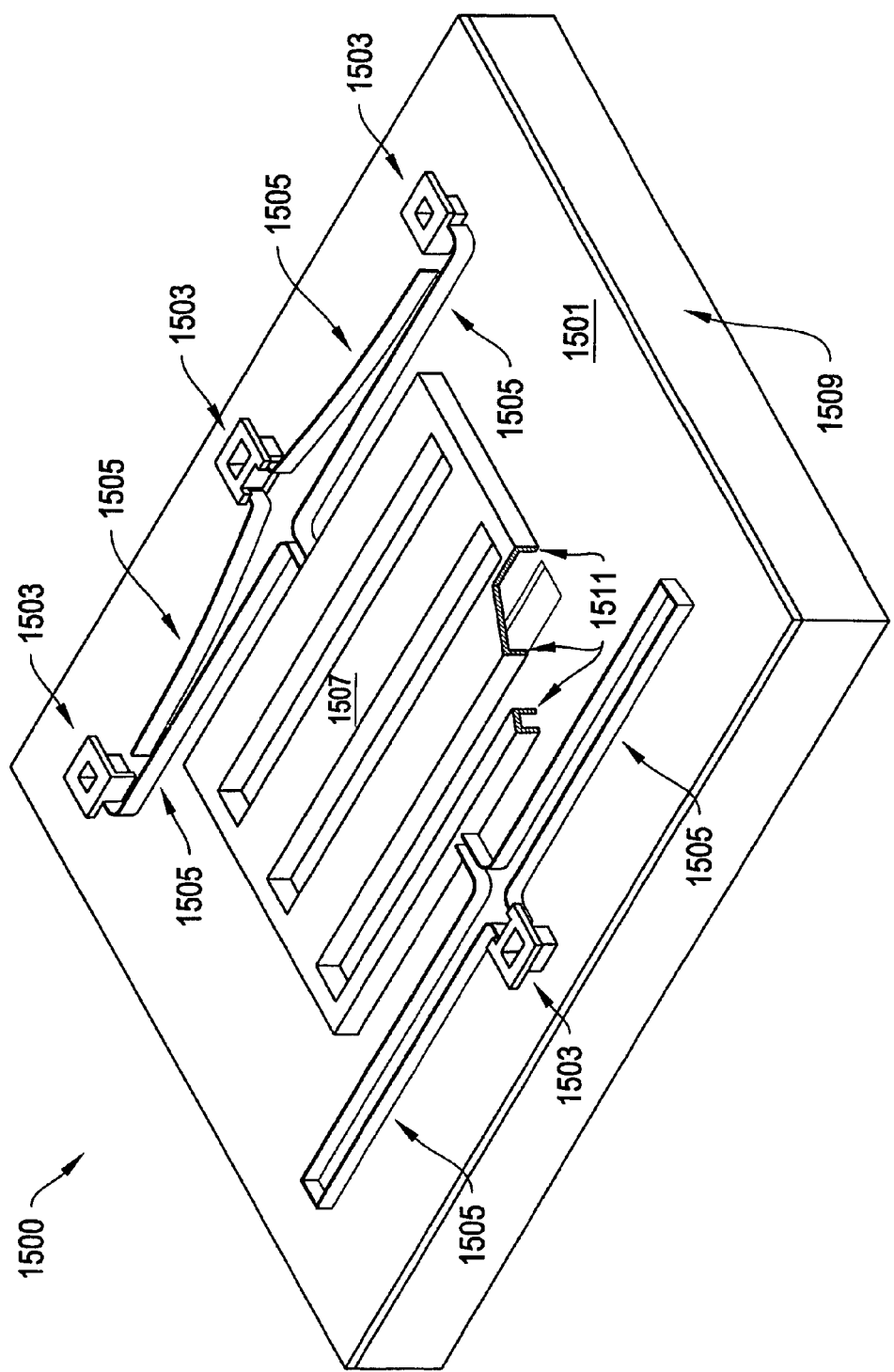
FIG. 15 is an isometric view of a shutter assembly with sidewall structures for improving strength, according to an illustrative embodiment of the invention.

FIG. 15 illustrates an alternative shutter assembly 1500. Shutter assembly 1500 is an example of a structure wherein the method of sidewall beams is exploited for the benefit of improving strength to thickness ratios. Shutter assembly 1500 includes an aperture layer 1501, a shutter anchor 1503, compliant beams 1505, and a shutter 1507, which are built onto a substrate 1509. By comparison to shutter assembly 1300 shown in FIG. 13D, the shutter 1507 is not flat, but rather incorporates further sidewall structures 1511.

These sidewall structures 1511 may be formed in a process very similar to the process for forming compliant beams 1505 as described with reference to FIGS. 13A-13D. This process includes the deposition of a first sacrificial layer and a second sacrificial layer, including the patterning of both sacrificial materials so as to form a mold with both bottom surfaces and wall surfaces. Next the shutter material is deposited onto the bottom and walls of the mold and thereafter patterned by means of an anisotropic etch. After the sacrificial materials are removed, a shutter assembly such as shutter assembly 1500 can result.

The sidewall structures 1511 are formed from the same material as shutter 1507 and connected to shutter along substantial portions of the periphery of the shutter 1507. The shutter 1507 therefore possesses a three-dimensional aspect such that its effective thickness, with respect to bending out of the plane of substrate 1509, is considerably thicker than the thickness of the deposited shutter material. That is, the shutter 1507 comprises both horizontal surfaces and vertical sidewall surfaces, and the effective thickness with respect to bending is considerably thicker than a thickness measured simply through a horizontal section of the shutter.

Figure 16:
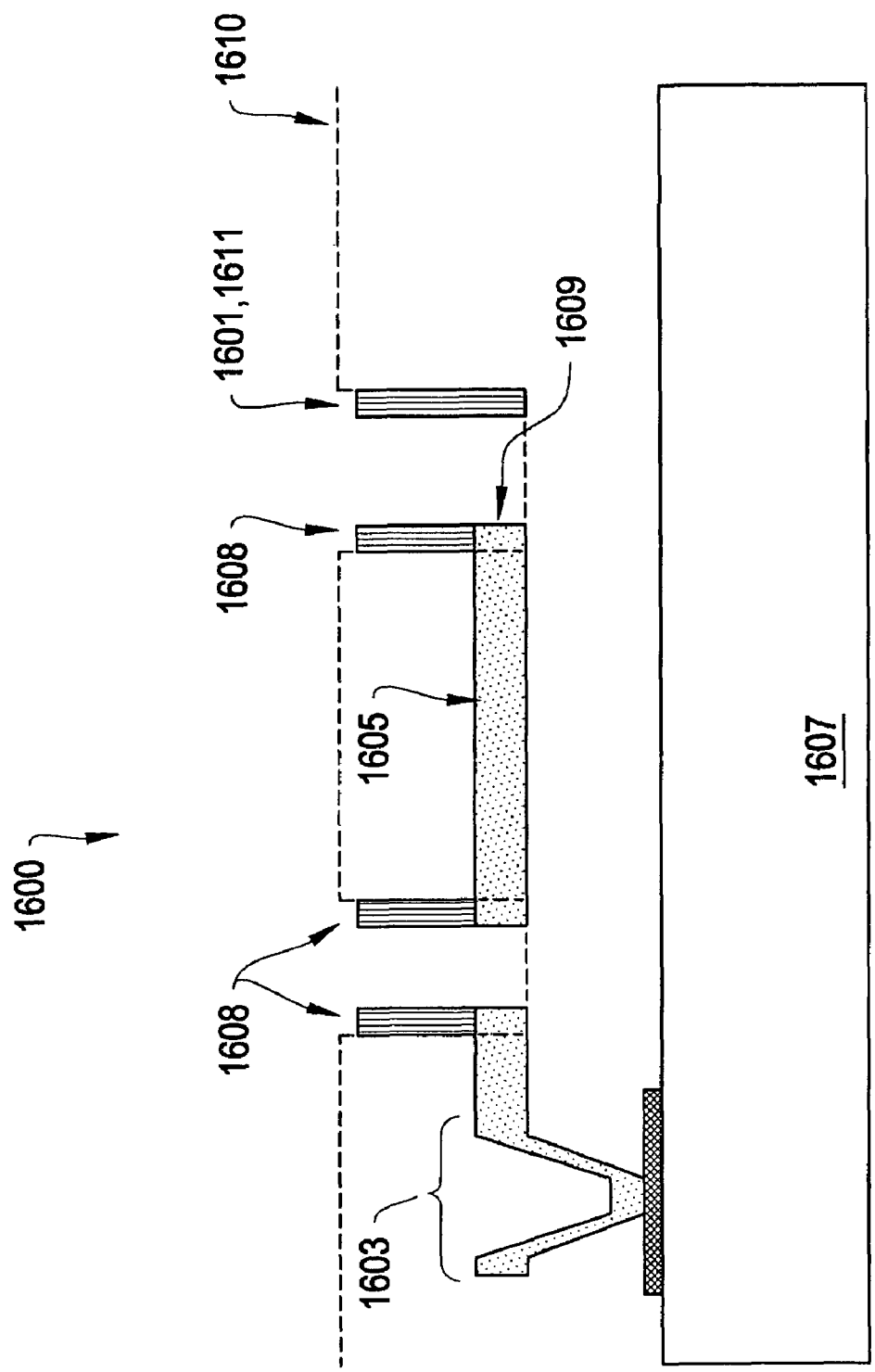
FIG. 16 is a cross section view of a shutter assembly wherein shutters and actuator beams are comprised of different materials, according to an illustrative embodiment of the invention.

FIG. 16 illustrates, in cross section, an alternative shutter assembly 1600. Shutter assembly 1600 is another example of a shutter assembly with very narrow beams 1601, in which the compliant beams can be formed with critical dimensions considerably below the conventional photographic limit. In addition to compliant beams 1601, the shutter assembly 1600 includes a shutter anchor 1603 and a shutter 1605 fabricated onto a substrate 1607. FIG. 16 is also an example of a shutter assembly in which the shutter 1605 includes sidewalls 1608 to improve its stiffness with respect to bending out of the plane of the substrate. FIG. 16 is also an example of a shutter assembly in which the shutter 1605 is composed of material which is different from the material used to fabricate the compliant beams 1601.

A method for formation of a shutter assembly 1600 proceeds as follows. A first sacrificial layer is deposited and patterned onto a substrate. Next a shutter layer material 1609 is deposited and patterned on top of the first sacrificial material. This process is similar to that described with respect to steps 745 and 750 of procedure 700, and discussed at length with respect to FIGS. 11 and 12A-12D. Next a second sacrificial layer is deposited and patterned on top of shutter layer material 1609. The second sacrificial material is patterned to form a mold with both bottom surfaces and sidewall surfaces. For illustrative purposes, the position of the horizontal surfaces of an exemplary mold is represented by the dotted line 1610 in FIG. 16. In many areas, after patterning of the second sacrificial material, the bottom of the sacrificial mold will expose and be comprised of the shutter layer material 1609. Next, a beam material 1611 is deposited onto the bottom and sidewalls of the mold. In many areas, particularly at the foot of the sidewalls, the beam material will make contact to and become bonded to the shutter layer material 1609. Next, an anisotropic etch is applied, which can have the capability of etching either or both of the beam material 1611 or the shutter layer material 1609, particularly where these materials are exposed along either the top or bottom surfaces of the mold. Next both first and second sacrificial materials are removed by means of an etching step, to reveal a released structure such as shutter assembly 1600. And finally, a dielectric coating can be applied, such as dielectric coating 1111 shown in FIG. 11.

The shutter assembly 1600 includes advantages with respect to other shutter assemblies 1100 or 1300. Shutter assembly 1600 allows for the use of different materials for shutter 1605 and compliant beams 1601 respectively. For instance, the shutter 1605 can be composed of a material that is opaque and/or absorptive towards visible light, while the compliant beams 1601 can be formed from a material that is elastic and yet resistant to fracture. For example the shutter 1605 could be formed from a metallic material while the beams 1601 could be formed from amorphous or polycrystalline silicon or from silicon dioxide or from silicon nitride. Or, for example, the shutter 1605 could be formed from a layered material, such as was described with respect to aperture materials in FIG. 4, while the beams 1601 could be formed from either metallic materials (for instance electroplated) or from deposited Si, $SiO_2$ or $SiN_4$. Some materials, such as conductive overlayers or metal adhesion layers, might be employed as components in either or both of beam material 1611 and shutter layer material 1609.

Figure 17:
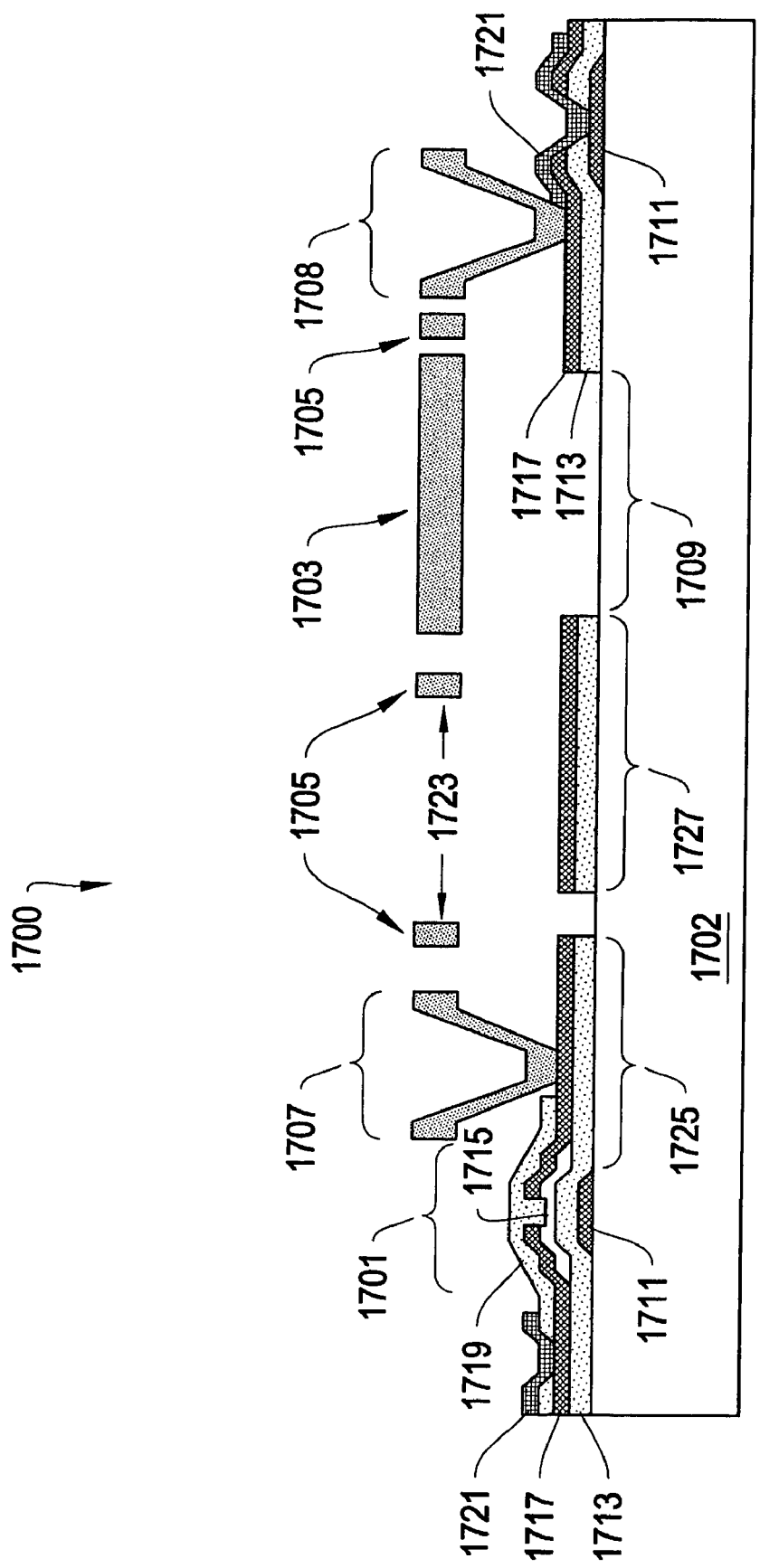
FIG. 17 is a cross section view of an alternate thin film structure for the shutter assembly, aperture, and associated control matrix, according to an illustrative embodiment of the invention.

FIG. 17 shows a cross section of structures from another control matrix 1700 suitable for inclusion in the display apparatus 100 for addressing an array of pixels. The control matrix 1700 includes an inverted staggered back-channel etched thin film transistor 1701, which is similar to transistor 518, built on substrate 1702. The control matrix also includes a shutter 1703, compliant beams 1705, a drive anchor 1707 and a shutter anchor 1708. The control matrix also includes an aperture hole 1709. The control matrix includes the following layers: a first conductor layer 1711, a first dielectric layer 1713, a first semiconductor layer 1715, a second conductor layer 1717, a second dielectric layer 1719, and a third conductor layer 1721, and a shutter layer 1723 In contrast to previously described control matrices 200 and 500 the control matrix 1700 does not include a separate aperture layer, such as aperture layer 250 or aperture layer 602. The control matrix 1700 can therefore be fabricated less expensively than control matrices 200 or 500.

In control matrix 1700 the function of defining the aperture hole 1709 is accomplished via patterns formed in the second conductor layer 1717. The second conductor layer 1717 is allowed to remain, in blanket fashion, under most of the shutter assembly except in the region of the aperture hole. The second conductor layer can be formed from a number of metals which also act as reflectors. Light reflected from the second conductor metal, for instance at regions 1725 and 1727, can return to the backlight and thereby improve the efficiency of the backlight.

In control matrix 1700, the electrical connection between thin film transistor 1701 and the drive anchor 1707 is established by the second conductor layer 1717. The electrical connection between the first conductor layer 1711 and the shutter anchor 1708 is made by means of a strap formed with the third conductor layer 1721. For the embodiment shown in FIG. 17, no M1-M2 via such as via 531, is necessary, nor is an Ap-M1 via necessary, such as via 533.

In another possible embodiment of a shutter assembly— again without the use of a separate aperture layer—a shutter anchor such as shutter anchor 1707 can be built on top of and electrically connected to the first conductor layer 1711. In that case the first conductor layer is also used as a reflective layer for recycling light back into the backlight. In this embodiment it would be useful to supply an M1-M2 via, similar to via 531 illustrated in FIG. 10A, for electrically connecting the drain of a transistor to the shutter anchor.

In another variation on control matrix 1700 a separate dielectric layer, preferably with a refractive index greater than that of the underlying substrate, can be interposed between the first conductor layer 1711 and the substrate. Such an intervening dielectric layer can enhance the optical reflectivity for light that impinges on the control matrix 1700 from underneath or through the substrate.

In another variation of control matrix 1700, a separate aperture layer can be interposed between the control matrix 1700 and the substrate and electrically isolated from the control matrix 1700 by a separate dielectric layer. The separate aperture layer can be formed from materials as described with respect to FIG. 4, and patterned to define an aperture hole, such as aperture hole 1709. The separate aperture layer can be built from materials which are chosen for maximum recycling of light back into the backlight. In this embodiment, however, no vias or other electrical connections are supplied between the control matrix 1700 and the aperture layer. In order to avoid capacitive coupling between a moving shutter 1703 and a separate aperture layer, it can be advantageous to provide electrical shielding between the moving shutter 1703 and the aperture layer. Such shielding can be accomplished by means of patterns etched into layers of the control matrix, such as the first conductor layer 1711 or the second conductor layer 1717. These layers can be electrically connected so that they carry the same electrical potential as the moving shutter. The metal regions 1725 and 1727 of control matrix 1700, which include the shutter anchor 1707, are positioned to act either as reflectors of light back into the backlight or as electrical shields between the control matrix 1700 and a separate aperture layer (separate aperture layer not shown).

Figure 18:
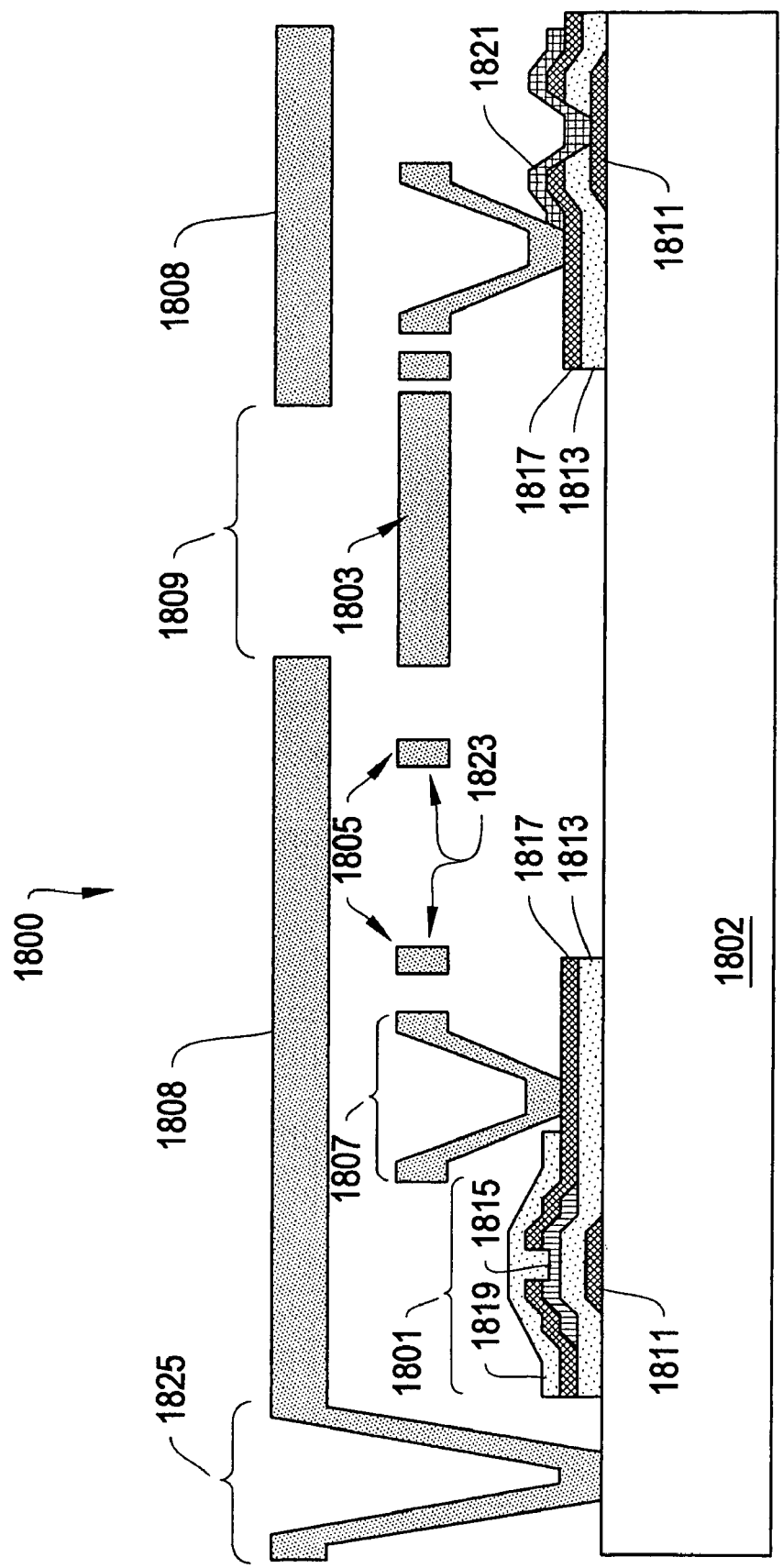
FIG. 18 is a cross section view of an alternate thin film structure for the shutter assembly, aperture, and associated control matrix, according to an illustrative embodiment of the invention.

FIG. 18 shows a cross section of structures from another control matrix 1800 suitable for inclusion in the display apparatus 100 for addressing an array of pixels. The control matrix 1800 includes an inverted staggered back-channel etched thin film transistor 1801, which is similar to transistor 518, built on substrate 1802. The control matrix also includes a shutter 1803, compliant beams 1805, a shutter anchor 1807, and a suspended aperture layer 1808. The control matrix also includes an aperture hole 1809. The control matrix includes the following layers: a first conductor layer 1811, a first dielectric layer 1813, a first semiconductor layer 1815, a second conductor layer 1817, a second dielectric layer 1819, and a third conductor layer 1821, and a shutter layer 1823. In contrast to previously described control matrices 200 and 500, in control matrix 1800 the aperture layer 1808 is fabricated after and placed above both the transistor 1801 and the shutter 1803 instead of underneath them.

The suspended aperture 1808 can be fabricated by means of process steps analogous to steps 745, 750, and 755 used to fabricate the shutter assembly. In particular a processing step such as step 750 can be used to deposit and pattern a shutter layer 1823. Next a second sacrificial layer (not shown in FIG. 18) would be deposited on top of the shutter layer 1823 and patterned to form a via, such as aperture anchor 1825. Next the aperture material would be deposited and patterned on top of the second sacrificial layer. Materials chosen for the aperture layer 1808 can be similar to those chosen for layer 401 or layers 452 discussed with respect to FIGS. 4A and 4B respectively. For the embodiment of control matrix 1800, however, the order of the optical layers in layers in the composite 452 may be reversed such that the absorbing layer, such as layer 464, would be deposited first, followed by the metal reflecting layer 462 and then the two refractive layers 460 and 458. After patterning of the aperture layer 1808, both sacrificial layers would be removed to reveal a suspended structure such as is illustrated in FIG. 18.

Figure 19A:
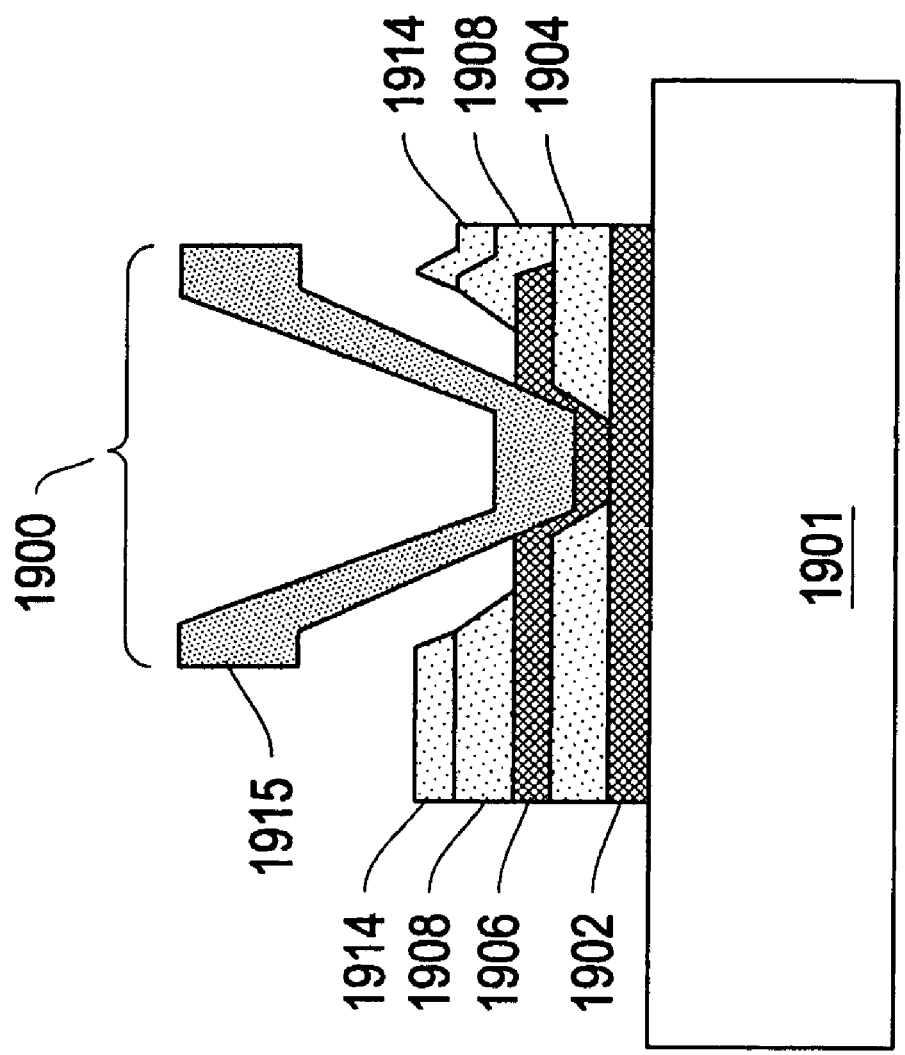
FIGS. 19A and 19B are cross sectional views of alternate via structures for use in a control matrix such as FIG. 5C, according to an illustrative embodiment of the invention.

It is often of interest to increase the resolution of a display within a fixed display package, or of interest to increase the number of pixels per inch used in formation of the display. It is therefore of interest to reduce the areas required for building the control matrix. In many cases, pixel area can be reduced by combining two or three of the features illustrated in FIG. 8H or in FIG. 10A into a single structure with reduced area. FIG. 19A illustrates such a combined structure in the stacked via 1900, built on substrate 1901, which simultaneously makes electrical contact between an aperture layer 1902, the first conductor layer 1906, and the shutter layer 1915. The stacked via 1900 is essentially a combination of the Ap-M1 via 533 along with the shutter anchor 539 (see FIG. 10A) into a single structure. The stacked via 1900 also includes a first dielectric layer 1904, a second dielectric layer 1908, a third dielectric layer 1914 and shutter layer 1915. The process for formation of the stacked via 1900 is as follows. First the same process steps and the same masking steps are employed as for the Ap-M1 via 533, as described with respect to FIG. 10B through FIG. 10D. At step 735 of procedure 700, however, a mask pattern is applied such that via openings are created directly above the stacked via 1900. Both the third dielectric layer 1914 and the second dielectric layer 1908 are etched down to the first conductor layer at this step. The opening of the via at step 735 should be larger than the via that was opened in the first dielectric layer at step 710. Next the third conductor layer is deposited and removed in the region of the stacked via 1900. Next the steps for formation of the shutter assembly are followed, including steps 745 through 760 of procedure 700. At step 745 a via or anchor hole is aligned to the previous via openings in the region of stacked via 1900 such that the shutter material 1915 can reach down and make electrical contact to the first conductor layer 1906.

Figure 19B:
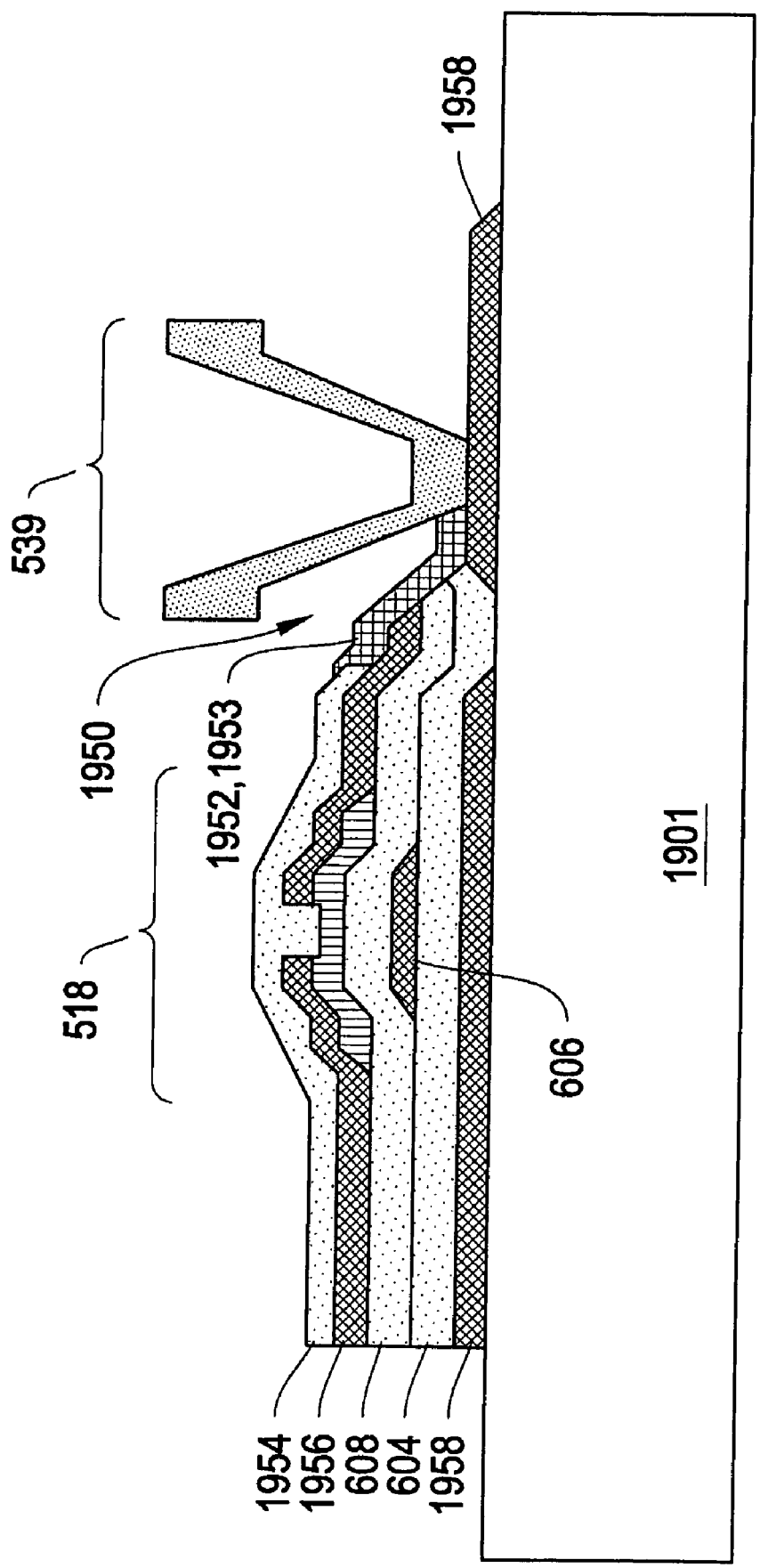

Other combinations of via elements are possible in the control matrix, as should be obvious from the examples given above. For instance a combination of the M1-M2 via 531 (shown in FIG. 10A) can be made with the drive anchor 535 (shown in FIG. 8H) to form another stacked via which simultaneously connects the shutter layer 807 to the first conductor layer 606 as well as to the second conductor layer 612. Similarly the M1-M2 via 531 can be combined with the Ap-M1 via 533 (both in FIG. 10A) to create a simultaneous connection between the aperture layer 602, the first conductor layer 606 and the second conductor layer 612, In many cases it is of interest to save cost by eliminating masking steps from procedure 700. Each masking step involves the deposition of photoresist, a photopatterning step, and etching step, and the removal of resist. FIG. 19B illustrates how some via connections can be made by means of a strap-connection 1950. The strap connection 1950 includes a typical thin film transistor, such as transistor 518, and a shutter anchor, such as anchor 539, which are electrically connected by the strap 1952. The transistor 518 and the anchor 539 include all of the layers illustrated for these structures in FIG. 6 and in FIG. 10A. The electrical strap 1952 is comprised of the third conductor material 1953, which is similar to the third conductor material 616 shown in FIG. 6. The process for formation of the electrical strap 1952 proceeds as follows: The same process for formation of transistor 518 and for shutter anchor 539 is followed all the way through step 730, except that the photomask normally employed at step 710 is eliminated. At step 745 a via is patterned through the third dielectric layer 1954 and etched all the way down until both the second conductor layer 1956 is exposed as well as the aperture layer 1958. Next the third conductor layer 1953 is deposited and patterned such that an electrical connection is established between the second conductor layer 1956 and the aperture layer 1958. Then the normal process of shutter formation is followed for steps 745 through 760. The via for the shutter anchor is opened to the aperture layer 1958 at the same point where the strap 1952 makes contact.

There are several other possibilities where an electrical strap can substitute for many of the via structures illustrated in FIG. 10A. In each case the use of an electrical strap can save the use of a masking step. For instance an electrical strap, formed from the third conductor layer 616, can also be used to substitute for the M1-M2 via 531 shown in FIG. 10A. The strap in this case is used to electrically connect the first conductor layer 606 to the third conductor layer 612. An electrical strap can also be used to substitute for the Ap-M1 via 533 shown in FIG. 10A. The strap in this case can be formed from either the second conductor layer 612 or from the third conductor layer 616. In this case the strap will form an electrical connection between the first conductor layer 606 and the aperture layer 602.

In some cases, even the shutter layer 807 can replace the third conductor layer 616 and be used as an electrical strap. In some cases the shutter layer 807 can act as a replacement interconnect line by substituting for second conductor layer 612. In some of these cases the shutter layer 807, which is patterned in combination with the sacrificial layer 805, can form a strap which is also an air bridge. As an air bridge the shutter layer 807 with associated anchors, can substitute for an M1-M2 via, such as via 531. The air bridge can be used to connect two electrical components of the control matrix. For example in FIG. 5B/5C the air bridge can connect the global actuation interconnect 514 and the source of transistor 518. Instead of routing these electrical signals through the first conductor layer 606 by means of M1-M2 vias 531, the signal can be routed instead through the shutter layer 807 using shutter anchors to form an air bridge. By eliminating the need for an M1-M2 via, a reduction in the number of photomasks and a reduction in the fabrication cost can be achieved.

Display Assembly

Figure 20:
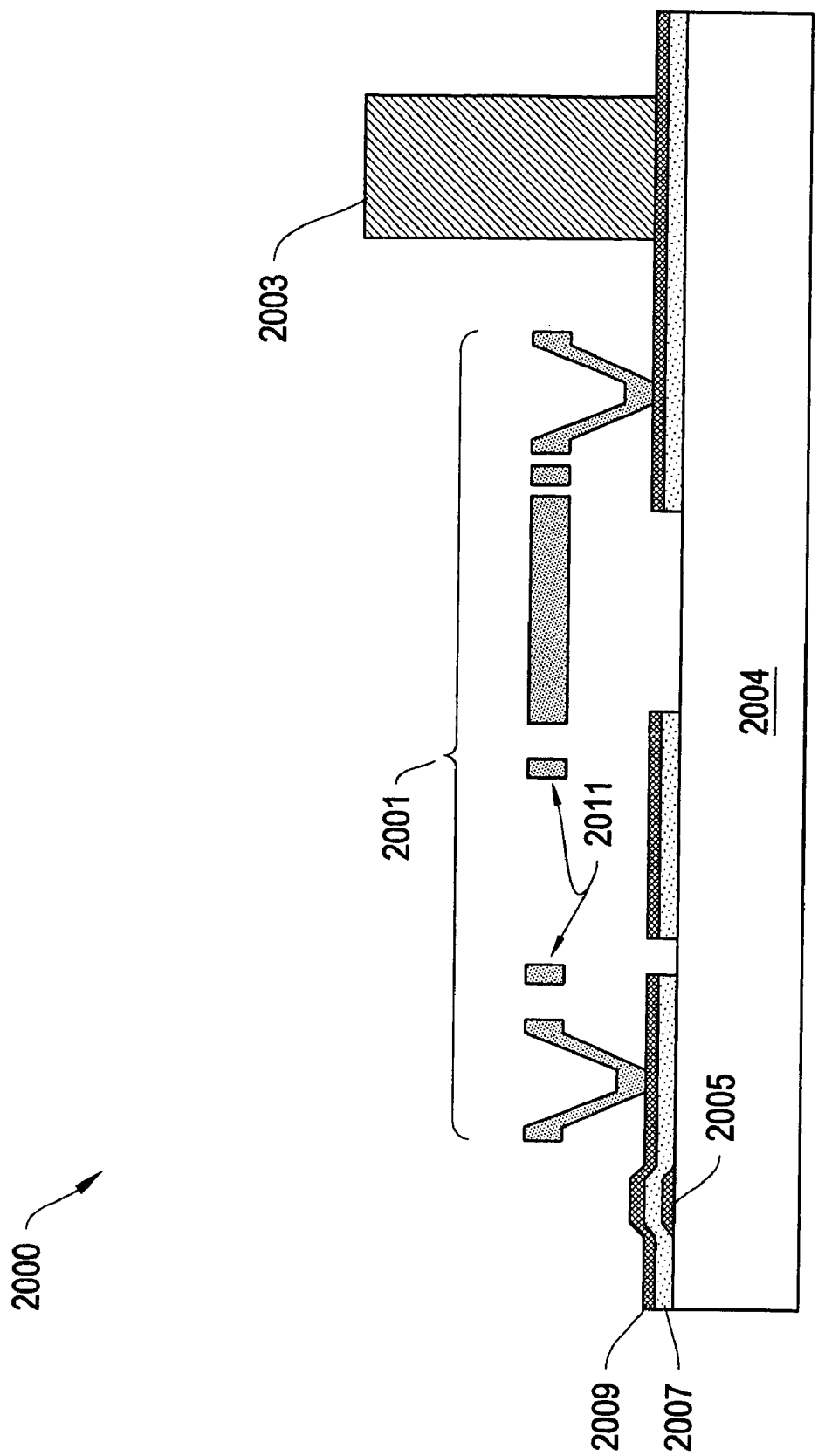
FIG. 20 is a cross section view of an alternate thin film structure including a shutter assembly and an assembly spacer; according to an illustrative embodiment of the invention.

FIG. 20 shows a cross section of another control matrix 2000 suitable for inclusion in the display apparatus 100 for addressing an array of pixels. The control matrix 2000 includes a shutter assembly 2001 as well as an assembly spacer 2003, built on substrate 2004. The control matrix includes the following layers: a first conductor layer 2005, a first dielectric layer 2007, a second conductor layer 2009, a shutter layer 2011, as well as assembly spacer 2003. Control matrix 2000 can be operated as a passive matrix array, with no thin film transistor in the pixel.

In operation, shutter assemblies such as shutter assembly 130, 202, 504, 1312, 2001 are advantageously protected from the environment by means of a cover plate. The space between the cover plate (not shown) and the substrate 2004 can be filled with a vacuum, with air, or with a lubricating fluid. The spacing between the substrate 2004 and the cover plate is maintained by the use of mechanical spacers, such as spacer 2003. The spacer 2003 is suitably 4 to 40 microns in height and 5 to 20 microns in width.

The assembly spacer 2003 is preferably formed from a polymer material. The fabrication sequence for the spacer can proceed as follows. The steps in procedure 700 can be followed through the formation of the control matrix, i.e. through step 740. At step 745 the sacrificial layer is deposited and patterned. In preparation for the formation of assembly spacers, a via is patterned into the sacrificial layer at the place where the spacer would be attached to the underlying substrate. At step 750 the shutter layer 2011 is deposited and patterned, as described with respect to either FIGS. 12A-12D or FIGS. 13A-13D. Next the material for the assembly spacer 2003 is deposited and patterned over the top of the shutter layer 2011. The material for the assembly spacer will make contact to the substrate through a via made for this purpose in the sacrificial layer. Finally, the sacrificial layer, deposited at step 745, is removed.

The preferred polymers for constructing the assembly spacer 2003 are polymers that are resistant to the release process used to remove the sacrificial layer, such as sacrificial layers 805, 1113, or 1305. If oxygen plasma removal is employed for removal of sacrificial layers, then suitable polymers for the assembly spacer 2003 would be poly(imide-siloxane) copolymers (PISX), polyhedral oligosilsequioxane (POSS)-siloxane copolymers, Phenylphosphine oxide-containing poly(arylene ether benzoxazole)s, poly(arylene ether benzothiazole)s, poly(arylene ether 1,3,4-oxadiazole)s and poly(arylene ether benzimidazole)s. These polymer materials can be patterned by coating with a photoresist and/or a metal which is subsequently patterned lithographically into an etching mask. Etching of the spacer polymers can then be accomplished in a plasma etch where the plasma contains mixtures of chlorine, fluourine, and oxygen. In some cases photoactive variations of the selected polymers can be prepared, for which the etching mask is not necessary.

In an alternative embodiment, the assembly spacer 2003 can be comprised of a metal which is electroplated or electroless plated into a mold made from a sacrificial material.

Figure 21:
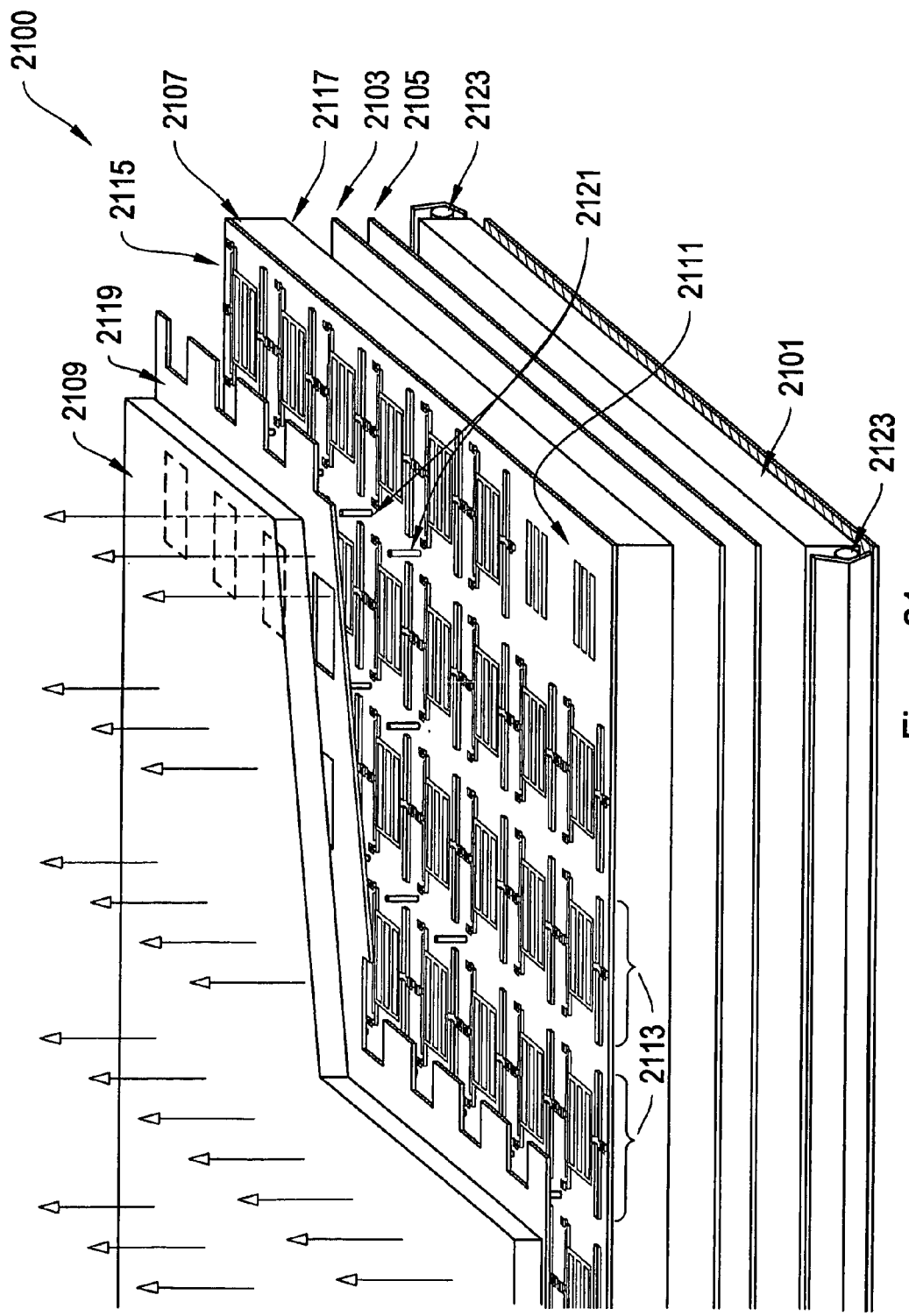
FIG. 21 is an assembly drawing of a display built into a MEMS-up configuration, according to an illustrative embodiment of the invention.

FIG. 21 shows a cross sectional image of a display assembly 2100. The display assembly 2100 includes a backlight 2101, a diffuser 2103, a brightness enhancing film 2105, a MEMS substrate 2107, and a cover plate, 2109. The MEMS substrate 2107 includes an aperture layer 2111, a control matrix (not shown), and an array of shutter assemblies 2113. The MEMS substrate 2107 has two sides, referred to as the MEMS-side 2115 and the backside 2117. The configuration of display assembly 2100 is referred to as a MEMS-up configuration. The MEMS-up configuration implies that the MEMS-side 2115 of the MEMS substrate is disposed opposite to the backlight. In the MEMS-up configuration the MEMS-side 2115 of the MEMS substrate 2107 faces the viewer, while the backside 2117 of the MEMS substrate faces that backlight 2101. The aperture layer 2111 of display assembly 2100 is also referred to as a reflecting aperture. A reflecting aperture is defined as an aperture in which at least one of the surfaces of the aperture layer is a reflecting surface. Examples of the construction of such reflecting surfaces were given with reference to FIG. 4.

The cover plate 2109 of display assembly 2100 includes a black matrix 2119. The black matrix is designed to absorb ambient light, reflections from which might otherwise degrade the contrast of the display. Display assembly 2100 includes assembly spacers 2121 which serve to maintain the spacing between MEMS substrate 2107 and the cover plate 2109. The backlight 2101 of display assembly 2100 includes lamps 2123.

In display assembly 2100, referred to as the MEMS-up configuration, the reflecting aperture 2111 layer is constructed so that the reflecting surface of the aperture faces the substrate 2107, and therefore also the backlight. In this configuration, as described in U.S. patent application Ser. No. 11/218,690, light entering from the backlight which does not exit through an open aperture will be reflected back into the backlight, where it becomes available for recycling. The aperture layer 401 of FIG. 4A and the composite aperture layer 452 of FIG. 4B are examples of reflecting apertures 2111, appropriate for use in display assembly 2100. Aperture layer 401 can be composed of reflective materials such as silver or aluminum. Aperture 452 has one reflecting surface, disposed to reflect light that impinges through substrate 453. If the substrate 402 or substrate 453 is assembled in the MEMS-up configuration, such as MEMS substrate 2107 of display assembly 2100, then light impinging from backlight onto apertures 401 or 452 can be recycled back into the backlight.

The control matrix 1700 provides another example of a reflecting aperture layer, appropriate for use in display assembly 2100. The metal regions 1725 and 1727 of control matrix 1700 are disposed to reflect light back into the substrate 1702. Recycling of light would occur if substrate 1702 is assembled in the MEMS-up configuration, such as MEMS substrate 2107 of display assembly 2100.

The suspended aperture layer 1808 of control matrix 1800 provides another example of a reflecting aperture layer, appropriate for use in display assembly 2100. If provided with a reflecting surface that faces the substrate 1802, then the suspended aperture layer 1808 will reflect light back into the substrate 1802. Recycling of light would then occur if substrate 1802 is assembled in the MEMS-up configuration, such as MEMS substrate 2107 of display assembly 2100.

When assembling a display in the MEMS-up configuration, and employing a reflective aperture, it is also helpful if the surface of the aperture disposed toward the viewer is made of absorbing materials. The layer 464, for instance, of composite aperture 452 is designed to absorb light that impinges from a direction 454 opposite to the substrate 453. In the MEMS-up configuration of display assembly 2100 such light, from directions opposite to the backlight, is referred to as ambient light. By providing an absorbing material on that surface of composite aperture layer 452 or aperture 2111, which faces the ambient, the contrast of the display can be improved.

Figure 22:
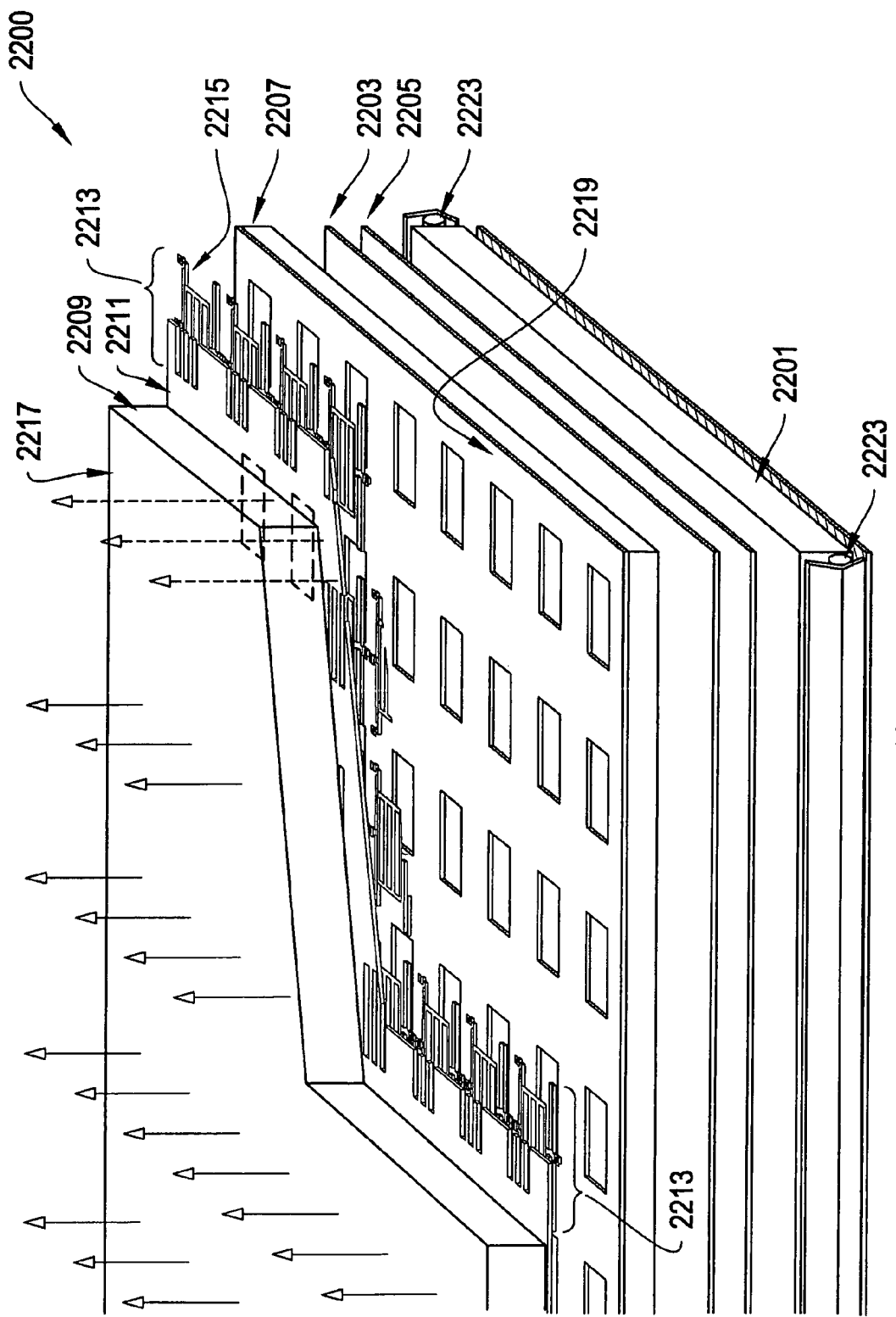
FIG. 22 is an assembly drawing of a display built into a MEMS-down configuration, according to an illustrative embodiment of the invention.

FIG. 22 shows a cross sectional image of a display assembly 2200. The display assembly 2200 includes a backlight 2201, a diffuser 2203, a brightness enhancing film 2205, an aperture plate 2207, and a MEMS substrate 2209. The MEMS substrate 2209 includes an aperture layer 2211, a control matrix (not shown), and an array of shutter assemblies 2213. In display assembly 2200 the aperture plate 2207 is disposed between the MEMS substrate 2209 and the backlight 2201. The MEMS substrate 2209 has two sides, referred to as the MEMS-side 2215 and the backside 2217. The configuration of display assembly 2200 is referred to as a MEMS-down configuration. The MEMS-down configuration implies that the MEMS-side 2215 of the MEMS substrate 2209 is directed toward the backlight (and opposite the viewer).

The backlight 2201 of display assembly 2200 includes lamps 2223.

The aperture plate 2207 includes an aperture layer 2219, also referred to as a reflecting aperture. Light entering from the backlight which does not exit through an open aperture will be reflected by reflecting aperture 2219 back into the backlight, where it becomes available for recycling. The aperture layer 401 of FIG. 4A and the composite aperture layer 452 of FIG. 4B are examples of reflecting apertures 2219, appropriate for use in display assembly 2200. Because reflecting aperture 2219 is fabricated however on aperture plate 2207, which is separate from MEMS substrate 2209, a wider range of materials becomes available for fabrication of reflecting aperture 2219. Thick reflecting films, like the Vikuiti (trademark) Enhanced Specular Reflector film from 3M Corporation, can serve as the reflecting aperture 2219 after lamination onto the aperture plate 2207.

In one embodiment of display assembly 2200, referred to as the MEMS-down configuration, the aperture layer 2211 is designed as a composite aperture in which one side is designed to reflect while the other side is designed to absorb impinging light. In a preferred embodiment, the aperture layer 2211 of display assembly 2200 is designed as an absorbing aperture. An absorbing aperture is defined as an aperture in which both surfaces are designed to absorb impinging light. In either embodiment of the MEMS-down configuration, the aperture layer 2211 is constructed such that the absorbing surface of aperture 2211 faces the MEMS substrate 2209; the absorbing surface of aperture 2211 therefore also faces away from the backlight 2201 and towards the viewer. In this configuration, ambient light will be substantially absorbed by aperture layer 2211.

In operation of display assembly 2200, the aperture plate 2207 is fabricated with reflective aperture 2219 disposed so as to return reflected light to the backlight for recycling. The aperture layer 2211, which is built onto the MEMS substrate 2209 and is disposed between the shutter assemblies 2213 and the substrate 2209, performs a different function. The aperture layer 2211 blocks off-angle light from nominally closed shutters from escaping to the viewer, and the aperture layer 2211 is designed to absorb ambient light—in each case improving the contrast of the display.

The aperture layer 401 of FIG. 4A is an example of an absorbing aperture 2211, appropriate for use in display assembly 2200. When employing aperture layer 401 for aperture 2211 in display assembly 2200, absorbing materials are chosen for the layer 401 (as described with respect to FIG. 4A) in order to improve the contrast of the display.

A composite aperture layer, similar to composite aperture 452 of FIG. 4B, can also be used as an aperture layer 2211. However, when deployed as aperture layer 2211 in the MEMS-down configuration of display assembly 2200, the order of layers for composite aperture layer 452 is preferably reversed. In such a reversed order the absorbing layer 464 would be placed directly against the substrate 453, followed by the metal reflecting layer 462 and the two refractive layers 460 and 458.

The control matrix 1700 can also be deployed in a MEMS down configuration. When employing control matrix 1700 in display assembly 2200, absorbing materials are chosen for the layer 1717 in order to improve the contrast of the display.

And finally the control matrix 1800 of FIG. 18 can be deployed in a MEMS-down configuration, such as in display assembly 2200. When employing control matrix 1800 in a MEMS-down configuration, however, it may be preferable to eliminate the aperture plate 2207 altogether. Control matrix 1800 includes a suspended aperture layer 1808. The suspended aperture layer 1808 has two surfaces, one facing the substrate 1802 and one facing opposite to the substrate. If deployed in a MEMS-down configuration it is preferable that the surface of suspended aperture layer 1808 which faces the substrate 1802 be made of an absorbing material, while the surface of suspended aperture 1808 which faces opposite to the substrate be made of a reflective material or a reflective combination of materials.

The invention may be embodied in other specific forms without departing from the spirit or essential characteristics thereof. The forgoing embodiments are therefore to be considered in all respects illustrative, rather than limiting of the invention.

What is claimed is:

1. A method of forming a spatial light modulator including a shutter supported by a compliant beam, the method comprising:
   forming a mold on a substrate, wherein the mold includes a lower horizontal surface, an upper horizontal surface and a wall;

depositing a beam material on the lower horizontal surface and the wall of the mold;

removing the beam material deposited on the lower horizontal surface of the mold while leaving the majority of the beam material deposited on the wall of the mold in place to form the compliant beam;

forming the shutter coupled to the compliant beam; and removing the mold, thereby releasing the shutter and remaining beam material.

2. The method of claim 1, wherein the lower horizontal surface of the mold comprises a top of a first sacrificial layer.

3. The method of claim 2, wherein removing the mold comprises removing the first sacrificial layer.

4. The method of claim 2, wherein the mold wall comprises a second sacrificial layer.

5. The method of claim 2, wherein removing the mold comprises removing the second sacrificial layer.

6. The method of claim 1, wherein removing the beam material comprises applying an anisotropic etch to the beam material.

7. The method of claim 6, comprising applying an electric potential to the substrate to control the direction of the anisotropic etch.

8. The method of claim 1, wherein the depositing of the beam material connects the beam material to an anchor disposed on the substrate.

9. The method of claim 1, wherein the depositing of the beam material connects the beam material to an anchor deposited on a layer of material deposited beneath the lower horizontal surface of the mold.

10. The method of claim 9, wherein the depositing of the beam material establishes an electrical connection between the beam material and the anchor.

11. The method of claim 1, wherein forming the shutter comprises depositing a shutter layer on the upper horizontal surface of the mold such that the shutter layer is connected to the beam material.

12. The method of claim 11, wherein the shutter layer comprises amorphous silicon.

13. The method of claim 11, wherein the shutter layer is formed from a material other than the beam material.

14. The method of claim 11, wherein the shutter layer is formed from the same material as the beam material.

15. The method of claim 14, wherein the beam material and the shutter layer together comprise a composite of a plurality of layers.

16. The method of claim 15 wherein the composite comprises at least 1 layer of amorphous silicon and at least one layer of a metal.

17. The method of claim 15 wherein the plurality of layers yields an unbalanced level of stress in the compliant beams.

18. The method of claim 1, wherein the mold wall is substantially normal to the substrate.

19. The method of claim 1, wherein the beam material is deposited on the wall of the mold to have a thickness of less than 2 about microns.

20. The method of claim 1, wherein the beam material is deposited on the wall of the mold to have a thickness of less than about 1.5 microns.

21. The method of claim 1, wherein the beam material is deposited on the wall of the mold to have a thickness of less than about 1.0 microns.

* * * * *